(12) United States Patent
Yokomitsu et al.

(10) Patent No.: US 8,472,715 B2
(45) Date of Patent: Jun. 25, 2013

(54) SITUATION DETERMINING APPARATUS, SITUATION DETERMINING METHOD, SITUATION DETERMINING PROGRAM, ABNORMALITY DETERMINING APPARATUS, ABNORMALITY DETERMINING METHOD, ABNORMALITY DETERMINING PROGRAM, AND CONGESTION ESTIMATING APPARATUS

(75) Inventors: Sumio Yokomitsu, Kanagawa (JP); Kenji Kondo, Kyoto (JP); Shoichi Araki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 629 days.

(21) Appl. No.: 12/601,950

(22) PCT Filed: Oct. 20, 2008

(86) PCT No.: PCT/JP2008/002970
§ 371 (c)(1),
(2), (4) Date: Nov. 25, 2009

(87) PCT Pub. No.: WO2009/054119
PCT Pub. Date: Apr. 30, 2009

(65) Prior Publication Data
US 2010/0177963 A1    Jul. 15, 2010

(30) Foreign Application Priority Data

Oct. 26, 2007  (JP) .............................. P2007-278625
Oct. 29, 2007  (JP) .............................. P2007-280205

(51) Int. Cl.
*G06K 9/00*    (2006.01)
(52) U.S. Cl.
USPC ........................................ 382/170; 382/103
(58) Field of Classification Search
None
See application file for complete search history.

(56) References Cited

U.S. PATENT DOCUMENTS 5,263,098 A * 11/1993 Horikami .................... 382/128
5,546,475 A *  8/1996 Bolle et al. .................. 382/190
5,757,287 A *  5/1998 Kitamura et al. ............ 340/937

(Continued)

FOREIGN PATENT DOCUMENTS

JP    07-296166 A    11/1995
JP    10-290446 A    10/1998

(Continued)

OTHER PUBLICATIONS

International Search Report for PCT/JP2008/002970.

*Primary Examiner* — Barry Drennan
*Assistant Examiner* — Feng Niu
(74) *Attorney, Agent, or Firm* — Pearne & Gordon LLP

(57) ABSTRACT

The invention provides a situation and abnormality determining apparatus, method, and program capable of easily determining the situation of a monitoring place and the degree of congestion. In addition, the invention provides a congestion estimating apparatus capable of easily and accurately estimating the degree of congestion of persons using an image. A situation determining apparatus for analyzing captured moving images or a plurality of captured still images to determine a movement situation and/or a degree of congestion of persons includes: a local image change ratio calculating unit that calculates a time change ratio of a brightness value in a local area of the captured images; and a situation determining unit that analyzes a histogram of the time change ratios of a plurality of local areas calculated by the local image change ratio calculating unit and determines the movement situation of the persons and/or the degree of congestion of the persons.

14 Claims, 50 Drawing Sheets

U.S. PATENT DOCUMENTS

| | | | |
|---|---|---|---|
| 6,597,738 B1 * | 7/2003 | Park et al. | 375/240.16 |
| 6,754,367 B1 * | 6/2004 | Ito et al. | 382/103 |
| 7,221,779 B2 | 5/2007 | Kawakami et al. | |
| 2004/0032982 A1 * | 2/2004 | Nishizawa | 382/171 |
| 2005/0074141 A1 | 4/2005 | Tsunashima | |
| 2006/0233437 A1 * | 10/2006 | Diehl | 382/162 |
| 2007/0086623 A1 * | 4/2007 | Ramaswamy et al. | 382/103 |
| 2008/0195257 A1 * | 8/2008 | Rauch | 701/1 |

FOREIGN PATENT DOCUMENTS

| | | |
|---|---|---|
| JP | 11-096376 A | 4/1999 |
| JP | 11-282999 A | 10/1999 |
| JP | 2002-008042 A | 1/2002 |
| JP | 2002-074371 A | 3/2002 |
| JP | 2003-187248 A | 7/2003 |
| JP | 2004-064438 A | 2/2004 |
| JP | 2004-102380 A | 4/2004 |
| JP | 2004-258927 A | 9/2004 |
| JP | 2005-070985 A | 3/2005 |
| JP | 2005-128619 A | 5/2005 |
| JP | 2005-135339 A | 5/2005 |

* cited by examiner $M_{k,i-1} = 0$ $M_{k,i} = 1$

FIG.15

|  | FREE MOVEMENT OF LARGE NUMBER OF PERSONS | FREE MOVEMENT OF SMALL NUMBER OF PERSONS | DEFLECTION OF MOVING ROUTE TO ONE SIDE |
|---|---|---|---|
| NUMBER OF AREAS CHANGED | LARGE | LARGE | SMALL |
| LOCAL IMAGE CHANGE RATIO | LARGE | SMALL | LARGE |

|  | RN₁ | RN₂ |
|---|---|---|
| MOVEMENT OF LARGE NUMBER OF PERSONS | 49 | 26 |
| MOVEMENT OF SMALL NUMBER OF PERSONS | 33 | 1 |
| DEFLECTION OF MOVING ROUTE TO ONE SIDE | 19 | 8 |

|  | $f_1$ | $f_2$ |
|---|---|---|
| MOVEMENT OF LARGE NUMBER OF PERSONS | 0.30 | 0.53 |
| MOVEMENT OF SMALL NUMBER OF PERSONS | 0.20 | 0.03 |
| DEFLECTION OF MOVING ROUTE TO ONE SIDE | 0.12 | 0.42 |

TEXTURE FEATURE EXTRACTING PROCESS RESULT

TEXTURE FEATURE AMOUNT EXTRACTED FROM AREA t1 — 681
TEXTURE FEATURE AMOUNT EXTRACTED FROM AREA t2 — 682
TEXTURE FEATURE AMOUNT EXTRACTED FROM AREA t3 — 683
TEXTURE FEATURE AMOUNT EXTRACTED FROM AREA t4

CAMERA
730

EXAMPLE OF GROUP OF STATION PLATFORM SCENES
WHEN VEHICLE APPROACHES

EXAMPLE OF PROCESS RESULT OF MOTION VECTOR OF
STATION PLATFORM WHEN VEHICLE STOPS

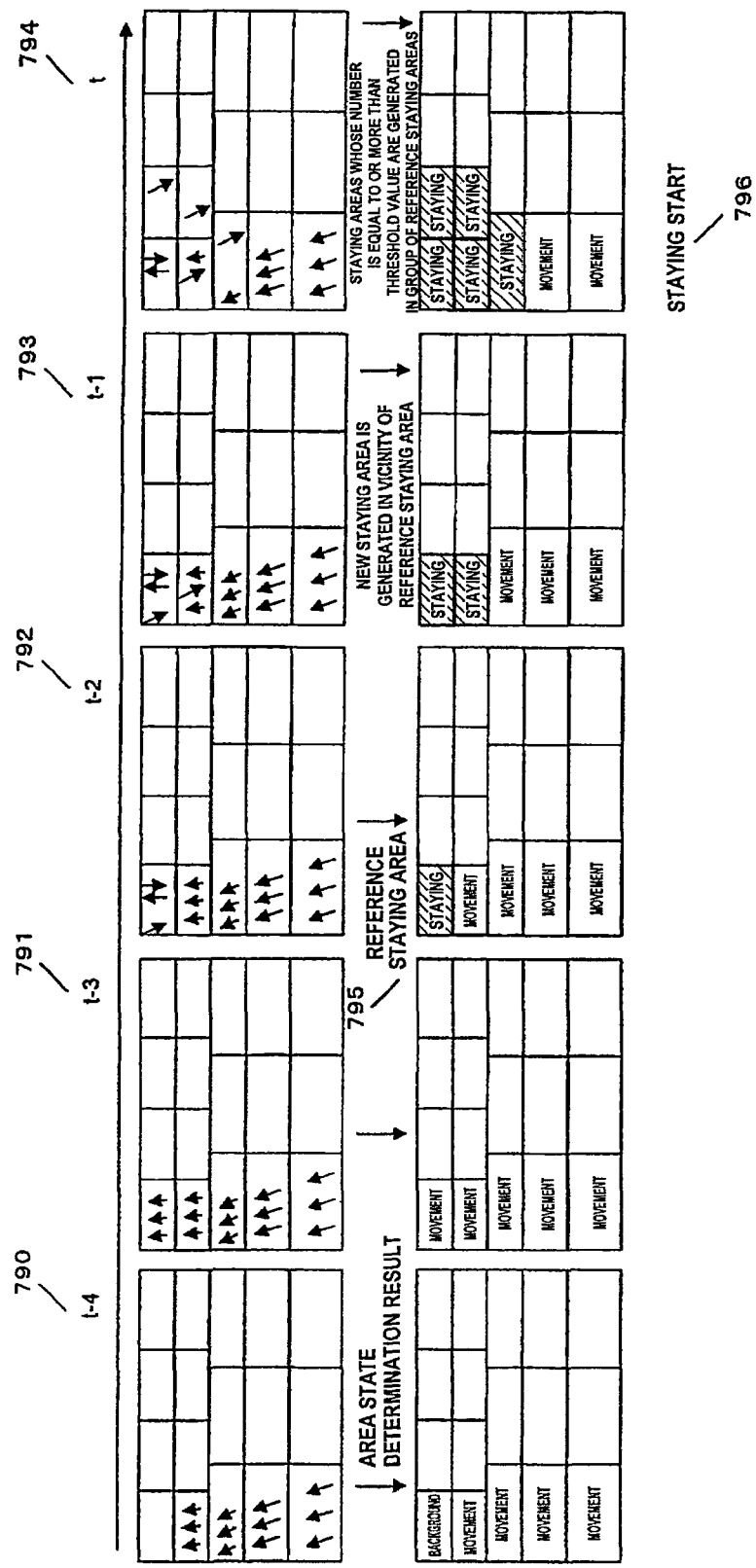

SITUATION DETERMINING APPARATUS, SITUATION DETERMINING METHOD, SITUATION DETERMINING PROGRAM, ABNORMALITY DETERMINING APPARATUS, ABNORMALITY DETERMINING METHOD, ABNORMALITY DETERMINING PROGRAM, AND CONGESTION ESTIMATING APPARATUS

TECHNICAL FIELD

The present invention relates to a situation determining apparatus, a situation determining method, a situation determining program, an abnormality determining apparatus, an abnormality determining method, and an abnormality determining program capable of analyzing an image captured in a public space in which a plurality of persons is moved, such as a station or an airport, to detect the degree of congestion or the movement situation of the persons.

In addition, the present invention relates to a congestion estimating apparatus that estimates the degree of congestion of persons on the basis of an image, and more particularly, to a congestion estimating apparatus that determines the kind of the staying state or movement state of persons to detect an abnormal state.

BACKGROUND ART

In recent years, with an increasing demand for safety and security, monitoring cameras have been installed in a public space such as a station or an airport, and important facilities. In the related art, an observer monitors a monitoring camera all the time. Therefore, there is an attempt to reduce efforts for monitoring and improve monitoring efficiency using image recognition in order to prevent the observer from overlooking the monitoring cameras due to an increase in the number of monitoring cameras and the fatigue of the observer.

Patent Document 1 and Patent Document 2 disclose a technique for counting the number of persons in a monitoring place. Patent Document 1 discloses a technique that extracts the background using a background difference and counts the number of persons who move across a monitoring area which is orthogonal to a person's passage. A plurality of monitoring areas is prepared, and a variation in count value between the monitoring areas is used to accurately count the persons even though disturbance occurs.

Patent Document 2 discloses a technique in which a camera is provided above a passage such that the optical axis is aligned with the vertical direction, a motion vector is extracted at a boundary line provided on the image in order to count the number of persons, and a vertical component of the motion vector with respect to the boundary line is integrated to count the number of persons passing through the passage.

Patent Document 3 discloses a technique that extracts features corresponding to the number of persons from an image without counting the number of persons to calculate the degree of congestion. In Patent Document 3, the number of changes in each pixel or each local area for a predetermined amount of time is calculated and the degree of congestion is calculated on the basis of the number of changes on the assumption that, "when there are a large number of passengers, the number of changes between images captured at different times is increased".

In addition, in the related art, various techniques have been proposed which estimate the degree of congestion of persons in an image. For example, a technique has been proposed which calculates motion vectors, calculates the integral value of the motion vectors, and counts the number of persons in unit of the integral value (for example, see Patent Document 4).

A technique has been proposed which detects the heads of the persons, measures the number of heads, and estimates the degree of congestion (for example, see Patent Document 2).

A technique has been proposed which estimates the degree of congestion using the area of the background extracted by an inter-frame difference or background difference process (for example, see Patent Document 3 or Patent Document 5).

Patent Document 1: JP-A-2002-074371
Patent Document 2: JP-A-2005-135339
Patent Document 3: JP-A-2004-102380
Patent Document 4: JP-A-2005-128619
Patent Document 5: JP-A-11-282999

DISCLOSURE OF THE INVENTION

Problem that the Invention is to Solve

However, the above-mentioned techniques according to the related art have the following problems. That is, the technique disclosed in Patent Document 1 uses the background difference. Therefore, it is difficult to apply the technique to a place in which there is a large variation in illumination, and it is difficult to count the persons one by one during congestion. In the technique disclosed in Patent Document 2, similarly, it is difficult to count the persons one by one during congestion. In Patent Document 3, since it is premised that persons move, it is difficult to calculate the degree of congestion in a situation in which there are moving persons and standing persons.

The method according to the related art which integrates the motion vectors and measures the number of persons in unit of the integral value is a method of cutting out each person. In the method, when there are a small number of persons, it is possible to relatively accurately estimate the degree of congestion. However, in a congestion situation, the persons overlap each other. Therefore, it is difficult to apply this technique to a congestion situation, and the accuracy of the estimation is lowered. When the motion vectors are extracted, a motion vector by normal movement and a fine motion vector generated by, for example, noise have different sizes due to the angle of view of the camera. Therefore, it is necessary to set the threshold value of the size of the motion vector in advance.

The method of detecting the heads of the persons has a problem in that, when there are a small number of persons, it is difficult to relatively accurately estimate the degree of congestion, and when there are a large number of persons, the detection accuracy of the heads is lowered.

In the method of estimating the degree of congestion using the area of the background extracted by the inter-frame difference process, when the persons remain stationary, the background is not extracted. In the method of estimating the degree of congestion using the area of the background extracted by the background difference process, when there are persons in most of the screen, it is difficult to accurately a background area. The method is easily affected by the shaking of the camera. In addition, in the method, a method of calculating the index of a congestion situation (a staying area, a movement area, a normal area, a staying start state, a staying removal state, and a normal state) is not disclosed, and it is difficult to check a partial congestion situation.

The invention has been made in order to solve the above-mentioned problems, and an object of the invention is to provide a situation determining apparatus, a situation determining method, a situation determining program, an abnormality determining apparatus, an abnormality determining method, and an abnormality determining program capable of easily determining the situation of a monitoring place and the degree of congestion.

The invention has been made in order to solve the above-mentioned problems, and an object of the invention is to provide to a congestion estimating apparatus capable of easily and accurately estimating the degree of congestion of persons on the basis of an image.

Means for Solving the Problem

In order to achieve the object, the present invention provides a situation determining apparatus for analyzing captured moving images or a plurality of captured still images to determine a movement situation and/or a degree of congestion of persons, the situation determining apparatus including: a local image change ratio calculating unit that calculates a time change ratio of a brightness value in a local area of the captured images; and a situation determining unit that analyzes a histogram of the time change ratios of a plurality of local areas calculated by the local image change ratio calculating unit and determines the movement situation of the persons and/or the degree of congestion of the persons.

According to the above-mentioned structure, the local change ratios of a plurality of local areas in the captured images are calculated, a histogram of the local change ratios of the plurality of areas is calculated, and the histogram is analyzed. Therefore, it is possible to detect the spatial characteristics (for example, the deflection of movement to one side) of a change ratio corresponding to the incidence of the movement of an object, and it is possible to comprehensively determine the situation of a monitoring place and the degree of congestion.

The present invention provides a situation determining apparatus for analyzing captured moving images or a plurality of captured still images to determine a movement situation and/or a degree of congestion of persons, the situation determining apparatus including: an image input unit that inputs moving images or a plurality of still images of persons captured in an imaging target place; an image accumulating unit that accumulates the images input by the image input unit; a local image change detecting unit that selects two images captured at a first time interval from the images accumulated in the image accumulating unit and detects a change between the two images in each local area using area division information indicating a division method of dividing the image into a plurality of local areas; a local image change information accumulating unit that accumulates the change between the two images detected by the local image change detecting unit as image change information; a local image change ratio calculating unit that counts the number of changes between images given at a second time interval in each local area on the basis of the image change information accumulated in the local image change information accumulating unit, and calculates an image change ratio of each local area; a local image change ratio accumulating unit that accumulates the image change ratios of a plurality of local areas calculated by the local image change ratio calculating unit; a local image change ratio histogram calculating unit that calculates a histogram of the image change ratios of the plurality of local areas accumulated by the local image change ratio accumulating unit; and a situation determining unit that analyzes the histogram calculated by the local image change ratio histogram calculating unit to determine the movement situation and or the degree of congestion of the persons in the imaging target place.

According to the above-mentioned structure, the local change ratios of a plurality of local areas in the captured images are calculated, a histogram of the local change ratios of the plurality of areas is calculated, and the histogram is analyzed. Therefore, it is possible to detect the spatial characteristics (for example, the deflection of movement to one side) of a change ratio corresponding to the incidence of the movement of an object, and it is possible to comprehensively determine the situation of a monitoring place and the degree of congestion.

In the above-mentioned structure, the situation determining unit includes a reference histogram storage unit and a histogram comparing unit.

In the above-mentioned structure, the situation determining unit includes a feature extracting unit, an identification reference storage unit, and an identifying unit.

In the above-mentioned structure, the movement situation includes at least a situation in which a moving route of the persons is deflected to one side.

According to the above-mentioned structures, it is possible to detect the deflection of a moving route to one side using a simple process. Therefore, it is possible to estimate whether there is a line of persons waiting for the train and the congestion level of the persons in a place where there is a line of persons for waiting for the train, such as a station. Obviously, in a situation in which the moving route is not deflected to one side, it is also possible to estimate the situation and a congestion level. When the deflection of the moving route to one side is detected in a passage where persons are not generally lined up, it is possible to estimate an obstacle to the free movement of persons.

The present invention provides an abnormality determining apparatus for analyzing moving images or a plurality of still images captured by an imaging unit that is provided at a platform of a station to determine an abnormal situation, the abnormality determining apparatus including: the situation determining apparatus; a train arrival detecting unit that detects an arrival of a train to the platform; and an abnormality determining unit which determines that abnormality occurs when it is determined that the moving route of the persons is deflected to the one side as the situation determination result after a predetermined amount of time has elapsed from the acquisition of train arrival information by the train arrival detecting unit, on the basis of a situation determination result of the situation determining apparatus and the train arrival information obtained by the train arrival detecting unit.

According to the above-mentioned structure, it is possible to determine an abnormal congestion state different from a normal state on the basis of the kind of condition or the degree of congestion obtained by the situation determining apparatus.

In the above-mentioned structure, the abnormality determining apparatus further includes a notifying unit that gives the determination result of the abnormality determining unit to a predetermined contact address when the abnormality determining unit determines that abnormality occurs.

According to the above-mentioned structure, it is possible to provide auxiliary information to the observer or rapidly transmit it to a predetermined contact address.

The present invention provides a situation determining method of analyzing captured moving images or a plurality of captured still images to determine a movement situation and/or a degree of congestion of persons, the situation determining method including: a local image change ratio calculating step of calculating a time change ratio of a brightness value in a local area of the captured images; and a situation determining step of analyzing a histogram of the time change ratios of a plurality of local areas calculated by the local image change ratio calculating unit and determining the movement situation of the persons and/or the degree of congestion of the persons.

According to the above-mentioned method, the local change ratios of a plurality of local areas in the captured images are calculated, a histogram of the local change ratios of the plurality of areas is calculated, and the histogram is analyzed. Therefore, it is possible to detect the spatial characteristics (for example, the deflection of movement to one side) of a change ratio corresponding to the incidence of the movement of an object, and it is possible to comprehensively determine the situation of a monitoring place and the degree of congestion.

In the situation determining method, the movement situation includes at least a situation in which a moving route of the persons is deflected to one side.

According to the above-mentioned method, it is possible to detect the deflection of a moving route to one side using a simple process. Therefore, it is possible to estimate whether there is a line of persons waiting for the train and the congestion level of the persons in a place where there is a line of persons for waiting for the train, such as a station. Obviously, in a situation in which the moving route is not deflected to one side, it is also possible to estimate the situation and a congestion level. When the deflection of the moving route to one side is detected in a passage where persons are not generally lined up, it is possible to estimate an obstacle to the free movement of persons.

The present invention provides an abnormality determining method of analyzing moving images or a plurality of still images captured by an imaging unit that is provided at a platform of a station to determine an abnormal situation, the abnormality determining method including: a situation determining step of performing the situation determining method; a train arrival detecting step of detecting an arrival of a train to the platform; and an abnormality determining step of determining that abnormality occurs when it is determined that the moving route of the persons is deflected to the one side as the situation determination result after a predetermined amount of time has elapsed from the acquisition of train arrival information by the train arrival detecting unit, on the basis of a situation determination result of the situation determining apparatus and the train arrival information obtained by the train arrival detecting unit.

According to the above-mentioned method, it is possible to determine an abnormal congestion state different from a normal state on the basis of the kind of condition or the degree of congestion obtained by the situation determining apparatus.

The present invention provides a situation determining program that analyzes captured moving images or a plurality of captured still images to determine a movement situation and/or a degree of congestion of persons, the situation determining program allowing a computer to execute: a local image change ratio calculating step of calculating a time change ratio of a brightness value in a local area of the captured images; and a situation determining step of analyzing a histogram of the time change ratios of a plurality of local areas calculated by the local image change ratio calculating unit and determining the movement situation of the persons and/or the degree of congestion of the persons.

According to the above-mentioned program, the local change ratios of a plurality of local areas in the captured images are calculated, a histogram of the local change ratios of the plurality of areas is calculated, and the histogram is analyzed. Therefore, it is possible to detect the spatial characteristics (for example, the deflection of movement) of a change ratio corresponding to the incidence of the movement of an object, and it is possible to comprehensively determine the situation of a monitoring place and the degree of congestion.

In the situation determining program, the movement situation includes at least a situation in which a moving route of the persons is deflected to one side.

According to the above-mentioned program, it is possible to detect the deflection of a moving route to one side using a simple process. Therefore, it is possible to estimate whether there is a line of persons waiting for the train and the congestion level of the persons in a place where there is a line of persons for waiting for the train, such as a station. Obviously, in a situation in which the moving route is not deflected to one side, it is also possible to estimate the situation and a congestion level. When the deflection of the moving route to one side is detected in a passage where persons are not generally lined up, it is possible to estimate an obstacle to the free movement of persons.

An abnormality determining program that analyzes moving images or a plurality of still images captured by an imaging unit that is provided at a platform of a station to determine an abnormal situation, the abnormality determining program allowing a computer to execute: a situation determining step of performing the situation determining method; a train arrival detecting step of detecting an arrival of a train to the platform; and an abnormality determining step of determining that abnormality occurs when it is determined that the moving route of the persons is deflected to the one side as the situation determination result after a predetermined amount of time has elapsed from the acquisition of train arrival information by the train arrival detecting unit, on the basis of a situation determination result of the situation determining apparatus and the train arrival information obtained by the train arrival detecting unit.

According to the above-mentioned program, it is possible to determine an abnormal congestion state different from a normal state on the basis of the kind of condition or the degree of congestion obtained by the situation determining apparatus.

The present invention provides a congestion estimating apparatus including: an image generating unit that converts an image of various scenes or an image captured by a camera into a digital image and outputs the digital image; an area dividing unit that divides an input image into partial areas; a movement information generating unit that generates movement information from the image output from the image generating unit; a texture information generating unit that generates texture information of the image output from the image generating unit; a reference movement information generating unit that stores and updates reference movement information, which is a reference for movement in each partial area; a reference texture information generating unit that stores and updates reference texture information for determining whether there is a person in each partial area; a storage unit that stores the reference movement information and the reference texture information; a movement information determining unit that compares the movement information output from the movement information generating unit with the reference movement information generated by the reference movement information generating unit to determine whether there is a movement in each partial area; a texture information determining unit that compares the texture information output from the texture information generating unit with the reference texture information generated by the reference texture information generating unit to determine whether there is the same texture information as a person in each partial area; and a staying determining unit that receives determination results from the movement information determining unit and the texture information determining unit to determine whether there is a person in each area.

According to the above-mentioned structure, the movement information determining unit determines whether there is a movement in each area. Even when there is no movement, the texture information determining unit can determine whether there is a person from texture similarity. Therefore, it is possible to estimate the state of each area, such as a movement area, a staying area, a stationary area, and an area in which there is no person. Then, the staying determining unit can determine the degree of congestion on the basis of each information item.

In the above-mentioned structure, the congestion estimating apparatus further includes a timing generating unit that receives the image generated by the image generating unit and determines whether there is a person from movement information, wherein, only when it is determined that there is a person, the timing generating unit gives update timing to the reference movement information generating unit and to the reference texture information generating unit.

According to the above-mentioned structure, the reference movement information of the reference movement information generating unit and the reference texture information of the reference texture information generating unit are updated at each update timing. Therefore, even when an environment is changed, it is possible to determine whether there is a movement or texture according to the variation in the environment. As a result, it is possible to accurately perform determination all the time.

In the above-mentioned structure, the timing generating unit detects approach timing of a vehicle, and gives the update timing to the reference movement information generating unit and to the reference texture information generating unit at each approach timing.

According to the above-mentioned structure, the reference movement information of the reference movement information generating unit and the reference texture information of the reference texture information generating unit are updated at each vehicle approach timing. Therefore, it is possible to determine whether there is a movement or texture on the basis of the movement of persons or the texture of the persons before and after the vehicle approaches.

In the above-mentioned structure, the reference movement information generating unit samples reference movement information at the timing notified by the timing generating unit to set a threshold value of the reference movement information, the movement information determining unit determines that there is a movement when the reference movement information is more than a threshold value of the reference movement information; whereas the movement information determining unit determines that there is no movement when the reference movement information is not more than the threshold value of the reference movement information.

According to the above-mentioned structure, the reference movement information of the reference movement information generating unit is updated at each update timing, and the threshold value of the reference movement information is set at the update timing. Therefore, it is possible to determine the movement information on the basis of movement at the update timing.

In the above-mentioned structure, the texture information determining unit performs a frequency conversion process on input information to determine similarity in a frequency domain.

According to the above-mentioned structure, it is possible to evaluate similarity on the basis of the outline or silhouette of a person.

In the above-mentioned structure, the reference texture information generating unit samples reference texture information at the timing notified by the timing generating unit to set the reference texture information, and the texture information determining unit determines similarity between the texture information generated by the texture information generating unit and the reference texture information generated by the reference texture information generating unit, and when it is determined that the texture information is similar to the reference texture information, the texture information determining unit determines that there is a person.

According to the above-mentioned structure, the reference texture information of the reference texture information generating unit is updated at each update timing, and it is possible to determine the similarity of texture on the basis of the texture at the update timing.

In the above-mentioned structure, the staying determining unit receives the determination result of the movement information determining unit and the determination result of the texture information determining unit to output a state of any one of a staying area, a movement area, a noise area, and a background area as the state of each area.

According to the above-mentioned structure, it is possible to output a staying area, a movement area, a noise area, and a background area as the state of each area. Therefore, when performing a congestion estimating process, the congestion determining unit can measure the degree of congestion for each kind of area. In addition, it is perform calculation only by counting the overall degree of congestion.

In the above-mentioned structure, the congestion estimating apparatus further includes an abnormality determining unit that receives information output from the staying determining unit, and analyzes each input state to determine whether abnormal congestion occurs.

According to the above-mentioned structure, it is possible to determine whether the degree of congestion of the entire imaging environment is normal or abnormal on the basis of the state of each area.

In the above-mentioned structure, the abnormality determining unit counts various states of each area, the staying area, the movement area, the noise area, and the background area output from the staying determining unit, and when a congestion index, which is the sum of the number of staying areas and the number of moving areas, is not reduced by a predetermined threshold value or more after the approach timing of the vehicle obtained by the timing generating unit, the abnormality determining unit determines that abnormality occurs.

According to the above-mentioned structure, the state of each area is counted after the approach timing of the vehicle to calculate the congestion index. Therefore, it is possible to determine whether a congestion state is normal or abnormal.

In the above-mentioned structure, the abnormality determining unit counts various states of each area, the staying area, the movement area, the noise area, and the background area output from the staying determining unit, and when the ratio of the staying area is more than a predetermined value, the abnormality determining unit determines that abnormality occurs.

According to the above-mentioned structure, the state of each area is counted all the time to calculate the congestion index, thereby calculating the ratio of the staying area. Therefore, it is possible to detect abnormality on the basis of the ratio of the staying area.

In the above-mentioned structure, the abnormality determining unit counts various states of each area, the staying area, the movement area, the noise area, and the background area output from the staying determining unit, and the abnormality determining unit determines the tendency of the movement of the persons, such as a staying start, staying removal, and a normal state, from the ratios of the staying area and the movement area in time series.

According to the above-mentioned structure, the state of each area and a time-series variation are counted all the time to calculate the congestion index. Therefore, it is possible to determine the tendency of the movement of persons, such as a staying start, staying removal, and a normal state. In addition, it is possible to issue a warning before abnormal congestion occurs, and notify the start of the removal of abnormal congestion.

Advantage of the Invention

According to the invention, the local change ratios of a plurality of local areas in the captured images are calculated, a histogram of the local change ratios of the plurality of areas is calculated, and the histogram is analyzed. Therefore, it is possible to detect the spatial characteristics (for example, the deflection of movement to one side) of a change ratio corresponding to the incidence of the movement of an object, and it is possible to comprehensively determine the situation of a monitoring place and the degree of congestion.

Even when the movement of persons is deflected to one side after a predetermined amount of time has elapsed from the arrival of the train, it is determined that abnormality occurs on the basis of both the determined comprehensive situation or the degree of congestion, and the arrival information of the information. It is possible to provide auxiliary information to the observer or rapidly transmit it to a predetermined contact address.

According to the invention, the reference movement amount of the movement information is automatically set. Therefore, it is possible to discriminate a state in which there is a movement from a state in which there is no movement. In addition, it is possible to determine whether there is a movement and uses texture to determine similarity, thereby discriminating various states of each area, a staying area, a movement area, a noise area, and a background area. Further, it is possible to use the state of each area to estimate the degree of congestion, and provide the indexes of congestion situations (a staying area, a movement area, a normal area, a staying start state, a staying removal state, and a normal state) and information about an abnormal state. Therefore, it is possible to easily and accurately estimate the degree of congestion of the persons using an image.

BRIEF DESCRIPTION OF THE DRAWINGS

FIG. 15 is a table illustrating the number of regions that are changed and a local image change ratio in three situations, in the operation of the situation determining apparatus according to the first embodiment of the invention.

FIG. 65 is a diagram illustrating the process of determining the tendency of the movement of persons in the congestion estimating apparatus shown in FIG. 60.

Figure 1:
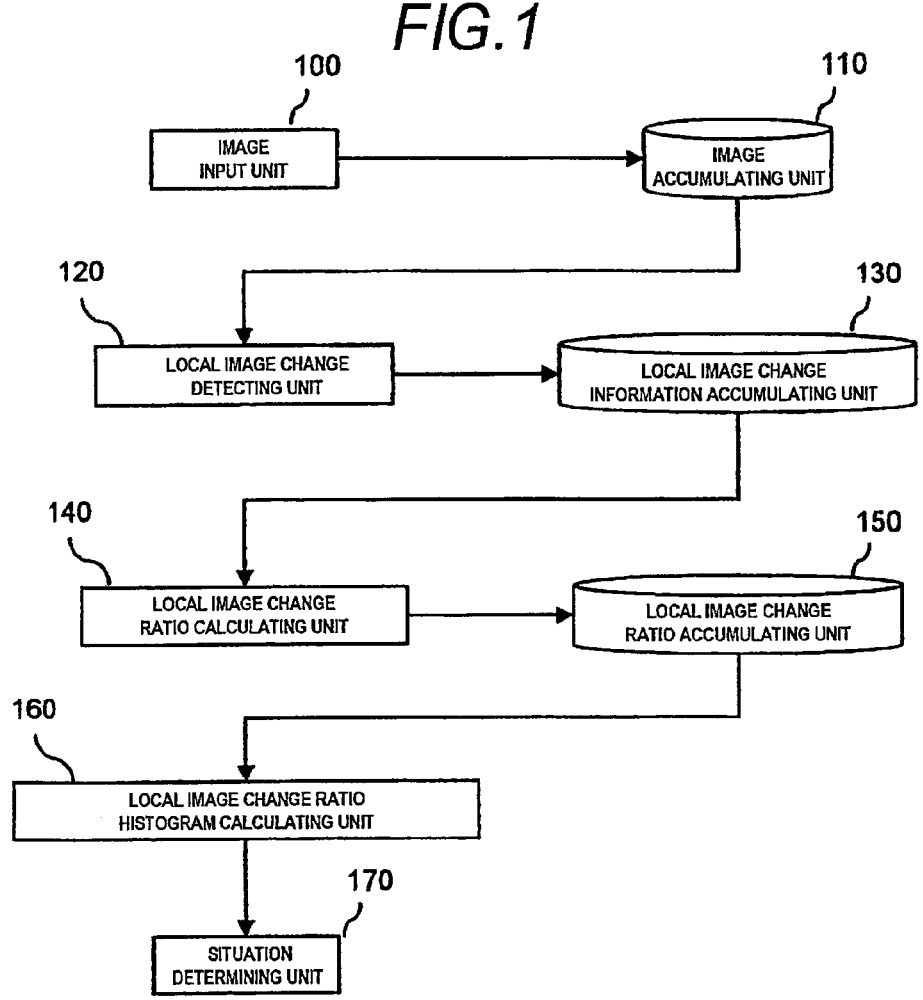
FIG. 1 is a block diagram schematically illustrating the structure of a situation determining apparatus according to a first embodiment of the invention.

| Description of Reference Numerals and Signs | |
|---|---|
| 100: | IMAGE INPUT UNIT |
| 110: | IMAGE ACCUMULATING UNIT |
| 120: | LOCAL IMAGE CHANGE DETECTING UNIT |
| 130: | LOCAL IMAGE CHANGE INFORMATION ACCUMULATING UNIT |
| 140: | LOCAL IMAGE CHANGE RATIO CALCULATING UNIT |
| 150: | LOCAL IMAGE CHANGE RATIO ACCUMULATING UNIT |
| 160: | LOCAL IMAGE CHANGE RATIO HISTOGRAM CALCULATING UNIT |
| 170: | SITUATION DETERMINING UNIT |
| 200: | REFERENCE HISTOGRAM STORAGE UNIT |
| 210: | HISTOGRAM COMPARING UNIT |
| 300: | FEATURE EXTRACTING UNIT |
| 310: | IDENTIFICATION REFERENCE STORAGE UNIT |
| 320: | IDENTIFYING UNIT |
| 500: | SITUATION DETERMINING APPARATUS |
| 510: | TRAIN ARRIVAL DETECTING UNIT |
| 520: | ABNORMALITY DETERMINING UNIT |
| 530: | NOTIFYING UNIT |
| 610A, 610B, 610C: | CONGESTION ESTIMATING APPARATUS |
| 611: | IMAGE GENERATING UNIT |
| 612: | AREA DIVIDING UNIT |
| 613: | MOVEMENT INFORMATION GENERATING UNIT |
| 614: | REFERENCE MOVEMENT INFORMATION GENERATING UNIT |
| 615: | TEXTURE INFORMATION GENERATING UNIT |
| 616: | REFERENCE TEXTURE INFORMATION GENERATING UNIT |
| 617: | STORAGE UNIT |
| 618: | MOVEMENT INFORMATION DETERMINING UNIT |
| 619: | TEXTURE INFORMATION DETERMINING UNIT |
| 620: | STAYING DETERMINING UNIT |
| 621: | TIMING GENERATING UNIT |
| 622: | ABNORMALITY DETERMINING UNIT |
| 630: | RECTANGULAR AREA 1 |
| 631: | RECTANGULAR AREA 2 |
| 640: | IMAGE BUFFER UNIT |
| 641: | OPTICAL FLOW CALCULATING UNIT |
| 642: | FLOW REPRESENTATIVE DIRECTION AND SIZE CALCULATING UNIT |
| 643: | EDGE EXTRACTING UNIT |
| 644: | INTER-EDGE-FRAME DIFFERENCE UNIT |
| 645: | REFERENCE MOTION VECTOR MAP REFERENCE UNIT |
| 646: | REFERENCE DIFFERENCE AREA MAP REFERENCE UNIT |
| 647: | MOTION VECTOR STATE DETERMINING UNIT |
| 648: | DIFFERENCE AREA STATE DETERMINING UNIT |
| 649: | MOVEMENT AREA STATE DETERMINING UNIT |
| 650: | REFERENCE MOTION VECTOR MAP |
| 660: | REFERENCE DIFFERENCE AREA MAP |
| 670: | INPUT IMAGE |
| 680: | TEXTURE FEATURE EXTRACTING PROCESS RESULT |
| 690: | SCENE 1 IN WHICH THERE IS PERSON |
| 691, 701: | TEXTURE PROCESS AREA |
| 700: | SCENE 1 IN WHICH THERE IS NO PERSON |
| 706: | SIMILARITY CALCULATION |
| 710: | MOVEMENT INFORMATION DETERMINING UNIT DETERMINES THAT THERE IS MOVEMENT |
| 711: | MOVEMENT INFORMATION DETERMINING UNIT MOTION DETERMINES THAT THERE IS NO MOVEMENT |
| 712: | TEXTURE INFORMATION DETERMINING UNIT DETERMINES THAT THERE IS PERSON |
| 713: | TEXTURE INFORMATION DETERMINING UNIT DETERMINES THAT THERE IS NO PERSON |
| 714, 720, 762: | MOVEMENT AREA |
| 715, 723, 764: | NOISE AREA |
| 716, 721, 763: | STAYING AREA |
| 717, 722: | BACKGROUND AREA |
| 730: | CAMERA |
| 760: | CONGESTION INDEX TIME-SERIES GRAPH |
| 795: | REFERENCE STAYING AREA |
| 796: | STAYING START |
| PH: | PLATFORM OF STATION |
| WL: | SIDE WALL OF PLATFORM |
| ST: | STAIRCASE THROUGH WHICH PERSONS MOVE TO PLATFORM |
| RL: | RAILROAD LINE |
| CM: | CAMERA |
| SD: | SITUATION DETERMINING APPARATUS |
| AR1 TO AR3: | ARROW INDICATING MOVING ROUTE OF PERSONS |
| WP: | PERSONS WAITING FOR TRAIN |
| MP: | MOVING PERSONS |

BEST MODE FOR CARRYING OUT THE INVENTION

Hereinafter, exemplary embodiments of the invention will be described in detail with reference to the accompanying drawings.

First Embodiment

FIG. 1 is a block diagram schematically illustrating the structure of a situation determining apparatus according to a first embodiment of the invention. In FIG. 1, the situation determining apparatus according to this embodiment includes an image input unit 100, an image accumulating unit 110, a local image change detecting unit 120, a local image change information accumulating unit 130, a local image change ratio calculating unit 140, a local image change ratio accumulating unit 150, a local image change ratio histogram calculating unit 160, and a situation determining unit 170.

Figure 2:
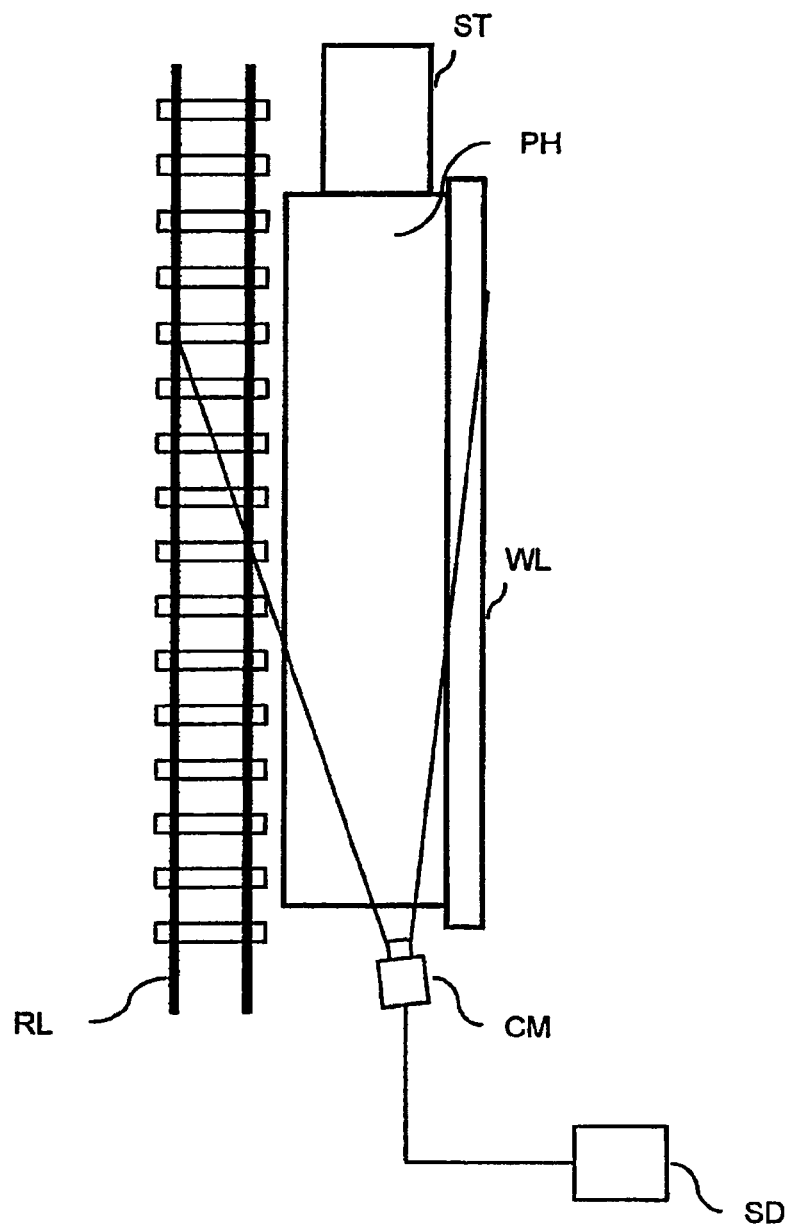
FIG. 2 is a diagram illustrating the installation of the situation determining apparatus according to the first embodiment of the invention at a railroad station.
Figure 3:
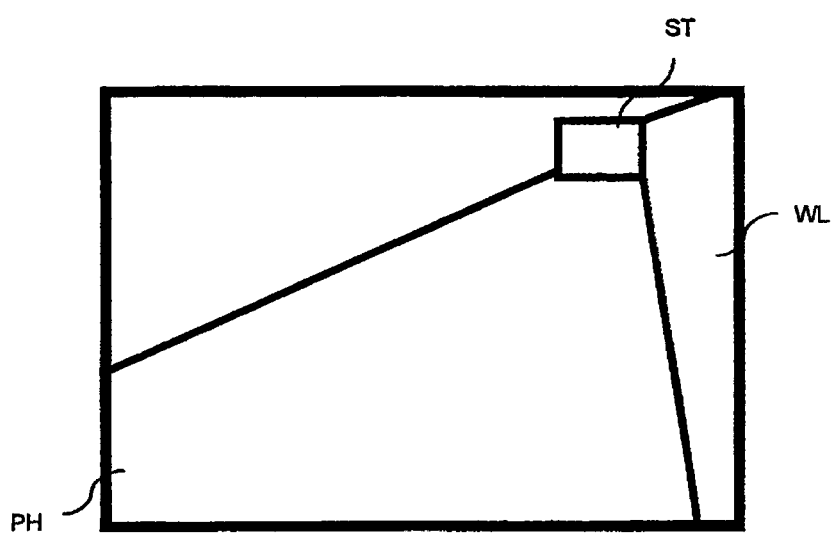
FIG. 3 is a diagram illustrating an image captured by a camera CM according to the first embodiment of the invention.

FIG. 2 is a diagram illustrating an example in which the situation determining apparatus shown in FIG. 1 is installed at a platform of a railroad station. The railroad station includes a platform PH, a side wall WL of the platform, a staircase ST that is disposed at an entrance to the platform, and a railroad line RL. A camera CM that captures the images of persons at the platform PH is provided such that the axial direction is aligned with the longitudinal direction of the platform PH, and is connected to a situation determining apparatus SD. FIG. 3 shows an example of the image captured by the camera CM. The angle of view, position, and optical axis direction of the camera CM are determined such that the captured images includes the platform PH, an entrance of the staircase ST, and the side wall WL. The situation determining apparatus SD corresponds to the situation determining apparatus shown in FIG. 1.

Next, the operation of the situation determining apparatus according to this embodiment will be described with reference to a flowchart shown in FIG. 4. First, an image input step S100 is performed by the image input unit 100. In Step S100, one frame of image captured by the camera CM is changed into a format that can be digitally processed, and the image is accumulated in the image accumulating unit 110. When the camera CM is an analog camera, an analog image is converted into a digital image, and a compression process, such as an encoding process, is performed on the digital image, if necessary. The processed image is accumulated in the image accumulating unit 110. When the camera CM is a digital camera, the image is input through a digital line and is accumulated in the image accumulating unit 110. In this embodiment, it is assumed that a 10-fps digital moving image is input and frame images at the current time are sequentially accumulated. When the camera CM is an analog camera, the image accumulating unit 110 may be, for example, a VTR that accumulates analog images, and AD conversion may be performed immediately before the analog image is output to the local image change detecting unit 120.

Figure 5:
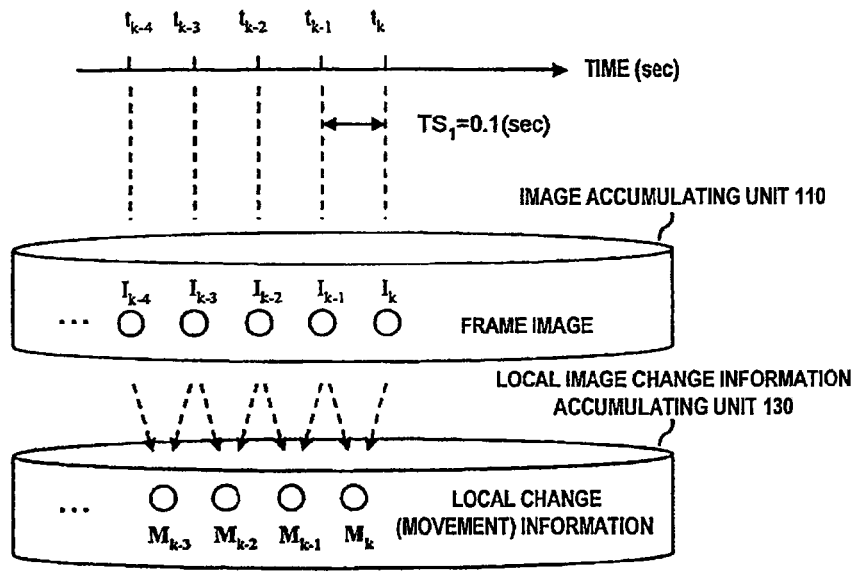
FIG. 5 is a diagram illustrating the time-series relationship between frame images accumulated in an image accumulating unit and local change information accumulated in a local image change information accumulating unit in the situation determining apparatus according to the first embodiment of the invention.
Figure 6:
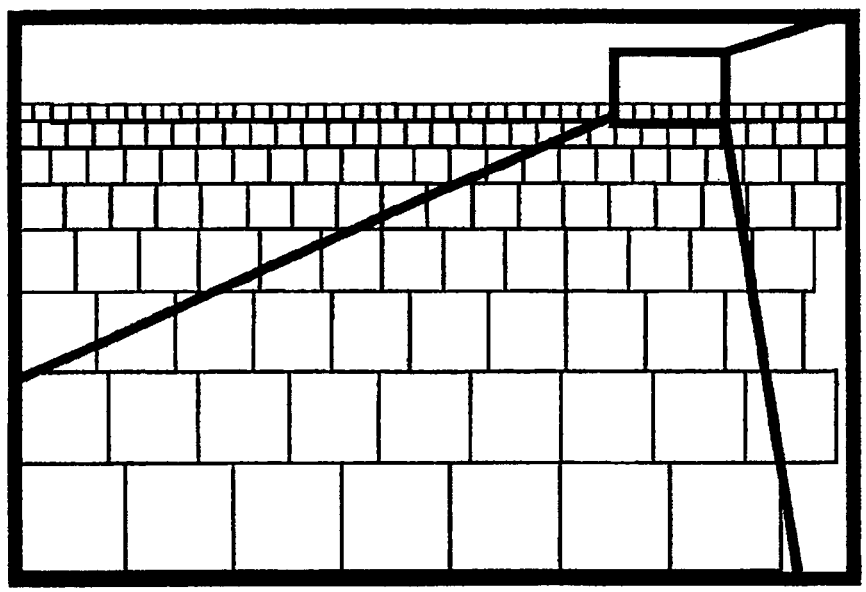
FIG. 6 is a diagram illustrating the division of the image captured by the camera CM according to the first embodiment of the invention into local areas.

Then, a local image change detecting step S110 is performed by the local image change detecting unit 120. In this step, as shown in FIG. 5, a first time interval $TS_1$ is set to 0.1 (second) which is equal to an imaging period, two frame images, that is, an image at the current time $t_k$ and an image $t_{k-1}$ of a time $TS_1$ ago, among the frame images accumulated in the image accumulating unit 110 are extracted, and a change in a local area is detected. A method of dividing local areas is predetermined according to the installation of the camera CM, as shown in FIG. 6. In this embodiment, it is assumed that the total number of local areas is $N_R$. In order to correct the influence of perspective projection, the size of the local area is set such that it is large at a point close to the camera (a lower side of a screen) and is small at a point far from the camera (an upper side of the screen). A method of detecting a change using a motion vector will be described below.

(1) Calculation of Motion Vector of Each Pixel in Two Frame Images

Figure 7:
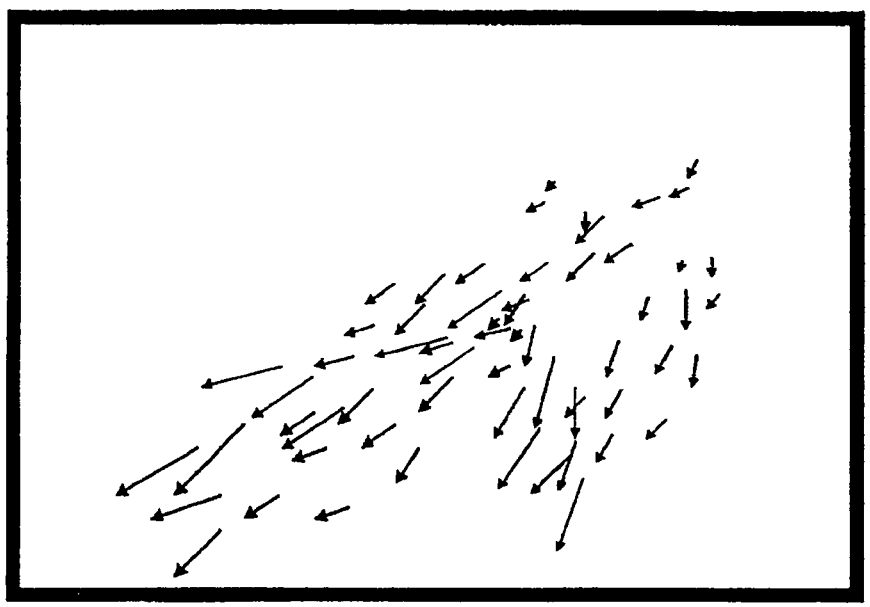
FIG. 7 is a diagram illustrating an example of motion vectors extracted by a local image change detecting unit of the situation determining apparatus according to the first embodiment of the invention.

For example, a gradient method, such as a Lucus-Kanade method disclosed in Non-Patent Document 1, or a block matching method may be used to calculate the motion vector. In this embodiment, it is preferable that a Good Features to Track method disclosed in Non-Patent Document 2 be used or only a motion vector with high reliability be used in the subsequent process by evaluation values (for example, SAD and SSD) during matching. FIG. 7 shows an example of a motion vector with high reliability among the motion vectors calculated for the entire screen from two frame images.

Non-Patent Document 1: B. D. Lucas and T. Kanade. "An iterative image registration technique with an application to stereo vision", IJCAI, 1981.

Non-Patent Document 2: Jianbo Shi, Carlo Tomasi, "Good Features to Track", IEEE Conference on Computer Vision and Pattern Recognition, pp. 593-600, 1994 (CVPR '94).

(2) Integration of Motion Vectors in Each Local Area

Hereinafter, a suffix "k" is added to the motion vector extracted from two frame images, that is, an image at the current time $t_k$ and an image $t_{k-1}$ of the time $TS_1$ ago, a suffix "i" is added to the motion vector included in an i-th local area ($1 \leq i \leq N_R$), and a suffix "j" is added to a j-th motion vector ($1 \leq j \leq NV_{k,i}$) among $NV_{k,i}$ motion vectors included in the i-th local area, which are used to represent a motion vector ($u_{k,i,j}$, $v_{k,i,j}$).

(Equation 1) and (Equation 2) are used to calculate the average value of the motion vectors, thereby calculating a representative motion vector ($mu_{k,i}$, $mv_{k,i}$) of a local area i. The length of the motion vector on the image is affected by perspective projection and is smaller than the actual movement speed of a person as it is close to the upper side of the screen. Therefore, as in (Equation 3) and (Equation 4), after the influence of the perspective projection is corrected, the motion vectors may be averaged to calculate the representative motion vector. Here, $w_{k,i,j}$ is a weight coefficient for correcting the size of a j-th motion vector in an i-th local area at the time $t_k$. The size of the motion vector is set such that it is increased as the start point of the motion vector is closer to the upper side of the screen.

$$mu_{k,i} = \frac{1}{NV_{k,i}} \sum_{j=1}^{NV_{k,i}} u_{k,i,j} \qquad \text{[Equation 1]}$$

$$mv_{k,i} = \frac{1}{NV_{k,i}} \sum_{j=1}^{NV_{k,i}} v_{k,i,j} \qquad \text{[Equation 2]}$$

$$mu_{k,i} = \frac{1}{NV_{k,i}} \sum_{j=1}^{NV_{k,i}} (w_{k,i,j} \cdot u_{k,i,j}) \qquad \text{[Equation 3]}$$

$$mv_{k,i} = \frac{1}{NV_{k,i}} \sum_{j=1}^{NV_{k,i}} (w_{k,i,j} \cdot v_{k,i,j}) \qquad \text{[Equation 4]}$$

Figure 8:
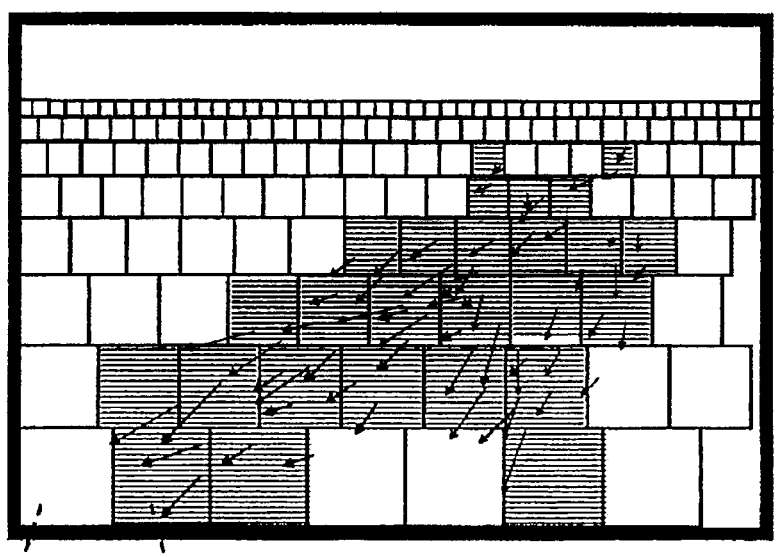
FIG. 8 is a diagram illustrating elements of local change information that is detected by the local image change detecting unit and is then accumulated in the local image change information accumulating unit in the situation determining apparatus according to the first embodiment of the invention.

(3) Threshold Value Process is Performed on Representative Motion Vector to Determine Whether there is Movement The size of the representative motion vector ($mu_{k,i}$, $mv_{k,i}$) of the i-th local area is compared with a predetermined threshold value to determine whether there is a movement. When the size of the representative motion vector is equal to or more than the threshold value, it is determined that there is a movement. When the size of the representative motion vector is less than the threshold value, it is determined that there is no movement. At that time, local change information $M_{k,i}$ representing whether there is a change (motion) in the local area i with a binary value is obtained. When it is determined that there is a movement, $M_{k,i}=1$, and if not, $M_{k,i}=0$. FIG. 8 shows an image representing local area local change information. In FIG. 8, a local area in which there is a change is hatched. The local change information $M_k$ is accumulated in the local image change information accumulating unit 130 as binary vector information corresponding to the number of local areas that indicates whether there is a change in each local area as represented by (Equation 5), as shown in FIG. 5. In FIG. 5, a frame image $I_k$ and the local image change information $M_k$ are accumulated at the time $t_k$, and a frame image $I_{k-1}$ and local image change information $M_{k-1}$ are accumulated at the time $t_{k-1}$.

$$M_k = [M_{k,1}, M_{k,2}, \ldots, M_{k,N_R}]^T \qquad \text{[Equation 5]}$$

Figure 9:
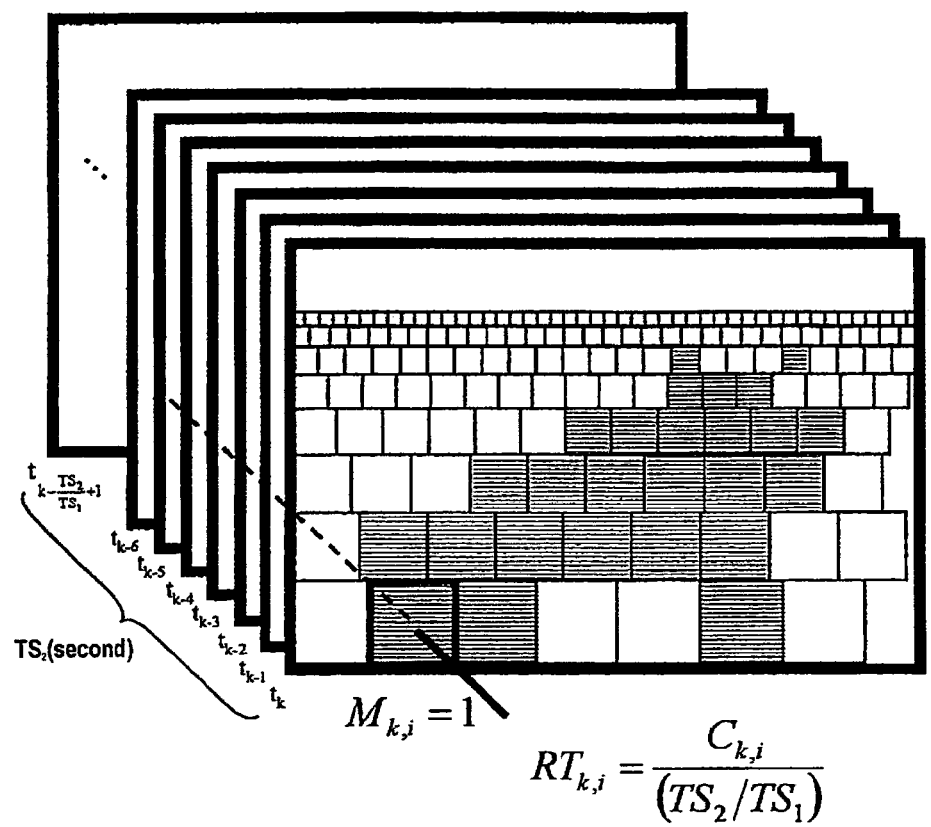
FIG. 9 is a diagram illustrating elements of a local change ratio that is calculated by a local image change ratio calculating unit and is then accumulated in a local image change ratio accumulating unit in the situation determining apparatus according to the first embodiment of the invention.
Figure 10:
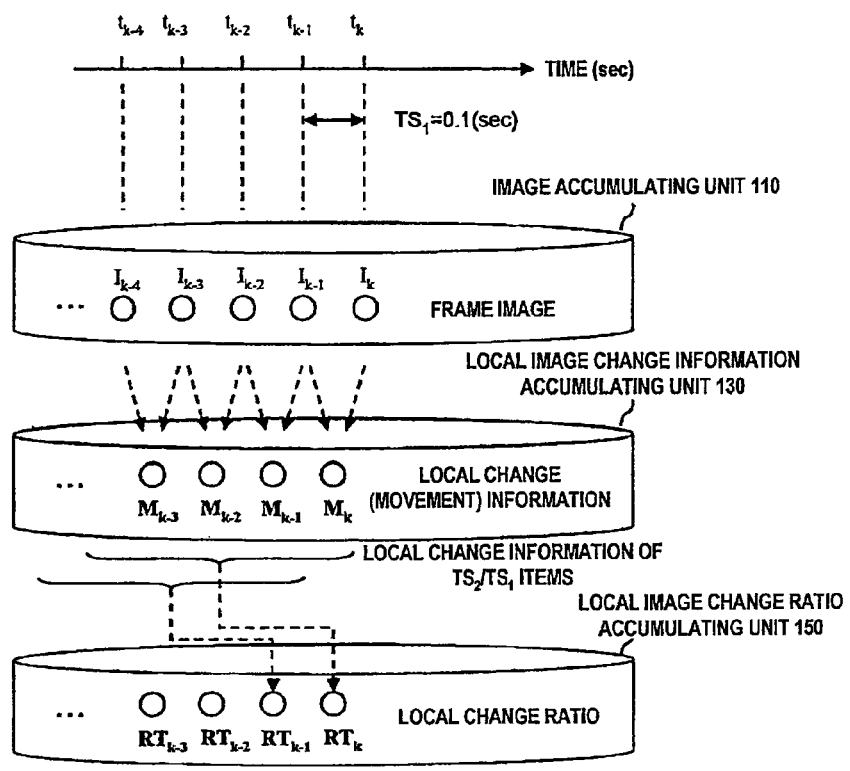
FIG. 10 is a diagram illustrating the relationship among the frame image accumulated in the image accumulating unit, the local change information accumulated in the local image change information accumulating unit, the local change ratio accumulated in the local image change ratio accumulating unit, and time in the situation determining apparatus according to the first embodiment of the invention.

Returning to FIG. 4, a local image change ratio calculating step S120 is performed by the local image change ratio calculating unit 140. In this step, a second time interval $TS_2$ is set to 10 (seconds). The change (movement) ratio of each local area at a previous time $TS_2$ (second) is calculated. Since change information is calculated at the first time interval $TS_1$, the change ratio is calculated using $TS_2/TS_1$ change information items. When $TS_1=0.1$ (second) and $TS_2=10$ (seconds), 100 change information items are used. In FIG. 9, in the i-th local area, local change information items having a value of 1 (that is, there is a change) are counted among from the local change information $M_{k,i}$ at the time $t_k$ to local change information $M_{k-TS2/TS1+1,i}$ at a time $t_{k-TS2/TS1+1}$. The count value is referred to as $C_{k,i}$. The count value is divided by a total number $TS_2/TS_1$ to calculate a local change ratio $RT_{k,i}$. The local change ratio $RT_{k,i}$ may have a value [0,1]. The local change ratio $RT_k$ is accumulated in the local image accumulating unit 150 as vector information indicating the change ratio of each local area which corresponds to the number of local areas as represented by (Equation 6), as shown in FIG. 10. In FIG. 10, the local image change ratio $RT_k$ is accumulated at the time $t_k$ and a local image change ratio $RT_{k-1}$ is accumulated at the time $t_{k-1}$.

$$RT_k = [RT_{k,1}, RT_{k,2}, \ldots, RT_{k,N_R}]^T \qquad \text{[Equation 6]}$$

Figure 11:
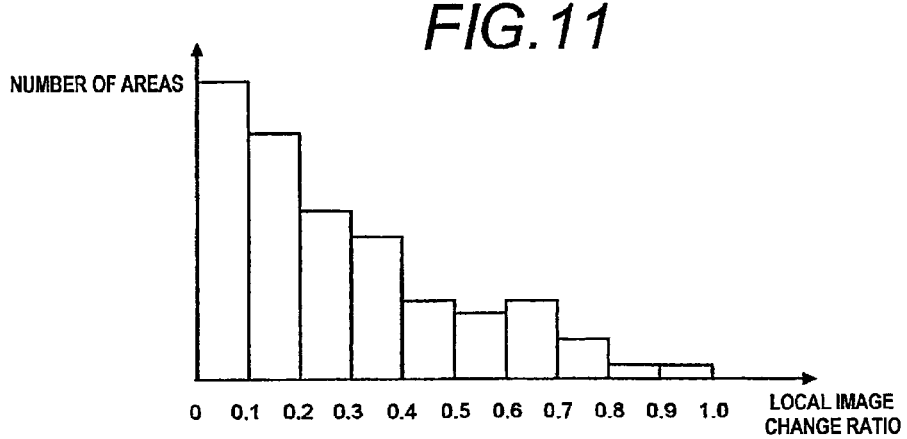
FIG. 11 is a diagram illustrating an example of a local image change ratio histogram calculated by a local image change ratio histogram calculating unit of the situation determining apparatus according to the first embodiment of the invention.

Then, a local image change ratio histogram calculating step S130 is performed by the local image change ratio histogram calculating unit 160. In this step, a histogram of $N_R$ local change ratios $RT_{k,i}$ at the current time $t_k$ is calculated. Since the local change ratio $RT_{k,i}$ can have a value of [0, 1], the number of classes is 1/BW when the width of the class of the histogram is BW. In this case, the width BW of the class is 0.1, and the number of classes is 10. FIG. 11 shows an example of the calculated local image change ratio histogram. A horizontal axis indicates the local image change ratio and a vertical axis indicates frequency (the number of areas). A total sum of frequencies (the integration value of the histogram) is a total number $N_R$ of areas.

In this embodiment, the movement situations of persons at the platform of the station shown in FIG. 2 are considered. The following three patterns are considered as the movement situations.

(1) Free Movement of Large Number of Persons

Figure 12:
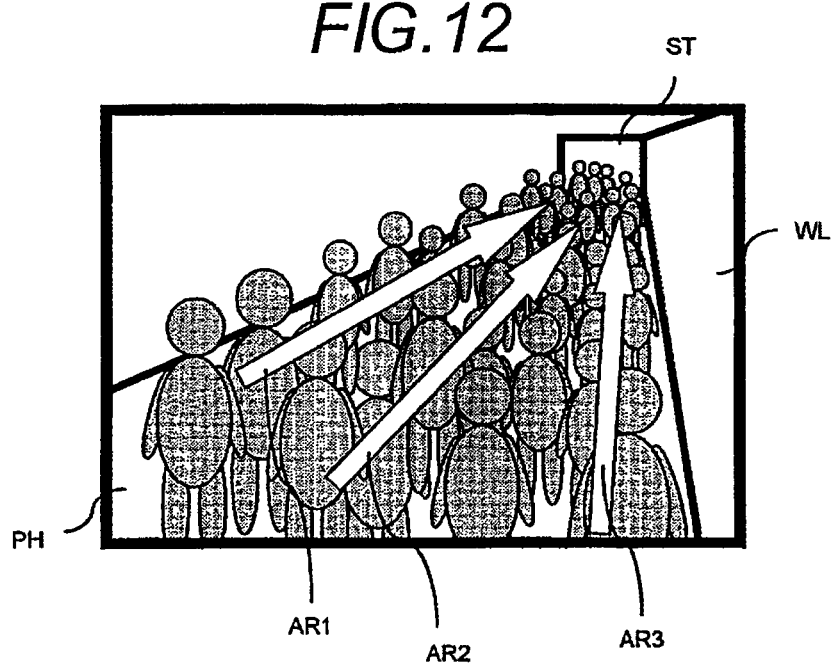
FIG. 12 is a diagram illustrating an example of an image including the movement situation of a large number of persons in the operation of the situation determining apparatus according to the first embodiment of the invention.

For example, there is a situation in which many passengers get off the train after the train arrives and move toward the staircase ST (FIG. 12). A large number of persons move through a plurality of moving routes AR1 to AR3.

(2) Free Movement of Small Number of Persons

Figure 13:
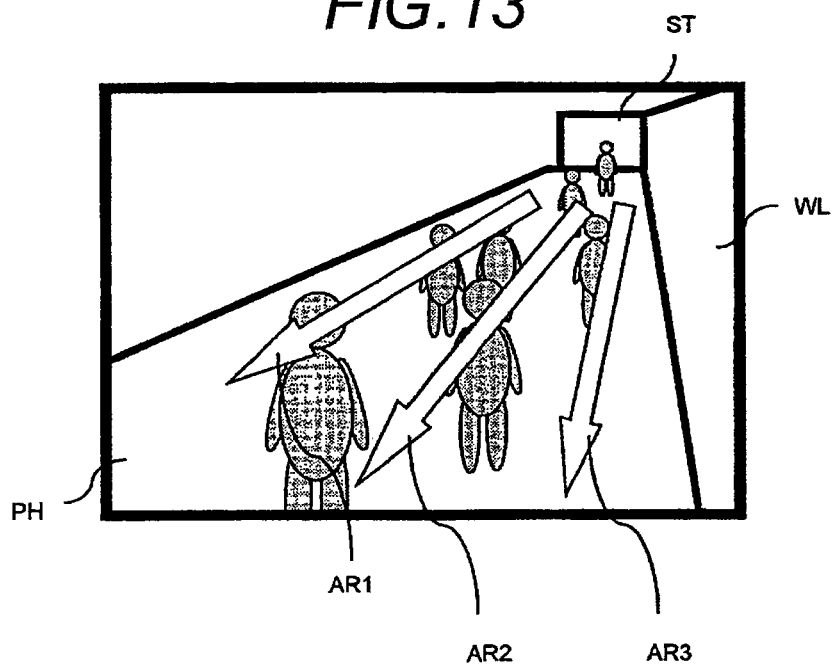
FIG. 13 is a diagram illustrating an example of an image including the movement situation of a small number of persons in the operation of the situation determining apparatus according to the first embodiment of the invention.

For example, there is a situation in which the passengers get off the train pass through the staircase ST and move through the platform where there is no passenger waiting for the next train (FIG. 13). Since a small number of persons move through an empty platform, the moving routes of the persons are changed. As a result, similar to when a large number of persons move, a small number of persons move through a plurality of moving routes AR1 to AR3.

(3) Deflection of Moving Route to One Side

Figure 14:
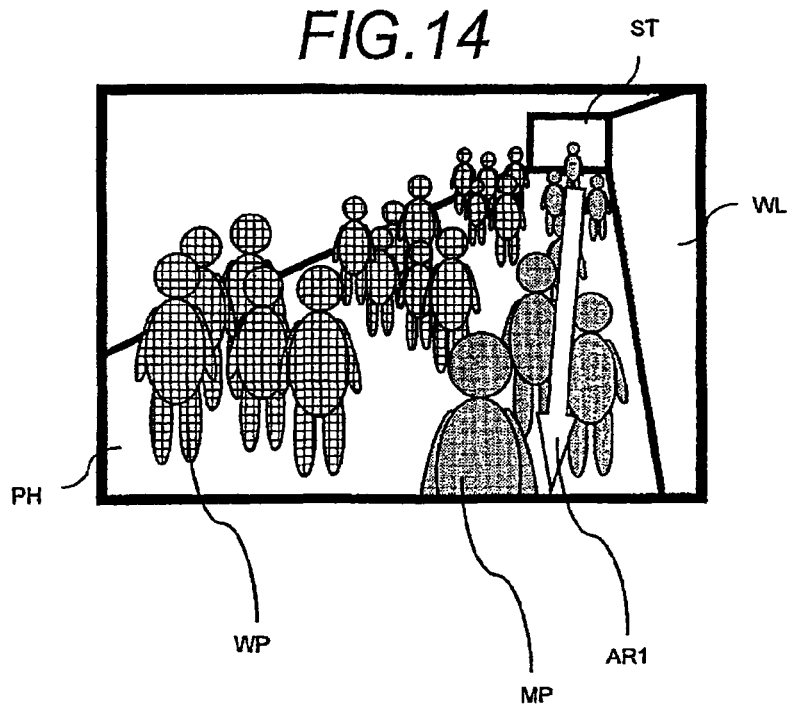
FIG. 14 is a diagram illustrating an example of an image including the movement situation of persons in a place where there is a line of persons for waiting a train, in the operation of the situation determining apparatus according to the first embodiment of the invention.

For example, there is a situation in which passengers waiting for the train are lined up and new passengers who have moved to the platform through the staircase ST move to the front side of the screen of the platform through an empty space of the platform (FIG. 14). The moving route of moving persons MP is limited to the vicinity of an arrow AR1 since there are persons WP waiting for the train.

Figure 16:
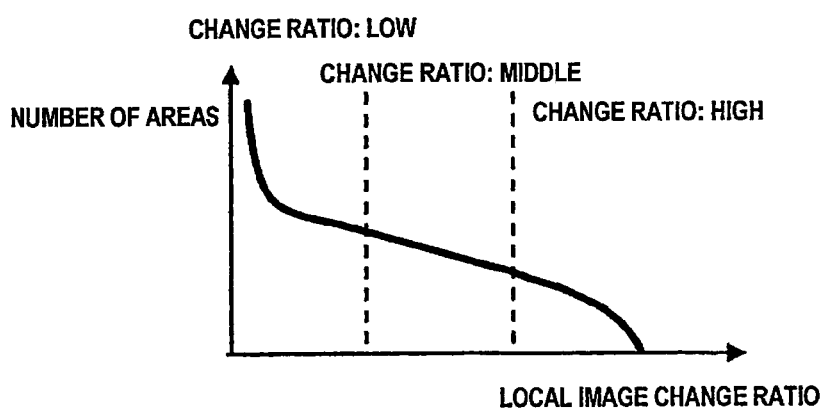
FIG. 16 is a diagram illustrating the characteristics of a local image change ratio histogram when a large number of persons move, in the operation of the situation determining apparatus according to the first embodiment of the invention.
Figure 17:
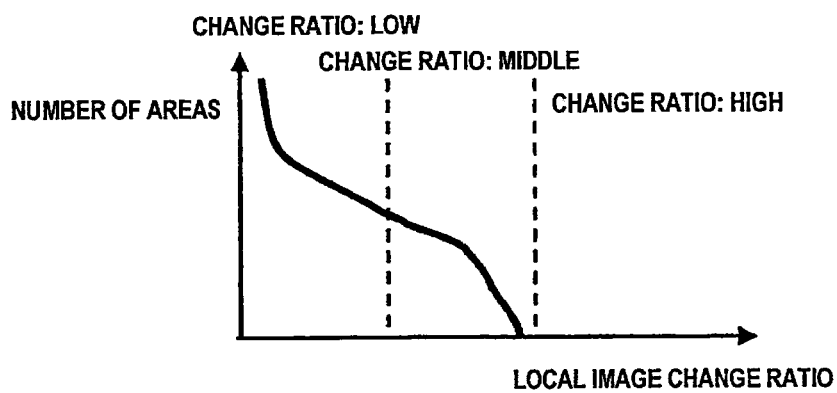
FIG. 17 is a diagram illustrating the characteristics of a local image change ratio histogram when a small number of persons move, in the operation of the situation determining apparatus according to the first embodiment of the invention.
Figure 18:
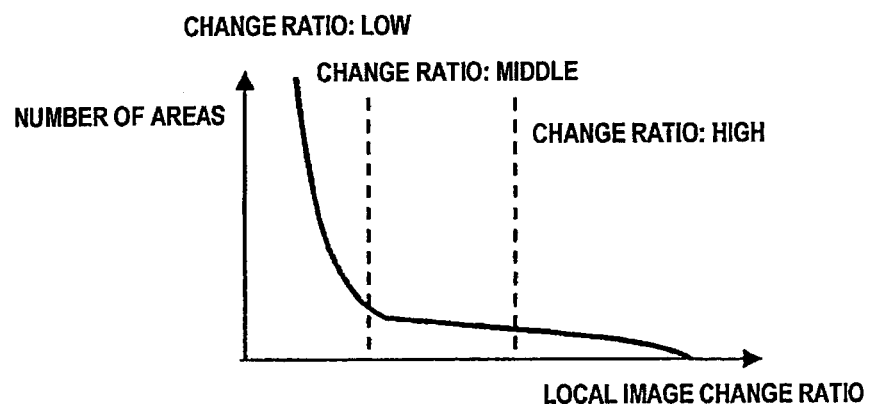
FIG. 18 is a diagram illustrating the characteristics of a local image change ratio histogram when a moving route of persons is deflected to one side, in the operation of the situation determining apparatus according to the first embodiment of the invention.

FIG. 15 shows the number of areas where a change occurs (which has a change ratio equal to or more than a predetermined value) and the size of the local image change ratio for these three movement situation patterns. FIGS. 16, 17, and 18 show typical examples of the local image change ratio histograms shown in FIG. 11 for these three moving patterns, such as (1) Movement of large number of persons, (2) Movement of small number of persons, and (3) Deflection of moving route to one side, respectively.

Figure 19:
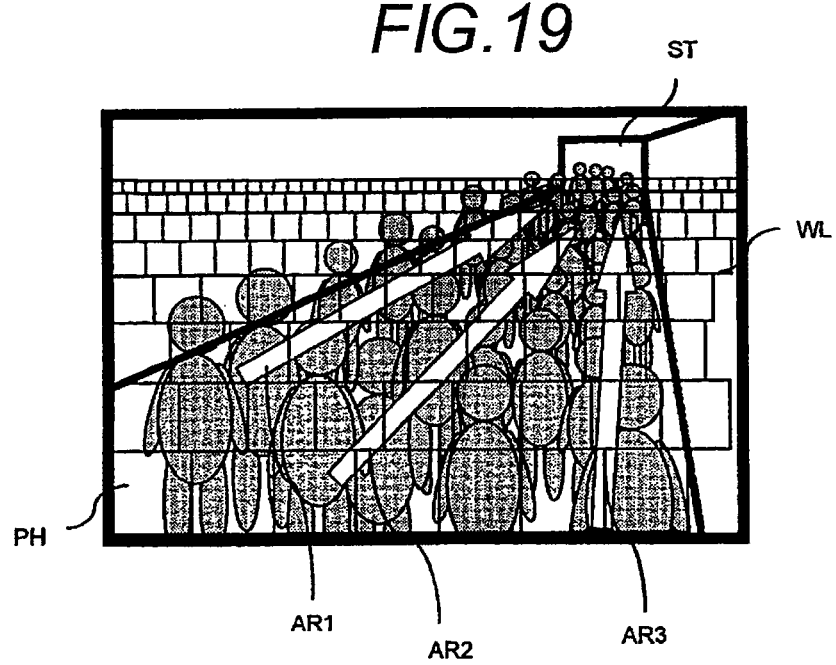
FIG. 19 is a diagram illustrating the division of an image including the movement situation of a large number of persons into local areas in the operation of the situation determining apparatus according to the first embodiment of the invention.

First, the situation in which a large number of persons move will be described supplementarily using the image shown in FIG. 19 that is obtained by performing a local area dividing process on the image shown in FIG. 12. When a large number of persons move, many areas in the image are changed (moved). Since the density of persons is high, moving persons pass through a certain local area one by one. Therefore, the local image change ratio is increased in many local areas, as shown in a first column of FIG. 15. Similarly, in the local image change ratio histogram shown in FIG. 16, there are a large number of local areas having middle to large local image change ratios.

Figure 20:
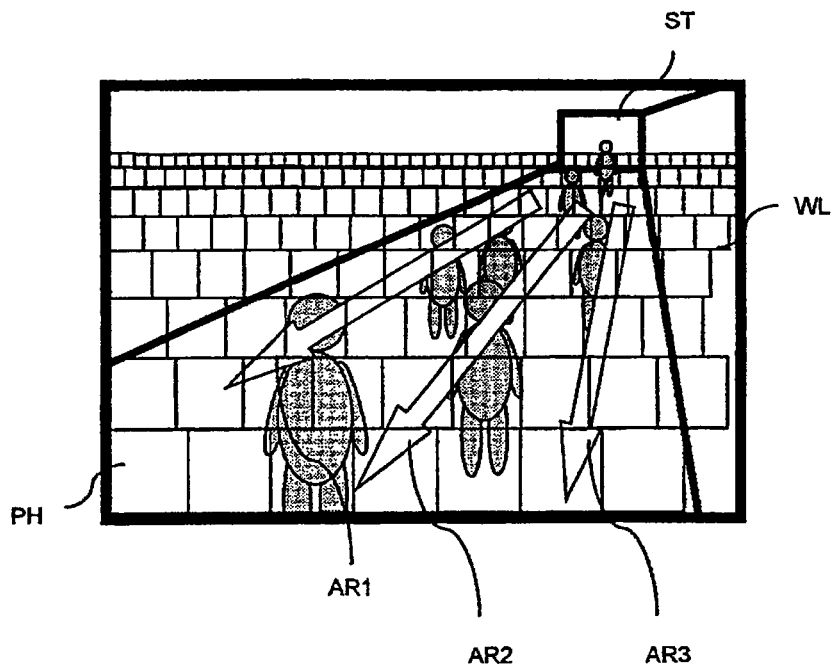
FIG. 20 is a diagram illustrating the division of an image including the movement situation of a small number of persons into local areas in the operation of the situation determining apparatus according to the first embodiment of the invention.

The situation in which a small number of persons move freely will be described supplementarily using the image shown in FIG. 20 that is obtained by performing the local area dividing process on the image shown in FIG. 13. Similar to when a large number of persons move, even when a small number of persons move, the persons pass through various routes on an empty platform. Therefore, there is a change (motion) in many areas of the image. However, since the density of persons is low, the number of moving persons passing through a certain local area is small. Therefore, the local image change ratio is low as shown in a second column of FIG. 15. Similarly, in the local image change ratio histogram shown in FIG. 17, the number of local areas having a middle local image change ratio is large, but the number of local areas having a large local image change ratio is small.

Figure 21:
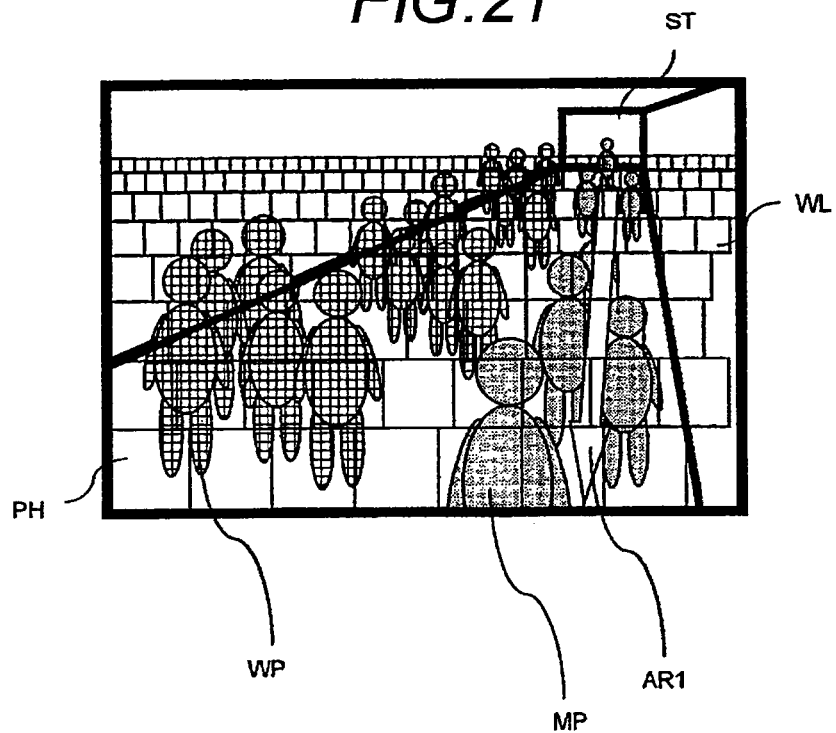
FIG. 21 is a diagram illustrating the division of an image including a situation in which a moving route of persons is deflected to one side into local areas, in the operation of the situation determining apparatus according to the first embodiment of the invention.

The situation in which the moving route is deflected to one side will be described supplementarily using the image shown in FIG. 21 that is obtained by performing the local area dividing process on the image shown in FIG. 14. When there is a line of persons waiting for the train, the moving route of persons is limited to the vicinity of the arrow AR1. Since the persons waiting for the train move little at those positions but do not move largely, an area in which a change (motion) occurs is substantially limited to the area in which there are the moving persons MP, and the number of areas in which a change occurs is small. When the number of persons moving to the platform PH through the staircase ST is equal to that when a small number of persons move (FIG. 12) and the moving route is limited, the number of persons passing through the moving route per local area is larger than that when a small number of persons move, as shown in a third column of FIG. 15. Similarly, in the local image change ratio histogram shown in FIG. 18, the number of local areas having middle and large local image change ratios is smaller than that when a large number of persons move as shown in FIG. 16. However, unlike when a small number of persons move as shown in FIG. 17, there is at least a local area having a large local image change ratio.

As described above, the local image change ratio histogram is calculated in the local image change ratio histogram calculating step S130 (local image change ratio histogram calculating unit 160).

Figure 22:
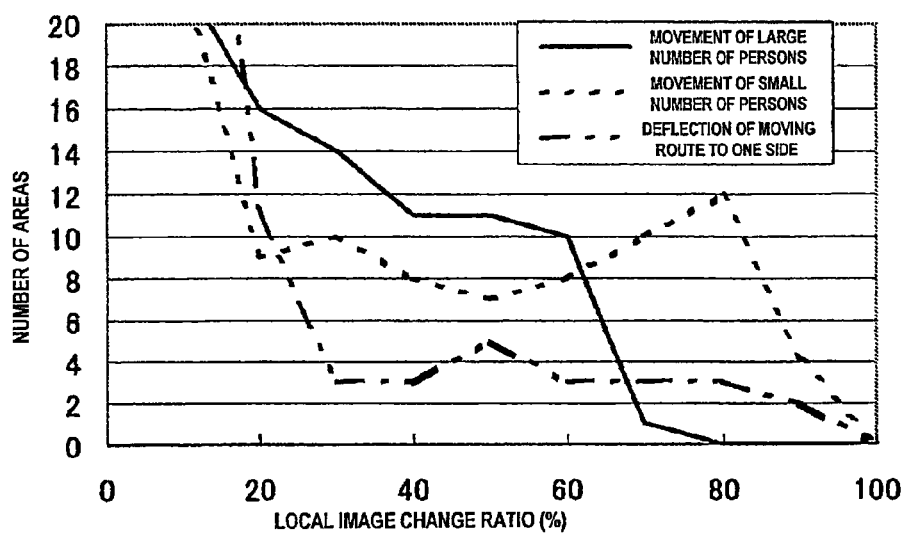
FIG. 22 is a diagram illustrating an example of a local image change ratio histogram calculated from an actual moving image in the operation of the situation determining apparatus according to the first embodiment of the invention.

FIG. 22 shows local image change ratio histograms extracted from three scenes of an actual moving image (the movement of a large number of persons, the movement of a small number of persons, and the deflection of moving routes to one side). Each of the local image change ratio histograms corresponds to the histogram of a local change ratio $RT_{k'}$ at a time $t_{k'}$ (in this case, the local change ratio is calculated at the time $t_{k'}$, but as described with reference to FIG. 10, the local change ratio at a certain time is calculated from the previous $TS_2/TS_1$ local change information items). FIG. 22 shows the results when the total number $N_R$ of local areas=162, $TS_1$=0.1 (second), $TS_2$=10 (seconds), and the width BW of the class of the histogram=0.1. As can be seen from FIG. 22, the tendency is the same as those shown in FIGS. 16, 17, and 18.

Then, a situation determining step S140 is performed by the situation determining unit 170. In three situations, such as the movement of a large number of persons, the movement of a small number of persons, and the deflection of moving routes to one side, the local image change ratio histograms have the respective shapes shown in FIGS. 16, 17, and 18, as described above. In this embodiment, the local image change ratio histograms are calculated in advance in the above-mentioned three situations and are then stores as reference histograms, and the reference histograms are compared with a local image change ratio histogram in the determined situation, thereby determining one of the three situations.

Figure 23:
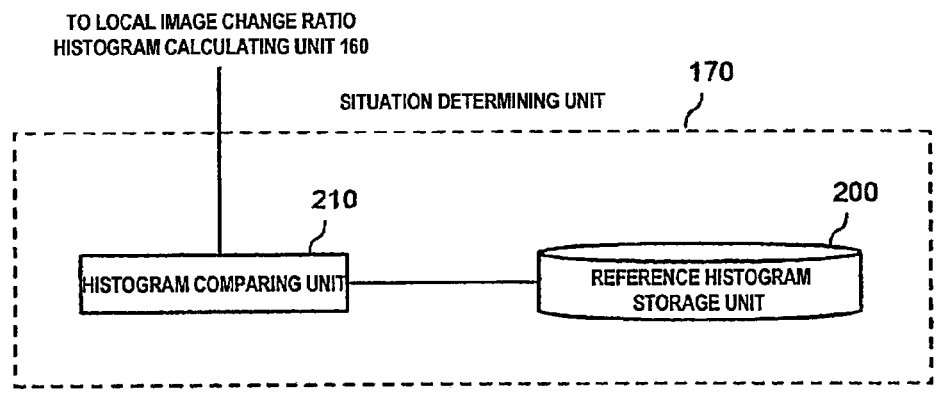
FIG. 23 is a block diagram illustrating the internal structure of a situation determining unit of the situation determining apparatus according to the first embodiment of the invention.

FIG. 23 is a diagram illustrating the internal structure of the situation determining unit 170 according to this embodiment. The situation determining unit 170 includes a reference histogram storage unit 200 and a histogram comparing unit 210. At least one reference local image change ratio histogram, which has been calculated previously, corresponding to each situation is stored in the reference histogram storage unit 200 so as to be associated with the corresponding situation (any one of the movement of a large number of persons, the movement of a small number of persons, and the deflection of moving routes to one side). The histogram comparing unit 210 compares the local image change ratio histogram in the situation to be determined that is calculated by the local image change ratio histogram calculating unit 160 with the reference histograms stored in the reference histogram storage unit 200. Then, it is determined which of the local image change ratio histograms in non-determined situations is most similar to the reference histogram, and the situation associated with the most similar histogram is output as the determination result of the situation. For example, histogram intersection of (Equation 7), a Bhattaccharyya coefficient of (Equation 8), or normalized correlation of (Equation 9) is used as a method of calculating similarity between the histograms.

$$s = \sum_{u=1}^{m} w_u \min(p_u, q_u) \quad \text{[Equation 7]}$$

$$s = \sum_{u=1}^{m} \sqrt{p_u \cdot q_u} \quad \text{[Equation 8]}$$

$$s = \frac{\sum_{u=1}^{m} p_u \cdot q_u}{\sqrt{\sum_{u=1}^{m} p_u} \sqrt{\sum_{u=1}^{m} q_u}} \quad \text{[Equation 9]}$$

Returning to FIG. 4, finally, Step S150 is performed by a control unit (not shown in FIG. 1). When the operator of the apparatus uses an input unit (not shown in FIG. 1) to input a process end instruction, the process returns to the image input step S100 to process the next frame image. When the process end instruction is not input, the process ends.

Figure 24:
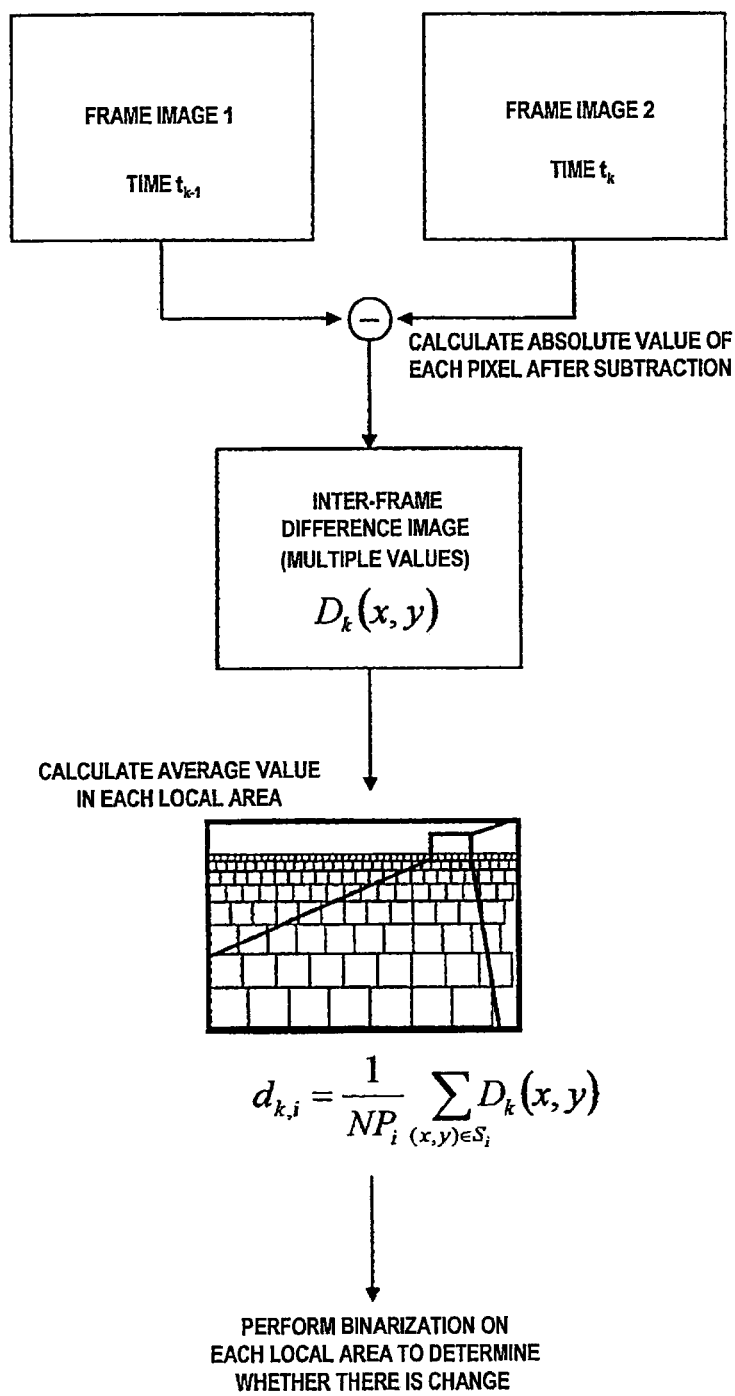
FIG. 24 is a diagram illustrating another example of the process of the local image change detecting unit of the situation determining apparatus according to the first embodiment of the invention.

In this embodiment, in the local image change detecting step S110 performed by the local image change detecting unit 120, the motion vector is used in order to detect a change in the local area between two frame images separated at a time interval $TS_1$ among the frame images accumulated in the image accumulating unit 110. However, other methods may be used. When the motion vector is used, it is possible to find the moving direction or speed. As a result, it is possible to more accurately determine situations or the degree of congestion. The difference between frames may be used to simply detect whether there is a change. As shown in FIG. 24, when the difference between two frames captured at the time $t_{k-1}$ and the time $t_k$ is calculated, an image $D_k(x, y)$ in which the value of each pixel is composed of a difference in brightness (multiple values) is obtained. It may be determined whether there is a change in each local area on the basis of whether the average value $d_{k,i}$ of the difference in brightness in the local area i is equal to or more than a predetermined threshold value. In FIG. 24, $S_i$ indicates a set of pixels forming an area i and $NP_i$ indicates the number of elements thereof.

Figure 25:
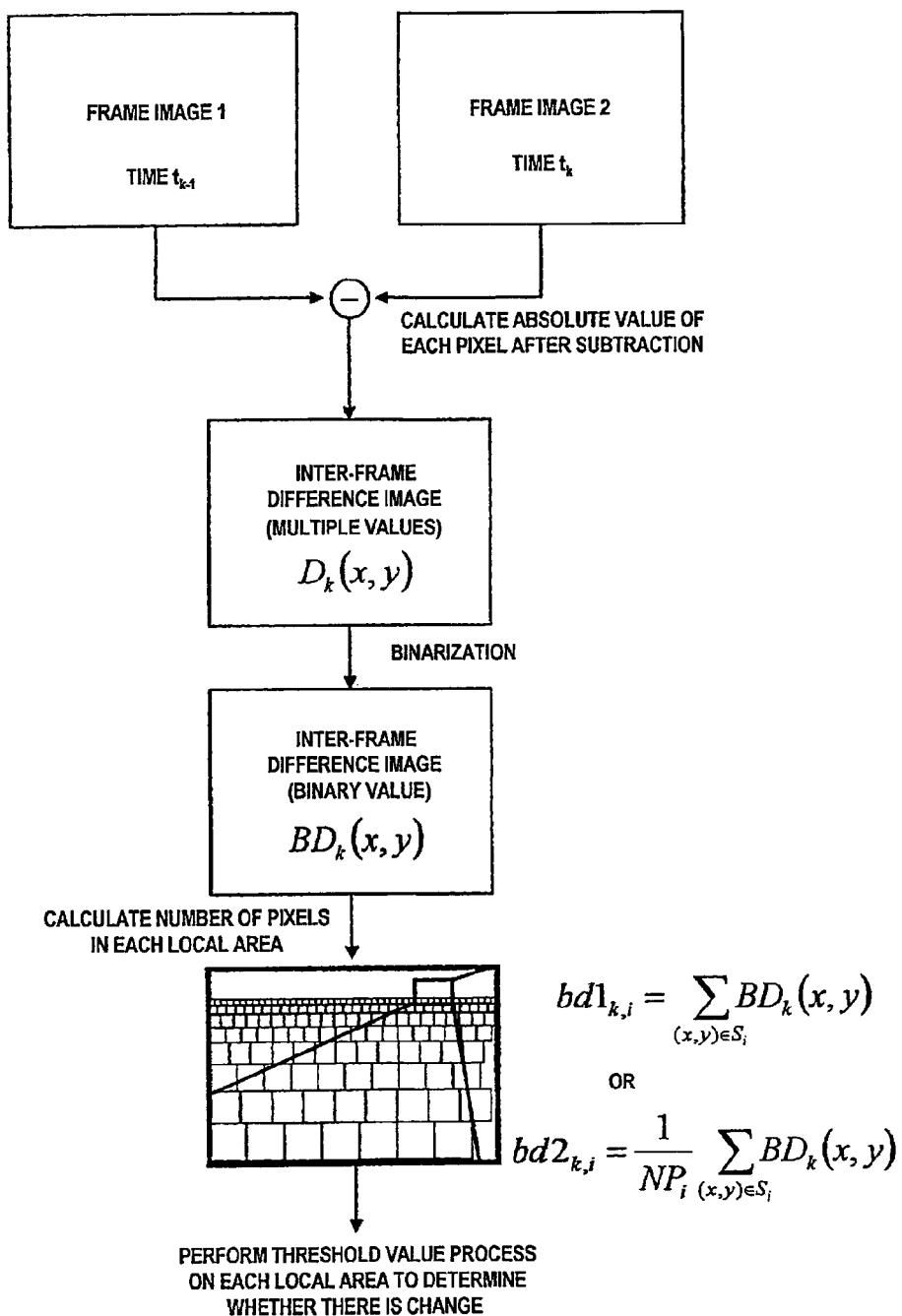
FIG. 25 is a diagram illustrating another example of the process of the local image change detecting unit of the situation determining apparatus according to the first embodiment of the invention.

As shown in FIG. 25, after the difference image $D_k(x, y)$ in which the value of each pixel is composed of a difference in brightness is obtained, binarization indicating whether there is a change may be performed to obtain a binarized difference image $BD_k(x, y)$, and it may be determined whether there is a change in each local area on the basis of the number $bd1_{k,i}$ of pixels that are changed in the local area. When the local areas have different areas, it may be determined whether there is a change in each local area on the basis of $bd2_{k,i}$ obtained by dividing (normalizing) the number of pixels that are changed by the area of the local area.

Figure 26:
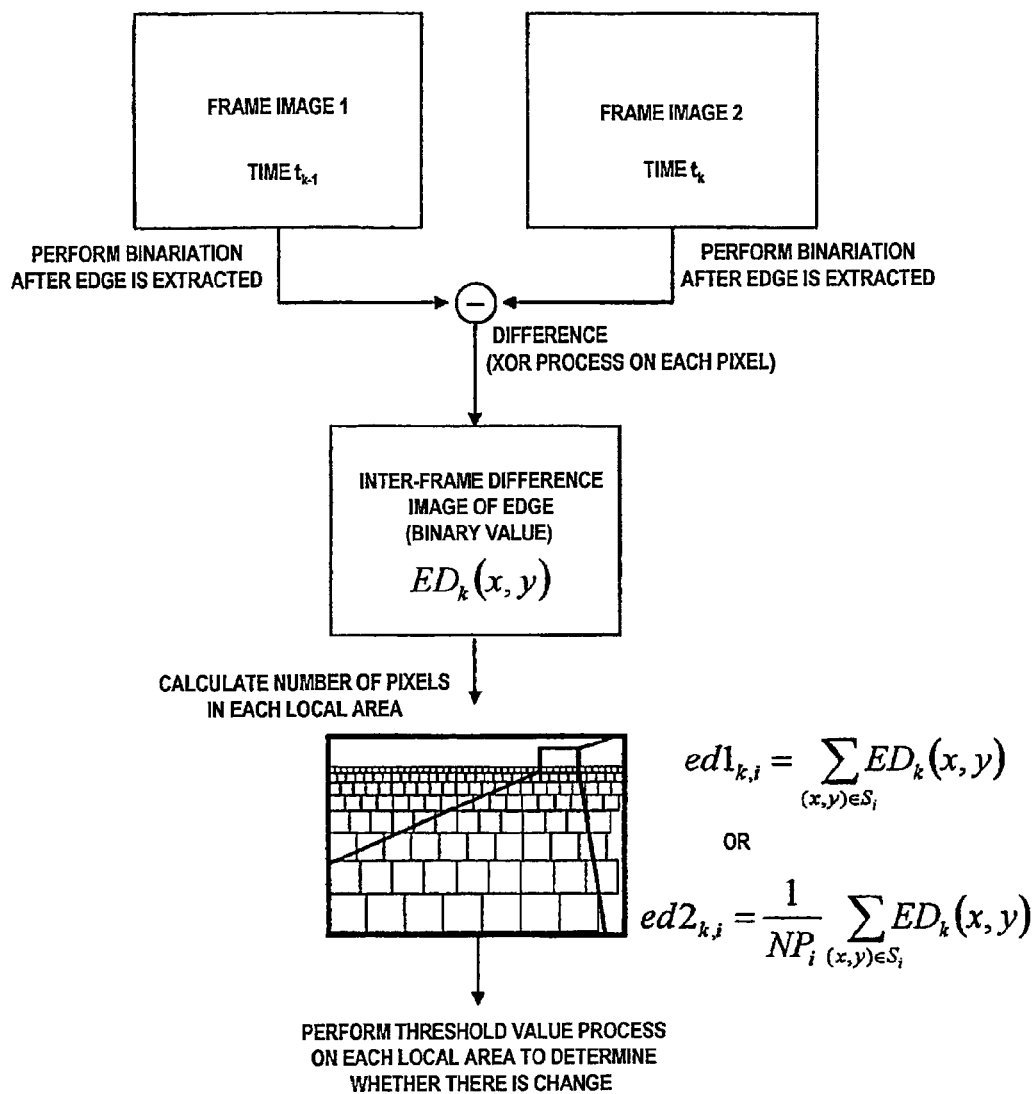
FIG. 26 is a diagram illustrating another example of the process of the local image change detecting unit of the situation determining apparatus according to the first embodiment of the invention.

When the difference between frames is obtained on the basis of the brightness value, the image is affected by a variation in illumination. Therefore, as shown in FIG. 26, the difference between the images obtained by performing edge extraction and binarization on an input image (XOR operation on each pixel) may be calculated to obtain an inter-frame difference image $ED_k(x, y)$ at the edge, and it may be determined whether there is a change in each local area on the basis of the number $ed1_{k,i}$ of pixels that are changed in the local area. When the local areas have different areas, it may be determined whether there is a change in each local area on the basis of $ed2_{k,i}$ obtained by dividing (normalizing) the number of pixels that are changed by the area of the local area.

As described above, according to the situation determining apparatus of this embodiment, the time change ratio of the brightness value in a local area of the captured images and the histogram of the time change ratios of a plurality of local areas are analyzed to determine the movement situation of persons. In particular, it is possible to simply detect that the moving route is deflected to one side. Therefore, for example, in the place where there is a line of persons waiting for the train, such as the station, it is possible to estimate the line of persons waiting for the train. When the deflection of the moving route to one side is detected in a passage where persons are not generally lined up, it is possible to estimate an obstacle to the free movement of persons.

Second Embodiment

The structure of a situation determining apparatus according to a second embodiment of the invention is the same as that of the situation determining apparatus according to the first embodiment of the invention, which is shown in FIG. 1. Therefore, a description thereof will be omitted. In the first embodiment, the situation determining unit 170 has the internal structure shown in FIG. 23, but the situation determining apparatus according to this embodiment has the internal structure shown in FIG. 27. That is, the situation determining unit 170 includes a feature extracting unit 300, an identification reference storage unit 310, and an identifying unit 320. The feature extracting unit 300 extracts the amount of features for determining a situation or the degree of congestion from the histogram calculated by the local image change ratio histogram calculating unit 160. The relationship between the amount of features for determining a situation or the degree of congestion, which is extracted by the feature extracting unit 300, and the kind of situation or a congestion index is stored in the identification reference storage unit 310 in advance. The identifying unit 320 identifies the kind of situation or the degree of congestion on the basis of the amount of features extracted by the feature extracting unit 300 and the identification reference stored in the identification reference storage unit 310.

Figure 4:
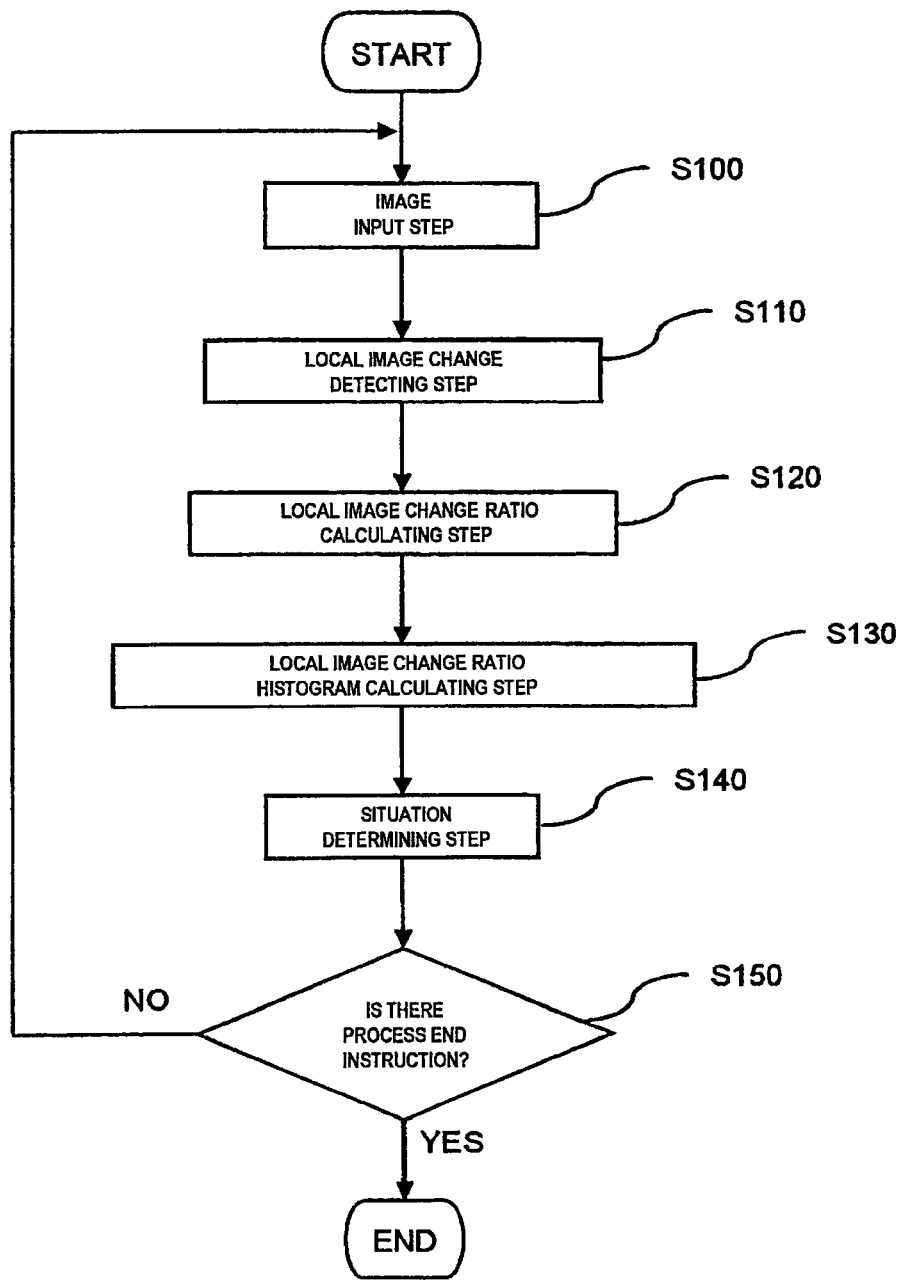
FIG. 4 is a flowchart illustrating a situation determining method performed by the situation determining apparatus according to the first embodiment of the invention.

The flowchart of a method of determining a situation according to this embodiment is the same as that according to the first embodiment shown in FIG. 4. In this embodiment, the process up to the local image change ratio histogram calculating step S130 and the process of Step 150 are the same as those in the first embodiment, and a description thereof will be omitted.

Next, an operation in the situation determining step S140 will be described with reference to a block diagram shown in FIG. 27. First, the feature extracting unit 300 extracts the amount of features for determining a situation or the degree of congestion from the histogram calculated by the local image change ratio histogram calculating unit 160. In this case, the feature extracting unit 300 extracts the amount of two-dimensional features from the local image change ratio histogram. The amount of features is extracted by the following method.

(1) In the local image change ratio histogram, the number of areas having a middle change ratio or more (threshold value $TH_1$) is counted, and the number of areas is $RN_1$.

(2) In the local image change ratio histogram, the number of areas having a large change ratio (equal to or more than a threshold value $TH_2$; $TH_2 > TH_1$) is counted, and the number of areas is $RN_2$.

Figures 27, 28, 29:
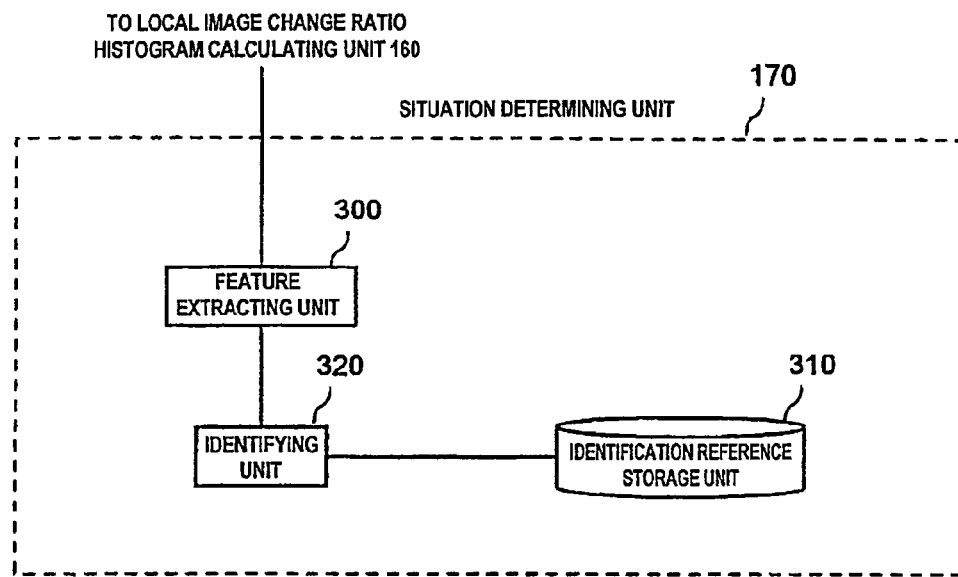
FIG. 27 is a block diagram illustrating the internal structure of a situation determining unit of a situation determining apparatus according to a second embodiment of the invention.
FIG. 28 is a diagram illustrating the value of an index calculated in the extraction of the amount of features by a feature extracting unit of the situation determining apparatus according to the second embodiment of the invention.
FIG. 29 is a diagram illustrating the amount of features extracted by the feature extracting unit of the situation determining apparatus according to the second embodiment of the invention.

(3) If $RN_1$ is not equal to 0, $(f_1, f_2) = (RN_1/N_R, RN_2/RN_1)$ is the amount of features, and if $RN_1$ is equal to 0, $(f_1, f_2) = (RN_1/N_R, 0)$ is the amount of features.

when $TH_1 = 0.4$ and $TH_2 = 0.7$, $RN_1$ and $RN_2$ in each of the three situations shown in FIG. 22 (the movement of a large number of persons, the movement of a small number of persons, and the deflection of moving routes to one side) have the values in the table shown in FIG. 28, and $f_1$ and $f_2$ in each of the three situations have the values in the table shown in FIG. 29.

Figure 30:
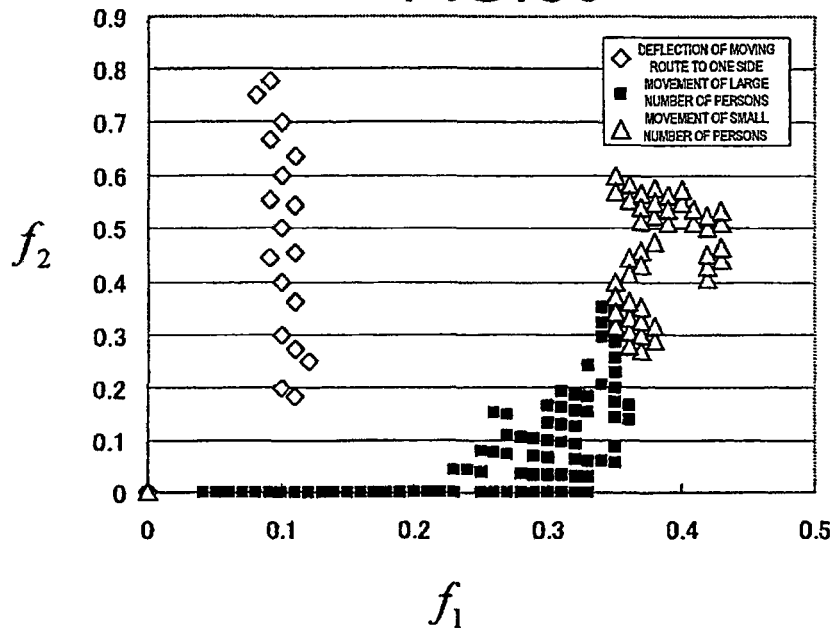
FIG. 30 is a diagram illustrating the distribution of the amount of two-dimensional features extracted from three scenes of images by the feature extracting unit of the situation determining apparatus according to the second embodiment of the invention.

In addition, the relationship between the amount of features for determining a situation or the degree of congestion, which is extracted by the feature extracting unit 300, and the kind of situation or a congestion index is calculated in advance and is then stored in the identification reference storage unit 310. FIG. 30 shows the distribution of the amount of two-dimensional features $(f_1, f_2)$ that is extracted in advance from three scenes of images. In the distribution, each point is extracted from the local change ratio histogram at a certain time. That is, features are extracted from each of the three scenes at a plurality of times. The distribution shown in FIG. 30 is used as information stored in the identification reference storage unit 310.

The identifying unit 320 identifies the kind of situation or the degree of congestion on the basis of the amount of features extracted from the feature extracting unit 300 and the identification reference stored in the identification reference storage unit 310.

Figure 31:
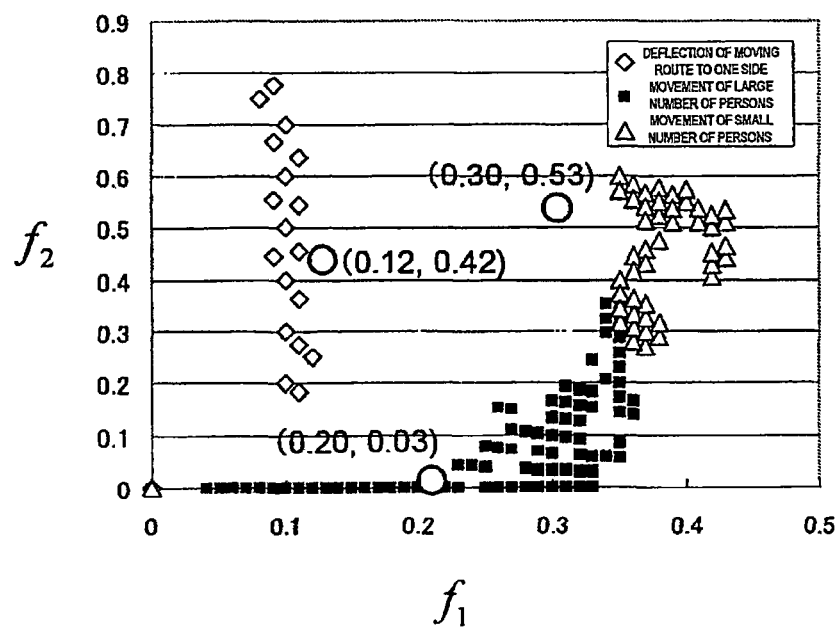
FIG. 31 is a diagram illustrating the relationship between the amount of features and the distribution of the amount of two-dimensional features extracted by the feature extracting unit of the situation determining apparatus according to the second embodiment of the invention.

Next, a method of identifying the kind of situation will be described. It is assumed that the information shown in FIG. 30 is stored in the identification reference storage unit 310. It is assumed that each of the histograms calculated by the local image change ratio histogram calculating unit 160 is any one of the histograms shown in FIG. 22 and the kind of situation thereof is not known. In this case, the amount of features extracted by the feature extracting unit 300 is a set of values in any one of the rows in the table shown in FIG. 29. A feature point of the amount of features stored in the identification reference storage unit 310 that is closest to the amount of features extracted by the feature extracting unit 300 is searched (nearest neighboring method), and the kind of situation associated with the feature point is output. In this way, it is possible to determine the situation of a scene corresponding to the amount of features extracted by the feature extracting unit 300. FIG. 31 shows the relationship between each value shown in the table of FIG. 29 and the distribution of the amount of two-dimensional features $(f_1, f_2)$ shown in FIG. 30. It is possible to accurately determine a situation using the nearest neighboring method.

The nearest neighboring method has been described above, but the invention is not limited thereto. Any method may be used which identifies an unknown sample using a plurality of supervised training samples. For example, a support vector machine (SVM), a discriminant analysis method (linear discriminant analysis method or a secondary discriminant analysis method), or a neural network may be used. Since the methods are disclosed in various documents, a description thereof will be omitted. For example, the SVM is disclosed in Non-Patent Document 3 and the discriminant analysis method is disclosed in Non-Patent Document 4.

Non-Patent Document 3: Nello Cristianini, John Shawe-Taylor, Translated by Tsuyoshi Ohkita, Kyoritsu Shuppan Co., Ltd., "An introduction to Support Vector Machine", Non-Patent Document 4: Haruo Yanai, and others, "Multivariate Analysis, Modern Statistics 2", Asakura Publishing Co., Ltd., January, 1979.

Next, a method of determining the degree of congestion will be described. First, a change in indexes $RN_1$ and $RN_2$ and a change in the amount of features $f_1$ and $f_2$ during congestion will be described in the case of free movement (when the moving route is not limited) and when the moving route is deflected to one side.

<In Case of Free Movement (when Moving Route is not Limited)>

Figure 32:
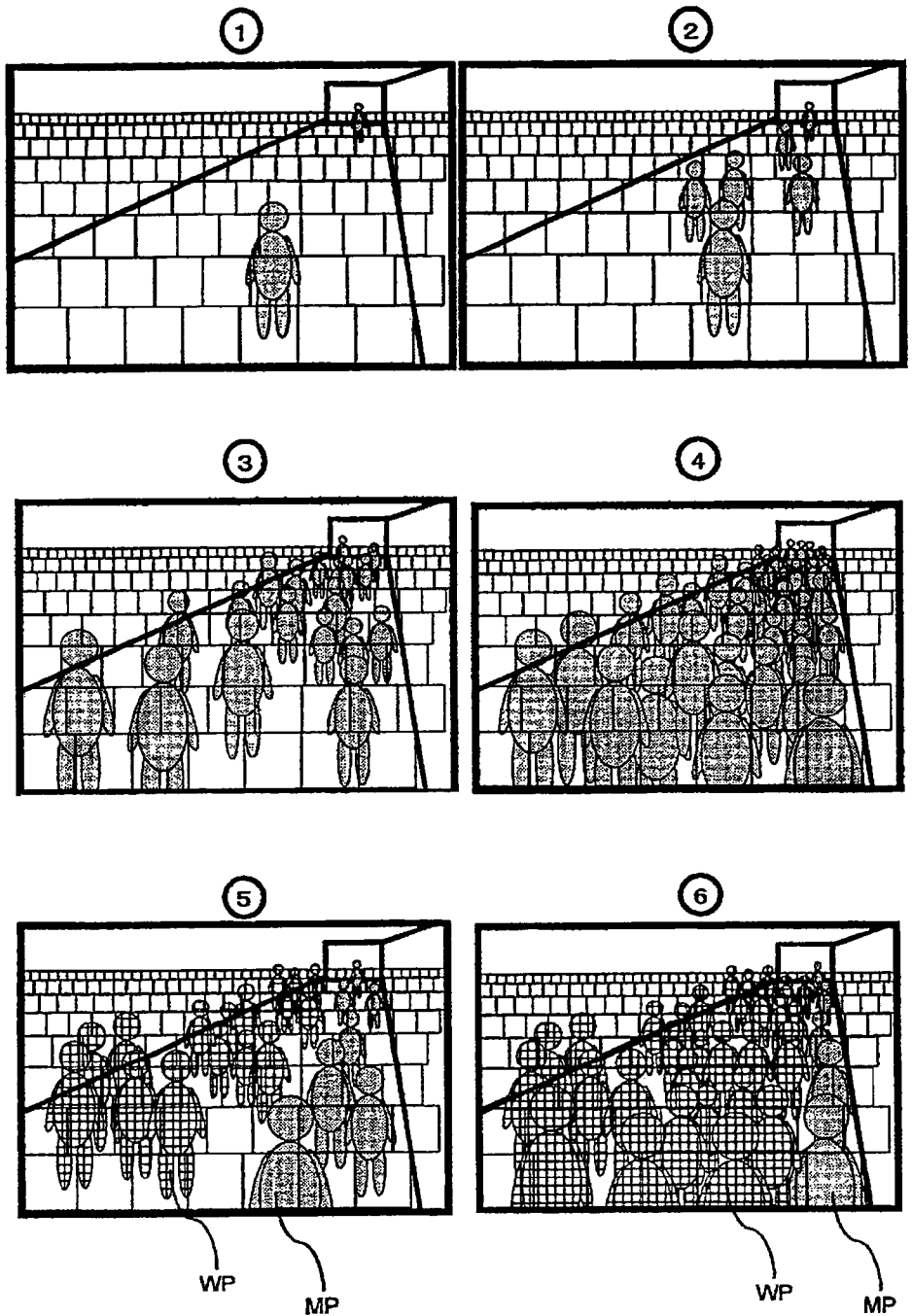
FIG. 32 is a diagram illustrating six scenes of images captured at a platform of a station which are used to describe a congestion determining process of the situation determining apparatus according to the second embodiment of the invention.

When a state [1] is changed to a state [2] in FIG. 32 (in FIG. 32, a numerical number is in a circle, which is the same with other numerical values 3 to 6), the number $RN_1$ of areas having a middle local image change ratio or more is increased, but the number $RN_2$ of areas having a large local image change ratio is not largely increased. The reason is that, in the situation in which the moving route is limited, when the number of persons is increased, the persons pass through various routes (the persons are less likely to pass through the same route). Therefore, the position is changed from [1] to [2] in FIG. 33 in a two-dimensional feature amount space $(f_1, f_2)$ due to an increase in the feature amount $f_1$.

In FIG. 32, a state [3] indicates that the moving routes of the persons are distributed substantially in the entire region of the platform of the station. In FIG. 32, when a state is changed from [2] to [3], similar to the change from [1] to [2], the position is changed from [2] to [3] in FIG. 33 in the two-dimensional feature amount space $(f_1, f_2)$ due to an increase in the feature amount $f_1$.

In a state [4] of FIG. 32, since the density of persons is increased, the number of areas having a large local image change ratio is increased. An increasing rate of the number $RN_1$ of areas having a middle local image change ratio or more is more than that of the number $RN_2$ of areas having a large local image change ratio. In the two-dimensional feature amount space $(f_1, f_2)$, the position is changed from [3] to [4] in FIG. 33 (the plotted points of the amount of features are more likely to move).

Figure 33:
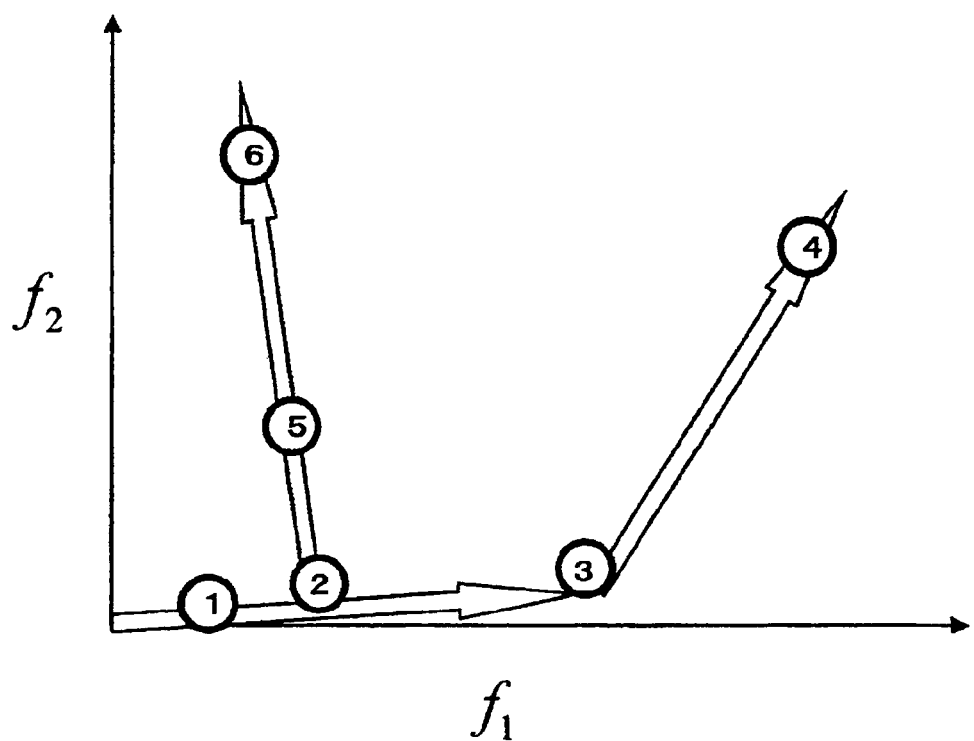
FIG. 33 is a diagram illustrating the distribution of the amount of features corresponding to six scenes in a two-dimensional feature space which is used to describe the congestion determining process of the situation determining apparatus according to the second embodiment of the invention.

When the state is changed in the order of [4]→[3]→[2]→[1] in FIG. 32, the amount of features is moved in an opposite order of [4]→[3]→[2]→[1] in the feature amount space of FIG. 33.

<When Moving Route is Deflected to One Side>

The movement of the plotted points in the feature amount space of FIG. 33 when the state is changed from [1] to [2] in FIG. 32 is the same as that during the free movement. A line of persons waiting for the train starts to be formed from the state [2]. In the state [5] of FIG. 32 in which a line of persons starts to be formed, the moving route of the persons is limited by the line of persons. Once the moving route is limited by a line of persons, the number $RN_1$ of areas having a middle local image change ratio or more reaches the peak. When the number of persons lined up is increased and the moving route is further limited, the index $RN_1$ is reduced. For the other index $RN_2$, when persons passes through an area at a constant rate, the number of persons passing through the area per unit time is increased since the moving route of the persons is limited, which results in an increase in the index $RN_2$. In the two-dimensional feature amount space $(f_1, f_2)$ of FIG. 33, the position is changed from [2] to [5].

In a state [6] of FIG. 32, the number of persons lined up is further increased, and the moving route of the persons is further limited. Therefore, the number $RN_1$ of areas having a middle local image change ratio or more is reduced and the number $RN_2$ of areas having a large local image change ratio is increased. In the two-dimensional feature amount space $(f_1, f_2)$ of FIG. 33, the position is changed from [5] to [6].

Next, a method of calculating the degree of congestion will be described. Here, an example using a subspace method will be described. The details of the subspace method are disclosed in Chapter 14 of Non-Patent Document 5. Here, only the outline of the subspace method will be described. First, processes (1) and (2) are performed.

(1) A plurality of feature amounts is extracted for each of the three situations, that is, the movement of a large number of persons, the movement of a small number of persons, and the deflection of a moving route to one side, thereby calculating the distribution shown in FIG. 30.

Figure 34:
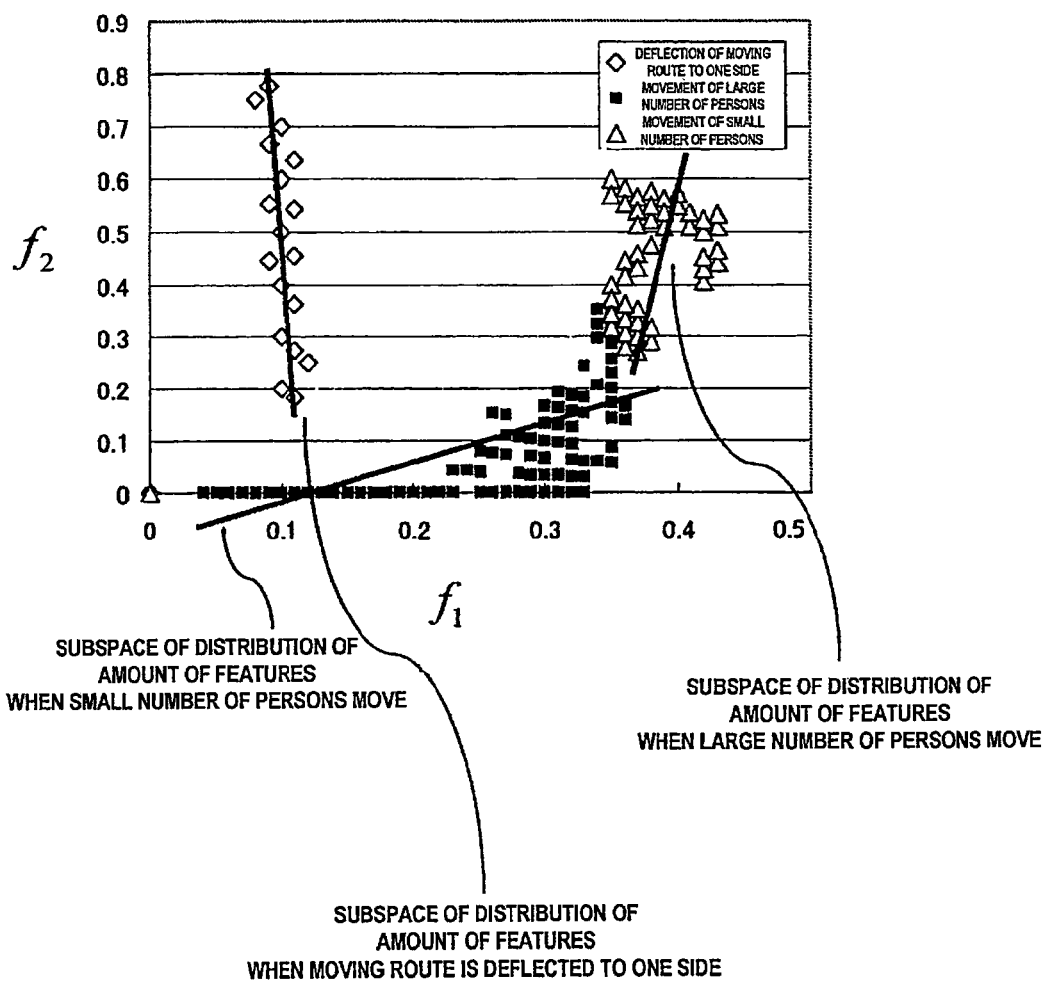
FIG. 34 is a diagram illustrating the distribution of the amount of features in three situations, which is used to describe the congestion determining process of the situation determining apparatus according to the second embodiment of the invention, and subspaces of the distribution obtained in the three situations.

(2) A main component analysis process is performed on the two-dimensional distribution of each situation, and a straight line of a first main component (main axis) is used as a one-dimensional subspace. FIG. 34 shows the subspaces of three situations.

A method of determining a situation including the amount of features extracted from a scene from which the degree of congestion will be calculated, and a method of calculating the degree of congestion will be described in (3).

Figure 35:
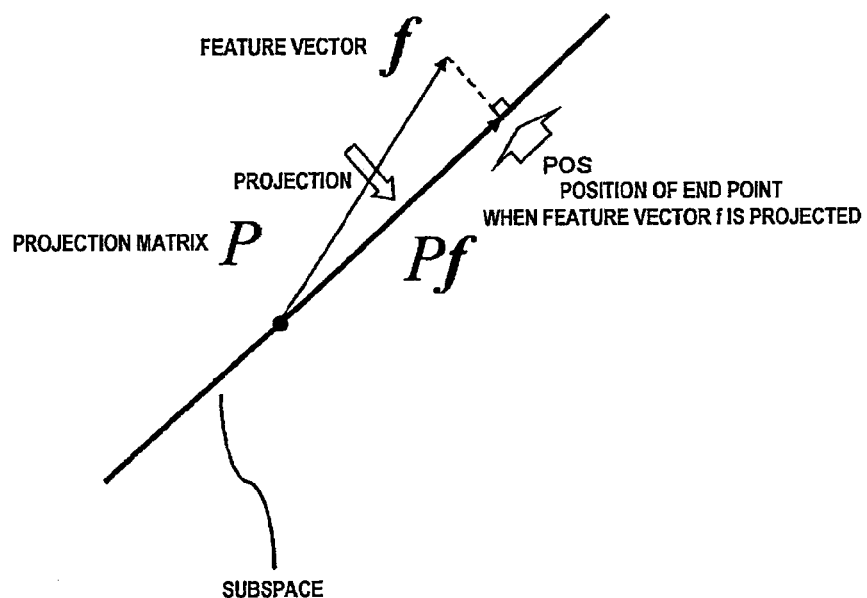
FIG. 35 is a diagram illustrating a subspace method which is used to describe the congestion determining process of the situation determining apparatus according to the second embodiment of the invention.
Figure 36:
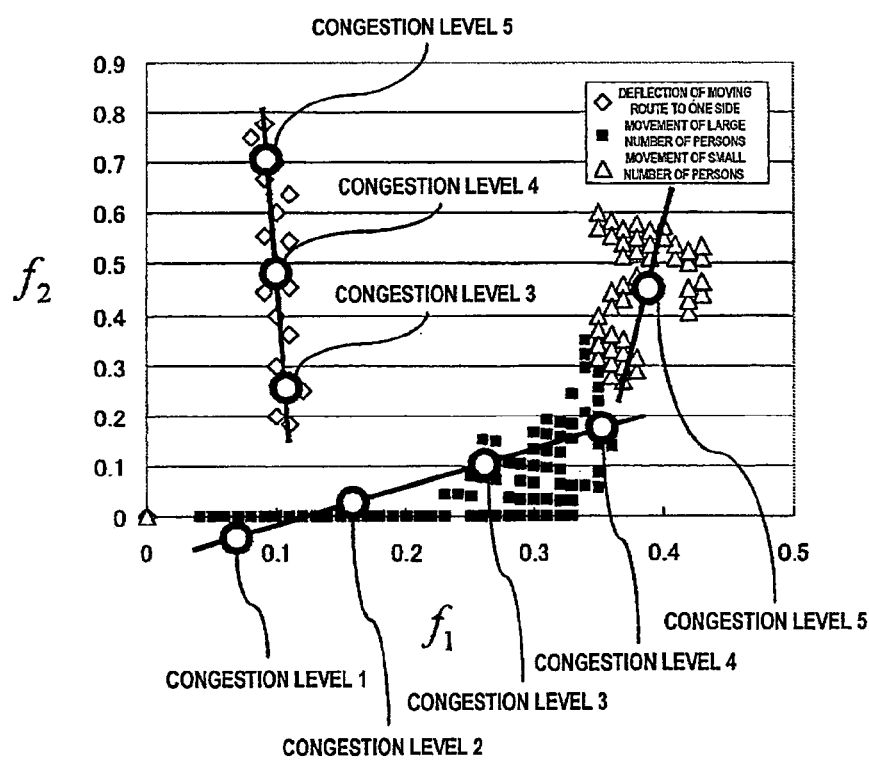
FIG. 36 is a diagram illustrating the association between a position in a subspace and an index indicating the degree of congestion, which is used to describe the congestion determining process of the situation determining apparatus according to the second embodiment of the invention.

(3) A subspace including the amount of features whose situation is not known is determined. As shown in FIG. 35, when an input feature amount vector f is projected to a subspace, a subspace having the maximum projection component $\|Pf\|$ is selected as the identification result. This corresponds to another embodiment that identifies the kind of situation. As shown in FIG. 36, a position on the subspace (straight line) and an index indicating the degree of congestion are associated with each other in advance, and the index indicating the degree of congestion can be calculated on the basis of the end position (the position of an arrow POS in FIG. 35) of a vector when the feature amount vector f is projected to the subspace. The closest congestion level (integer) in FIG. 36 may be selected as the index indicating the degree of congestion and interpolation may be performed at the end position to calculate a decimal congestion level.

Non-Patent Document 5: "Technical Review and View in Computer Vision", Takashi Matsuyama, Yoshinori Hisano, Atsushi Inomiya, Shingijyutsu (New Technology) Communications, 1998/06

In this embodiment, the degree of congestion is calculated on the basis of the position of the feature vector projected to the subspace. However, instead of the main component analysis method, other methods, such as a multiple regression analysis method, may be used. The details of the multiple regression analysis are disclosed in Non-Patent Document 4, and thus a description thereof will be omitted.

Figure 37:
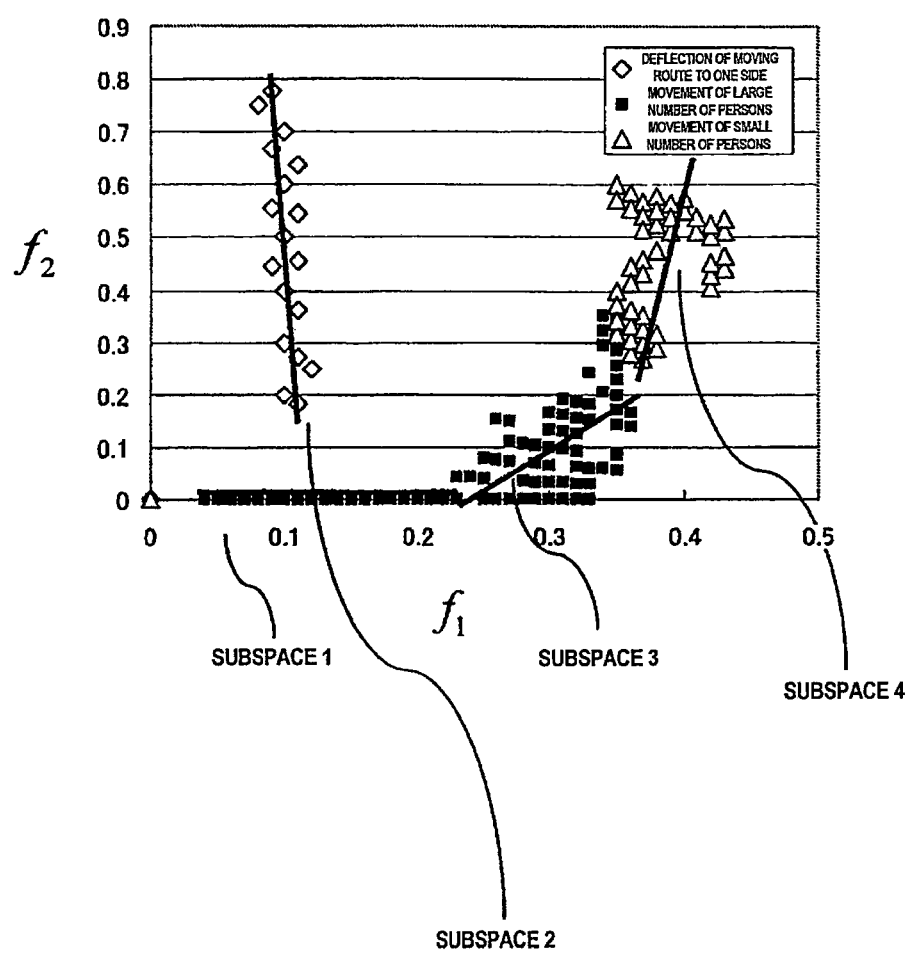
FIG. 37 is a diagram illustrating the distribution of the amount of features in four situations, which is used to describe the congestion determining process of the situation determining apparatus according to the second embodiment of the invention, and subspaces of the distribution obtained in the four situations.

In this embodiment, three situations (the movement of a large number of persons, the movement of a small number of persons, and the deflection of a moving route to one side) are defined as the kind of situations. However, two situations, that is, "normal movement" and "deflection of a moving route to one side" corresponding to the movement of a large number of persons and the movement of a small number of persons may be identified. The situations may be classified into four or more situations. For example, the situations may be classified into four situations as shown in FIG. 37 such that an approximation error is reduced when approximation is performed in the subspace.

As described above, according to the situation determining apparatus of this embodiment, the time change ratio of the brightness value in a local area of the captured images and the histogram of the time change ratios of a plurality of local areas are analyzed to determine the movement situation of persons and calculate the congestion level. In particular, it is possible to simply detect that the moving route is deflected to one side. Therefore, for example, in the place where there is a line of persons waiting for the train, such as the station, it is possible to estimate the line of persons waiting for the train and the congestion level thereof. In addition, in the situation in which the moving route is not deflected to one side, it is possible to estimate the situation and the degree of congestion. When the deflection of the moving route to one side is detected in a passage where persons are not generally lined up, it is possible to estimate an obstacle to the free movement of persons.

Third Embodiment

Figure 38:
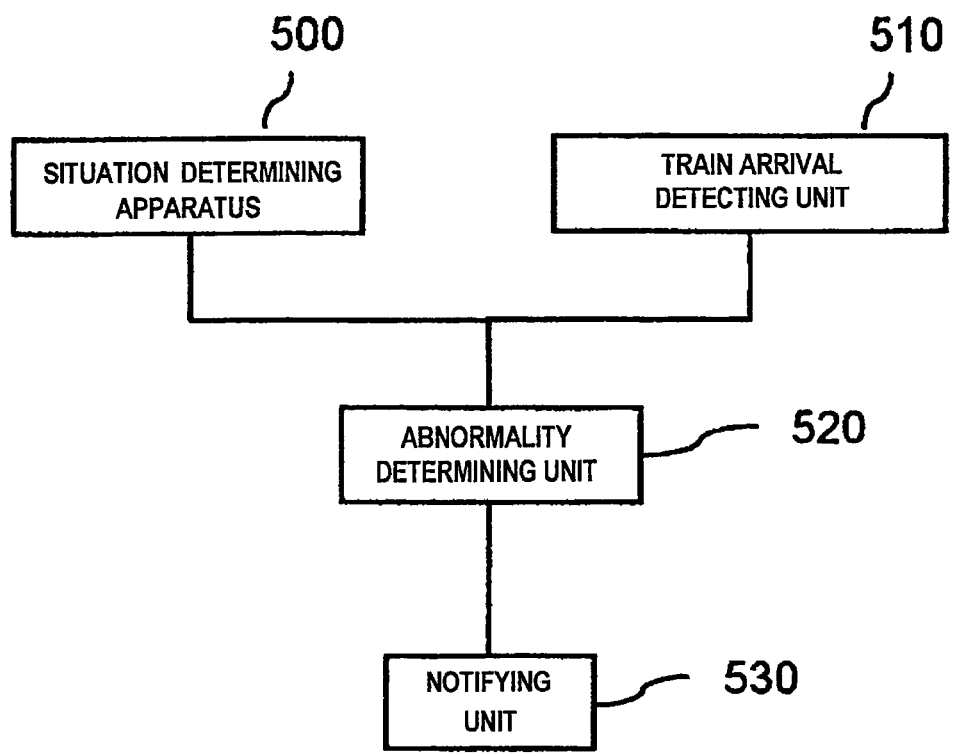
FIG. 38 is a block diagram schematically illustrating the structure of an abnormality determining apparatus according to a third embodiment of the invention.

FIG. 38 is a block diagram schematically illustrating the structure of an abnormality determining apparatus according to a third embodiment of the invention. In FIG. 38, the abnormality determining apparatus according to this embodiment includes a situation determining apparatus 500, a train arrival detecting unit 510, an abnormality determining unit 520, and a notifying unit 530. Similar to the first embodiment, the abnormality determining apparatus is installed at the platform of the railroad station shown in FIG. 2.

The situation determining apparatus 500 has the structure shown in the block diagram of FIG. 1, and transmits the kind of situation determined or the degree of congestion to the abnormality determining unit 520. The detailed operation of the situation determining apparatus 500 is the same as that according to the first embodiment or the second embodiment. It is assumed that the kind of situation to be determined includes at least a situation in which the moving route of persons is deflected to one side.

The train arrival detecting unit 510 detects the arrival of the train to the platform. Any method may be used as long as it can detect the arrival of the train. For example, a method of recognizing an image, a method using a sensor, and a method using train operation data may be used. In the method of recognizing the image, appearance information, such as the color and shape of the train, may be registered in advance, and template matching with the registered information may be performed to determine the arrival of the train. The method using the motion vector described in the first embodiment may also be used. When a plurality of motion vectors having similar direction and intensity appears in a predetermined area (in the vicinity of a railroad line) of the image, the movement of a rigid body may be detected to determine the arrival of the train. In the method using the sensor, for example, a load sensor is provided below the railroad and it is possible to determine the arrival of the train on the basis of a load value. In addition, a laser light emitting device and a light receiving device may be used to detect laser light reflected from the train or detect that the light emitted from the laser light emitting unit is shielded by the train, thereby determining the arrival of the train. As an example of the method using the train operation data, it is possible to detect the arrival of the train by receiving communication data from the train or a train control center.

The abnormality determining unit 520 determines whether there is abnormality on the basis of both the determination result of the situation and the determination result of the degree of congestion from the situation determining apparatus 500, and train arrival information from the train arrival detecting unit 510. The details of this process will be described below. When the abnormality determining unit 520 determines that there is abnormality, the notifying unit 530 sends the fact to a predetermined contact address.

Figure 39:
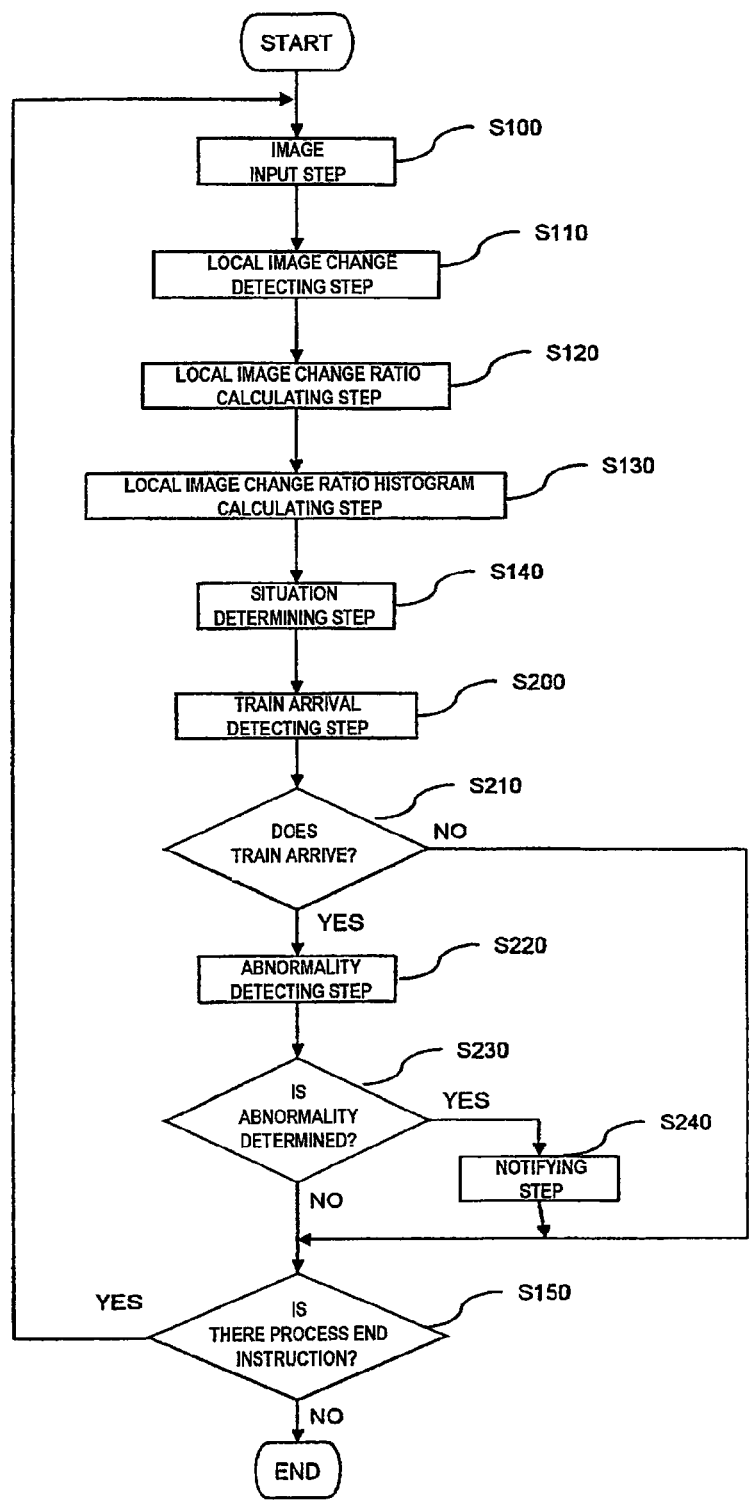
FIG. 39 is a flowchart illustrating an abnormality determining process of the abnormality determining apparatus according to the third embodiment of the invention.
Figure 40:
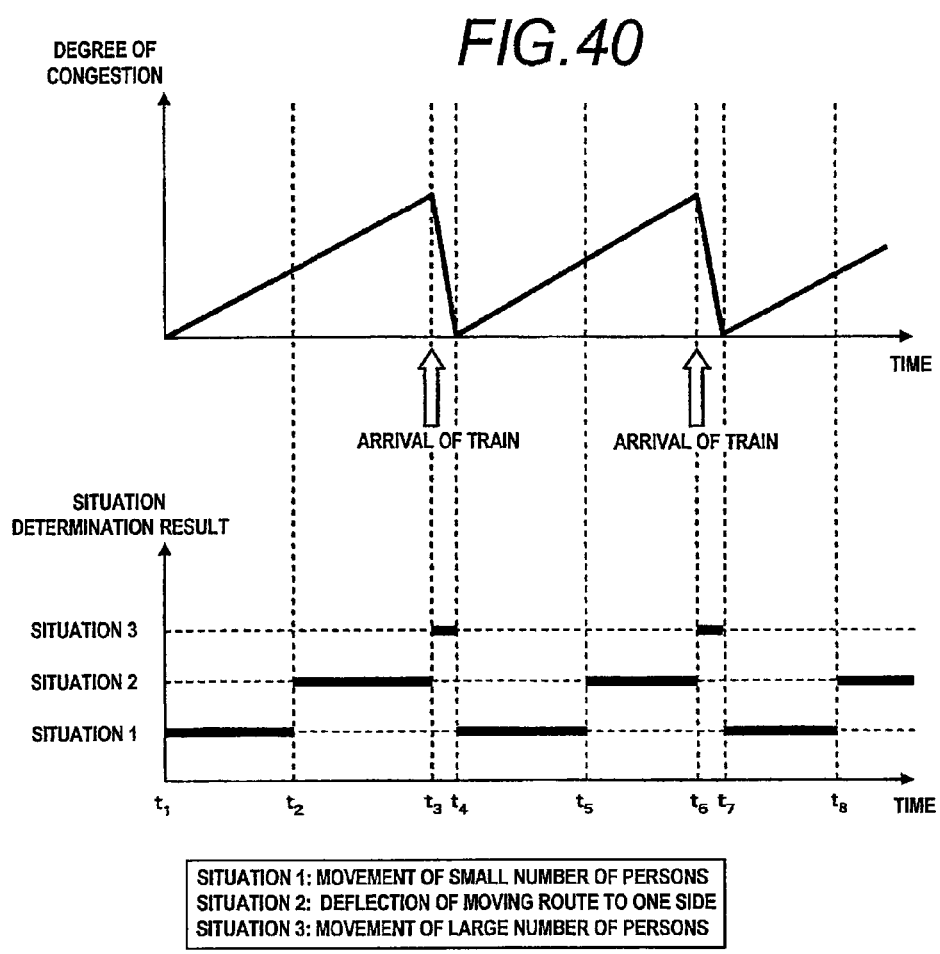
FIG. 40 is a graph illustrating the degree of congestion output from a situation determining apparatus of the abnormality determining apparatus according to the third embodiment of the invention and a change in the kind of situations in a normal state over time.

Next, the operation of the abnormality determining apparatus according to this embodiment will be described with reference to a flowchart shown in FIG. 39. An image input step S100 to a situation determining step S140 are performed by the situation determining apparatus 500. The structure of the situation determining apparatus 500 is shown in FIG. 1, and units that perform Steps S100 to S140 and the operations thereof are the same as those according to the first embodiment or the second embodiment. Therefore, a detailed description thereof will be omitted. Here, a time-series variation in the congestion index and the determination result of the situation output from the situation determining apparatus 500 during a normal operation will be described with reference to FIG. 40. FIG. 40 is a diagram schematically illustrating a time-series variation in the degree of congestion and the determination result of the situation output from the situation determining apparatus according to the second embodiment.

<Congestion Index>

The horizontal axis indicates time, and the train arrives at a time $t_3$ and a time $t_6$. Since the previous train has arrived at a time $t_1$, there is no person at the platform and the degree of congestion is 0. Since persons move to the platform in order to get on the train up to a time $t_3$ where the train arrives, the degree of congestion is gradually increased. At the time $t_3$ where the train arrives, the passengers waiting for the train get on the train, and the passengers get off from the train to the platform and move to the staircase ST shown in FIG. 2. At a time $t_4$ where all the passengers move to the staircase ST, the degree of congestion returns to 0. Thereafter, the situation from the time $t_1$ to the time $t_4$ is repeated.

<Determination Result of Situation>

During the period from the time $t_1$ to the time $t_2$, there is no line of persons waiting for the train. The situation is determined as "situation 1: the movement of a small number of persons". Since a line of persons waiting for the train starts to be formed from the time $t_2$, the situation is determined as "situation 2: the deflection of a moving route to one side". When the train arrives at the time $t_3$, all the passengers move to the staircase ST shown in FIG. 2. Therefore, the situation is determined as "situation 3: the movement of a large number of persons".

Then, a train arrival detecting step S200 is performed by the train arrival detecting unit 510. This process is the same as the operation of the train arrival detecting unit 510.

Then, Step S210 is performed by a control unit (not shown in FIG. 38). When there is train arrival information at the current time (in the case of YES), the process proceeds to an abnormality determining step S220. When there is no train arrival information (in the case of NO), the process proceeds to Step S150.

Then, the abnormality determining step S220 is performed by the abnormality determining unit 520. This step is performed as follows. The time from the arrival of the train to the returning of the degree of congestion to 0 (for example, the period from the time $t_3$ to the time $t_4$) is measured in advance, and a threshold value DT is determined on the basis of the measured value. When the congestion index is not less than a predetermined threshold value or the situation is not determined as "situation 1: the movement of a small number of persons" after a time DT has elapsed from the detection of the arrival of the train by the train arrival detecting unit 510, it is determined that there is abnormality.

Examples of the abnormality include when all the passengers waiting for the train at the platform do not get on the arriving train and some passengers are left at the platform since there is no spaces in the train and when congestion occurs in the staircase ST and the persons got off the train cannot move to the staircase ST even after the time DT has elapsed. The time until the congestion is removed is affected by the number of persons waiting for the train and the number of persons got off the train. Therefore, it is preferable to set the threshold value DT to an appropriate value according to the day and time.

Then, Step S230 is performed by the control unit (not shown in FIG. 38). If it is determined in the abnormality determining step that there is abnormality (in the case of YES), the process proceeds to a notifying step S240. If not (in the case of NO), the process proceeds to Step S150. The notifying step S240 is performed by the notifying unit 530. The notifying process is the same as the operation of the notifying unit 530. Finally, Step S150 is performed by the control unit (not shown in FIG. 38). In FIG. 38, when the operator of the apparatus uses an input unit (not shown in FIG. 38) to input a process end instruction (in the case of YES), the process returns to the image input step S100 to process the next frame image. When the process end instruction is not input (in the case of NO), the process ends.

As described above, according to the abnormality determining apparatus of this embodiment, it is possible to determine an abnormal congestion state different from a normal congestion state on the basis of the kind of situation or the degree of congestion obtained by the situation determining apparatus.

Fourth Embodiment

Figure 41:
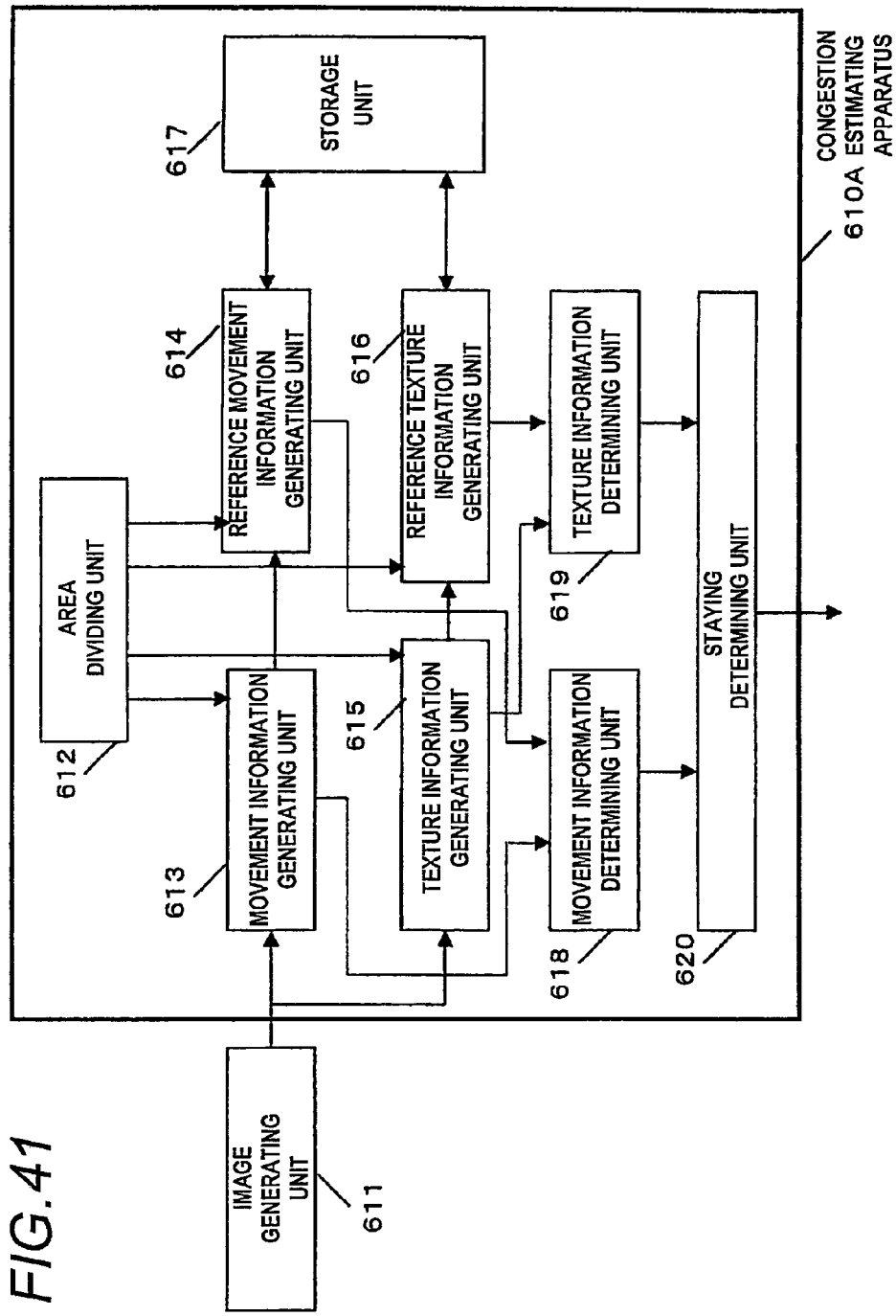
FIG. 41 is a block diagram schematically illustrating the structure of a congestion estimating apparatus according to a fourth embodiment of the invention.

FIG. 41 is a block diagram schematically illustrating the structure of a congestion estimating apparatus according to a fourth embodiment of the invention. In FIG. 41, a congestion estimating apparatus 610A according to this embodiment includes: an image generating unit 611 that converts an image of various scenes or an image captured by the camera into a digital image and outputs the digital image; an area dividing unit 612 that divides an input image into partial areas; a movement information generating unit 613 that generates movement information from an image sequence of the image generating unit 611; a reference movement information generating unit 614 that stores and updates reference movement information, which is a reference for a motion in each partial area; a texture information generating unit 615 that generates texture information of the image output from the image generating unit 611; a reference texture information generating unit 616 that stores and updates reference texture information for determining whether there is a person in each partial area; a storage unit 617 that stores the reference movement information or the reference texture information; a movement information determining unit 618 that compares the movement information output from the movement information generating unit 613 with the reference movement information generated by the reference movement information generating unit 614 to determine whether there is a movement in each partial area on the basis of the comparison result; a texture information determining unit 619 that compares the texture information output from the texture information generating unit 615 with the reference texture information generated by the reference texture information generating unit 616 to determine whether there is the same texture information as a person in each partial area; and a staying determining unit 620 that receives the determination results from the movement information determining unit 618 and the texture information determining unit 619 and determines whether there is a person in each area on the basis of the received determination results.

Figure 42:
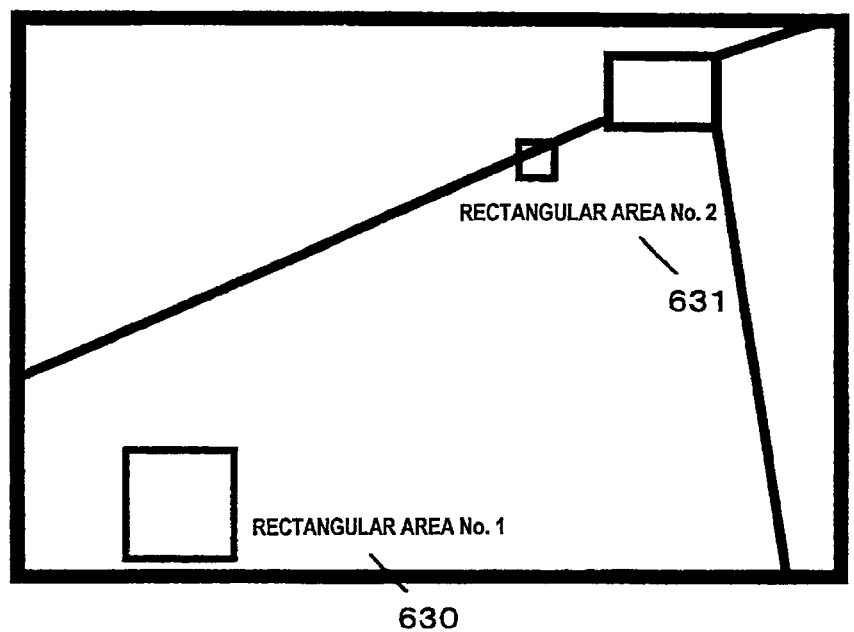
FIG. 42 is a diagram illustrating a method of calculating a process area in the congestion estimating apparatus shown in FIG. 41.
Figure 43:
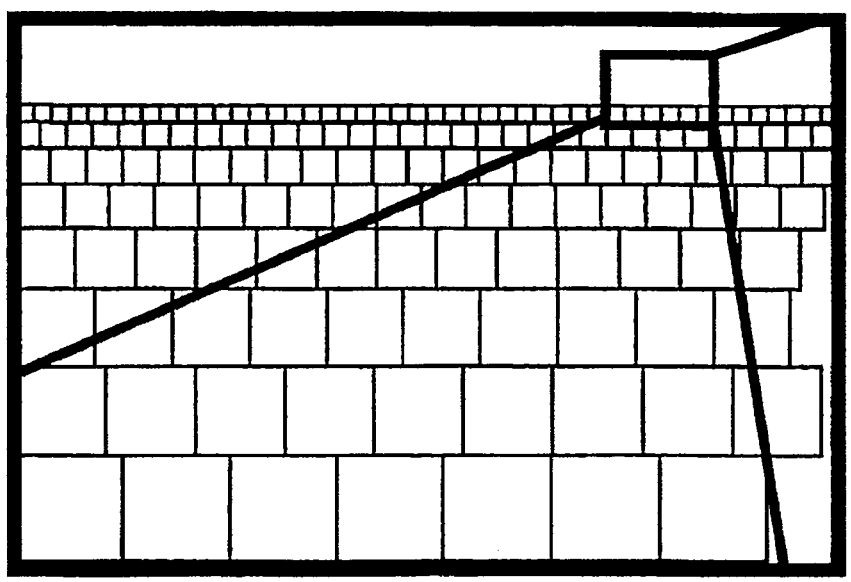
FIG. 43 is a diagram illustrating an example of the division of a process area into movement process areas by the congestion estimating apparatus shown in FIG. 41.
Figure 44:
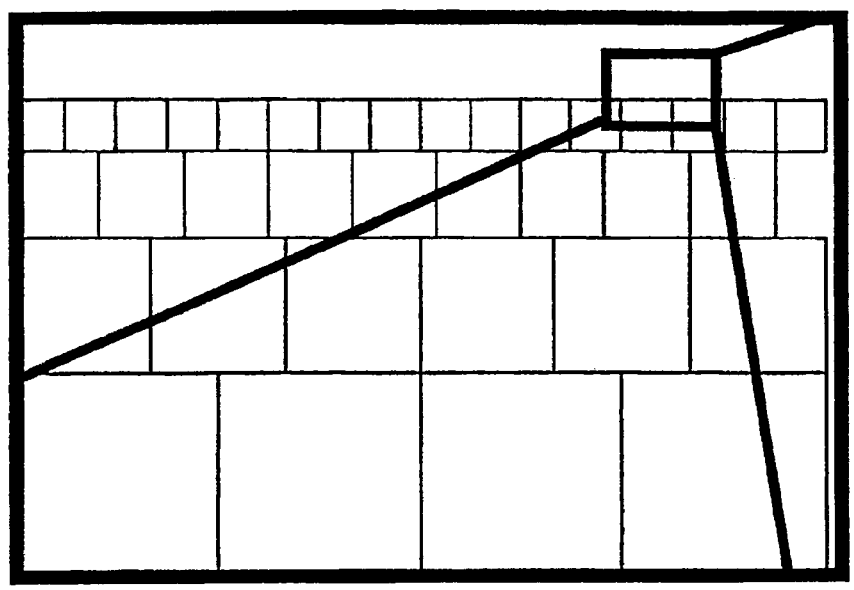
FIG. 44 is a diagram illustrating an example of the division of the process area into texture process areas by the congestion estimating apparatus shown in FIG. 41.

The operation of the congestion estimating apparatus 610A having the above-mentioned structure will be described with reference to FIGS. 42, 43, and 44. First, image data obtained by the image generating unit 611 is transmitted to the movement information generating unit 613 and the texture information generating unit 615. Here, the function of the image dividing unit 612 will be described with reference to FIG. 42. First, the area dividing unit 612 performs area division for the movement information generating unit 613 and the reference movement information generating unit 614. The area is determined on the basis of the size of an object, which is a target. A rectangular area (1) 630 and a rectangular area (2) 631 having object sizes corresponding to the front and rear positions are set. A movement process area at an arbitrary position is determined by linear interpolation on the basis of the set two rectangular areas. FIG. 43 shows an example of the division of the movement process area.

Then, a texture process area for the texture information generating unit 615 and the reference texture information generating unit 616 is determined on the basis of the division result of the area for the determined movement information. In the division of the texture process area for texture, a set of a plurality of area division results for movement information is one texture process area. FIG. 44 shows an example in which a total of four movement process area results for movement information, that is, two-by-two movement process area results belong to one texture process area. In this embodiment, four movement process area results are used, but the number thereof may be freely changed depending on the design.

Figure 45:
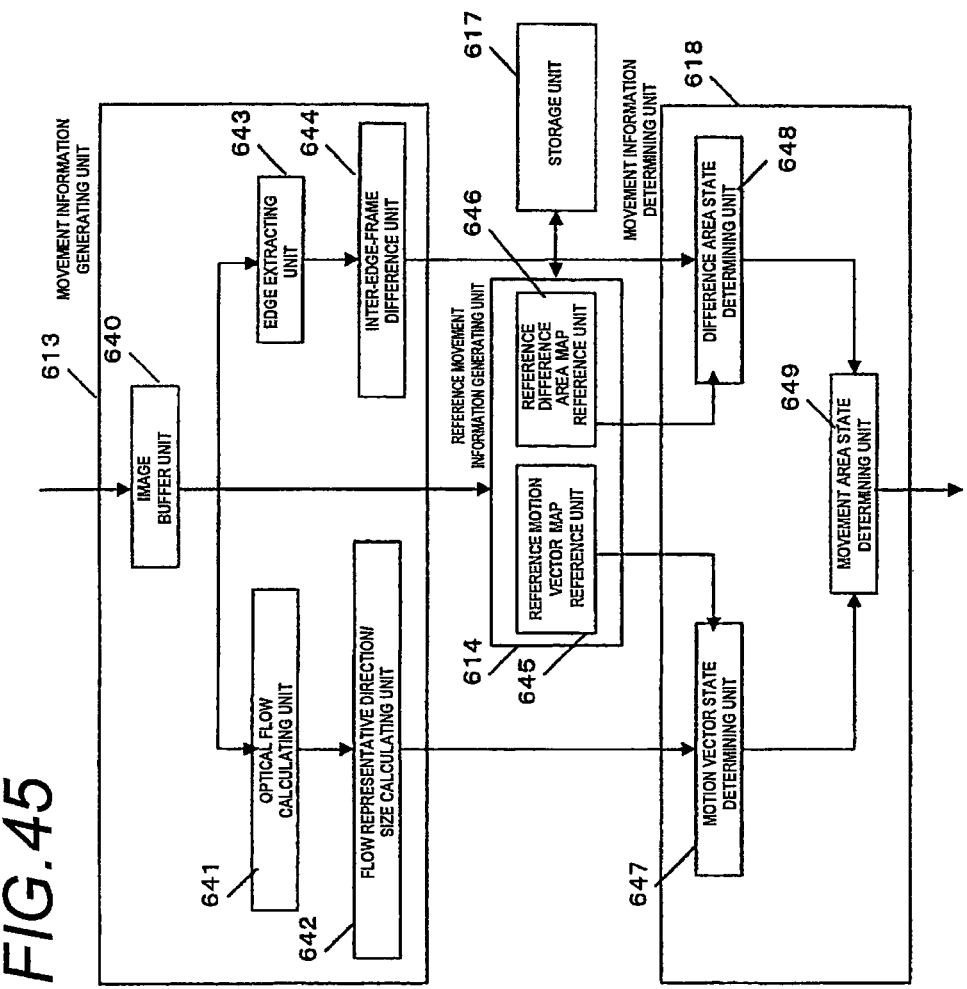
FIG. 45 is a block diagram illustrating the detailed structures of a movement information generating unit, a reference movement information generating unit, and a movement information determining unit of the congestion estimating apparatus shown in FIG. 41.

Next, the operations of the movement information generating unit 613, the reference movement information generating unit 614, and the movement information determining unit 618 will be described with reference to FIG. 45. The image input from the image generating unit 611 is stored in an image buffer unit 640. Then, the image is input to an optical flow calculating unit 641 and an edge extracting unit 643. The optical flow calculating unit 641 extracts a feature point from the image and searches a point on the next frame corresponding to the extracted feature point. A vector connecting the corresponding feature point and the feature point of the original image is a motion vector. A flow representative direction/size calculating unit 642 calculates the representative flow and representative size of each movement process area.

Each movement process area includes a plurality of motion vectors. However, the average of a plurality of motion vectors is calculated as a representative size, and when there is a movement vector having a plurality of directions, the most frequent directional vector is calculated as a flow representative direction. When the direction is calculated, a frequency distribution is created by only the flow having a size equal to or more than a predetermined value to remove a flow of noise.

Figure 46:
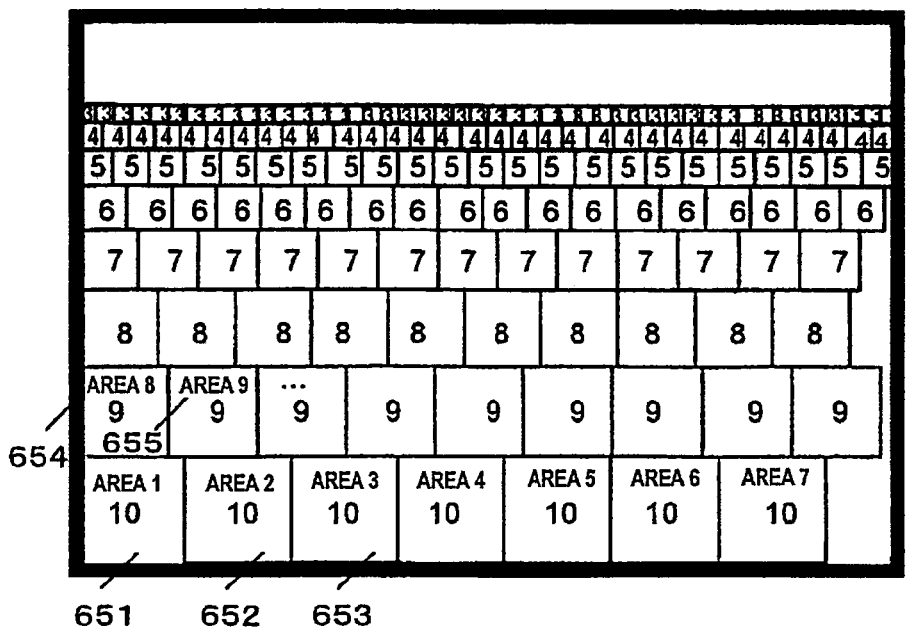
FIG. 46 is a diagram illustrating an example of a reference motion vector map stored in a reference motion vector map reference unit of the reference movement information generating unit shown in FIG. 45.

The representative direction information (unit: radian) of the flow and the representative size (unit: pixel) of the flow for each movement process area are stored and are than transmitted to a motion vector state determining unit 647. The reference movement information generating unit 614 includes a reference motion vector map reference unit 645 and a reference difference area map reference unit 646. A reference motion vector map 650 shown in FIG. 46 is stored in the reference motion vector map reference unit 645, and each movement process area has a threshold value, which is a reference value for whether there is a movement. For example, an area (1) 651, an area (2) 652, an area (3) 653 (in FIG. 46, parentheses "( )" having a numerical value therein are omitted, which is the same with the following description) have a threshold value of 10. When the flow has a size more than the threshold value, it is determined that there is a movement. When the size of the flow is less than the threshold value, it is determined that there is no motion. Similarly, an area (8) 654 and an area (9) 655 have a threshold value of 9. All the movement process areas have threshold values.

Figure 47:
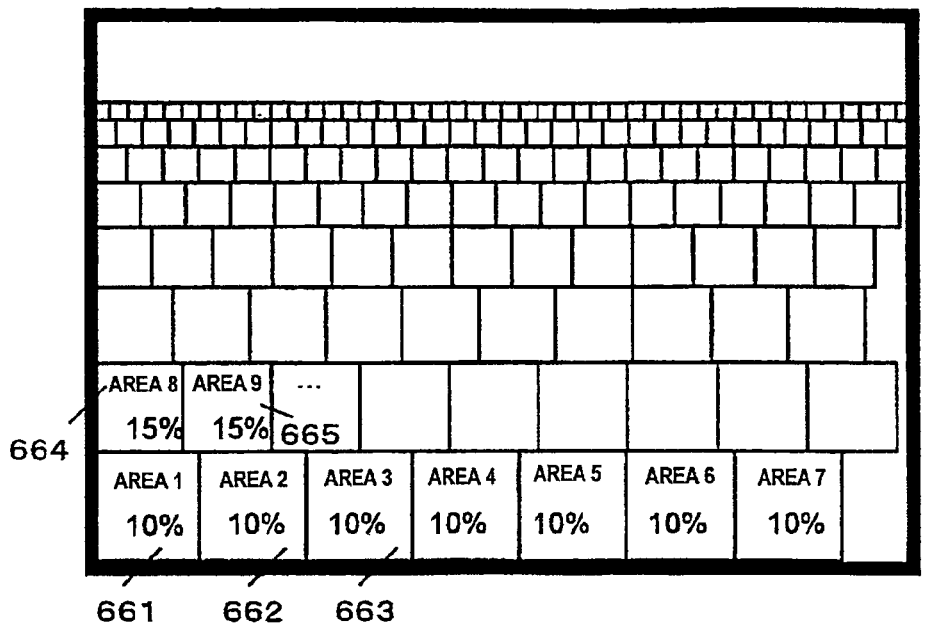
FIG. 47 is a diagram illustrating an example of a reference difference area map stored in a reference difference area map reference unit of the reference movement information generating unit shown in FIG. 45.

Returning to FIG. 45, the edge extracting unit 643 extracts the edge of an input image using the existing edge extract program, such as a Sobel filter, and transmits the extracted result to an inter-edge-frame difference unit 644. The inter-edge-frame difference unit 644 calculates the difference between the previous edge frame and the currently input edge frame, extracts the pixels of the current frame that are different from those of the previous frame, and transmits them to the difference area state determining unit 648. The reference movement information generating unit 614 includes the reference difference area map reference unit 646, and the map includes a map for determining whether there is a movement when the pixels are moved in several percent of the movement process areas. FIG. 47 shows an example of a reference difference area map 660.

In the reference difference area map 660, when 10% of the process area, such as an area (1) 661, an area (2) 662, or an area (3) 663 (in FIG. 47, parentheses "( )" having a numerical value therein are omitted, which is the same with the following description), is moved, the area is determined to be a movement area. When the amount of movement is less than 10%, the area is determined to be a non-movement area. For example, an area (8) 664 and an area (9) 665 are determined to be movement areas when 15% of the area is moved. In this way, the difference area state determining unit 648 performs the above-mentioned determining process on all the movement process areas. The movement area state determining unit 649 determines that there is a movement in the movement process area that has been determined as a movement area on the basis of both the determination result of the motion vector state determining unit 647 and the determination result of the difference area state determining unit 648, and transmits the determination result to the staying determining unit 620 (see FIG. 41). The movement process area that is determined to be a non-movement area on the basis of both the determination result of the motion vector state determining unit 647 and the determination result of the difference area state determining unit 648 is transmitted as a non-movement area to the staying determining unit 620.

Figure 48:
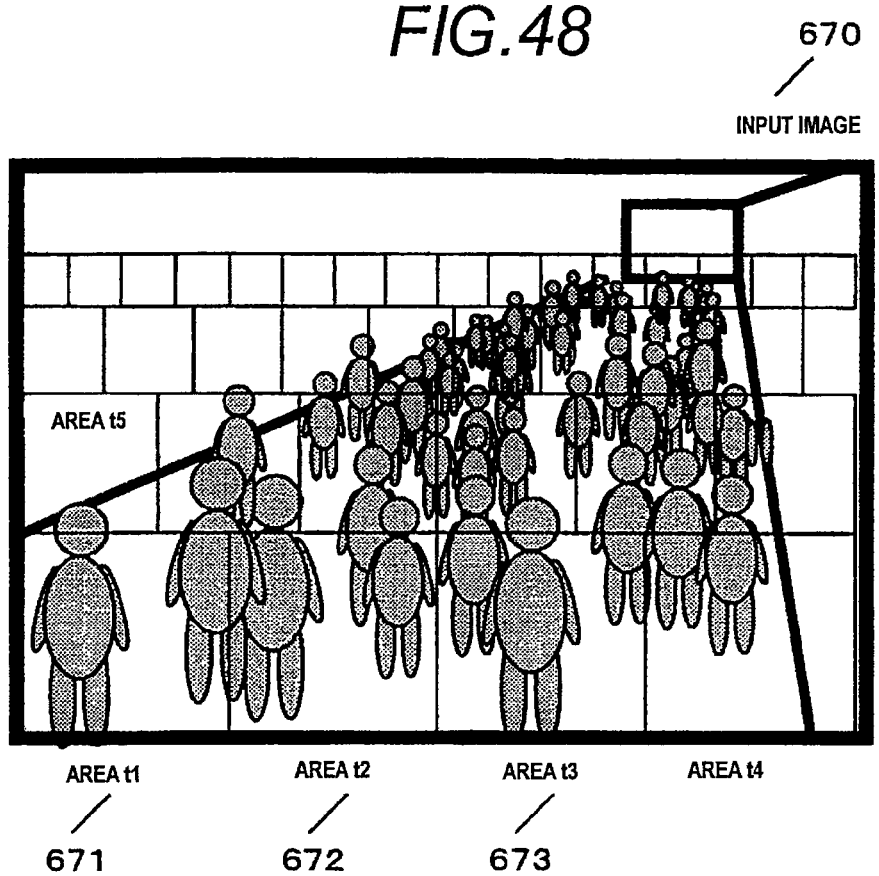
FIG. 48 is a diagram illustrating an input image for a texture information determining process of the congestion estimating apparatus shown in FIG. 41.
Figure 49:
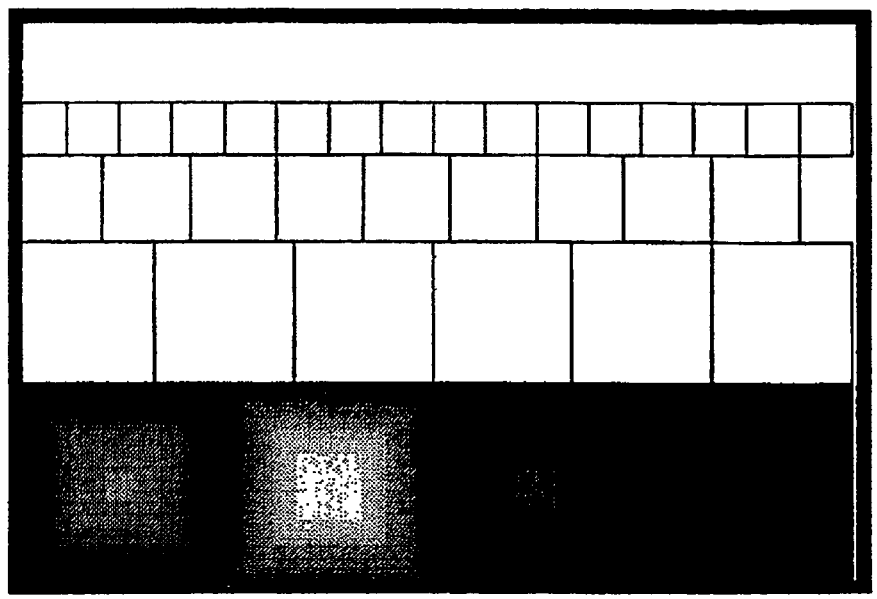
FIG. 49 is a diagram illustrating the result of a texture feature extracting process for converting the input image for the texture information determining process of the congestion estimating apparatus shown in FIG. 41.

Next, the operations of the texture information generating unit 615, the reference texture information generating unit 616, and the texture information determining unit 619 will be described with reference to FIGS. 48 and 49. The texture information generating unit 615 extracts a texture feature amount from each of the texture process areas divided by the feature area dividing unit 612. A frequency conversion process is performed on the texture feature amount using Fourier transform. FIG. 48 shows an example of an input image 670. The frequency conversion process is sequentially performed on an area (t1) 671, an area (t2) 672, area (t3) 673, . . . (in FIG. 48, parentheses "( )" having a numerical value therein are omitted, which is the same with the following description). FIG. 49 shows an example of the result of a texture feature amount extracting process. A texture feature amount extraction result 680 is obtained by performing the frequency conversion process on the area (t1) 671, the area (t2) 672, the area (t3) 673, . . . as inputs (in FIG. 49, parentheses "( )" having a numerical value therein are omitted, which is the same with the following description). The texture feature amount extraction result 680 includes an area t1 texture feature amount 681, an area t2 texture feature amount 682, and an area t3 texture feature amount 683.

Figure 50:
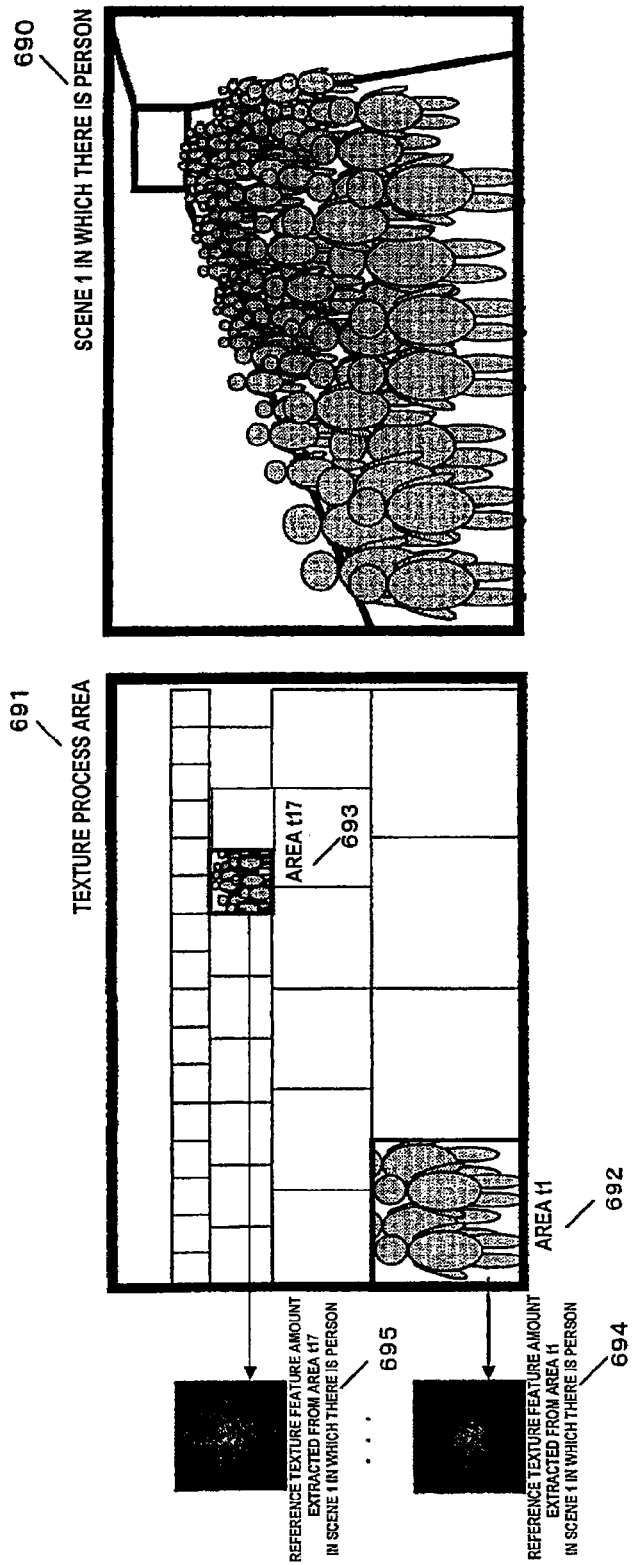
FIG. 50 is a diagram illustrating the flow of a process of calculating a reference texture feature amount in a scene in which there is a person, which is used for the texture information determining process of the congestion estimating apparatus shown in FIG. 41.
Figure 51:
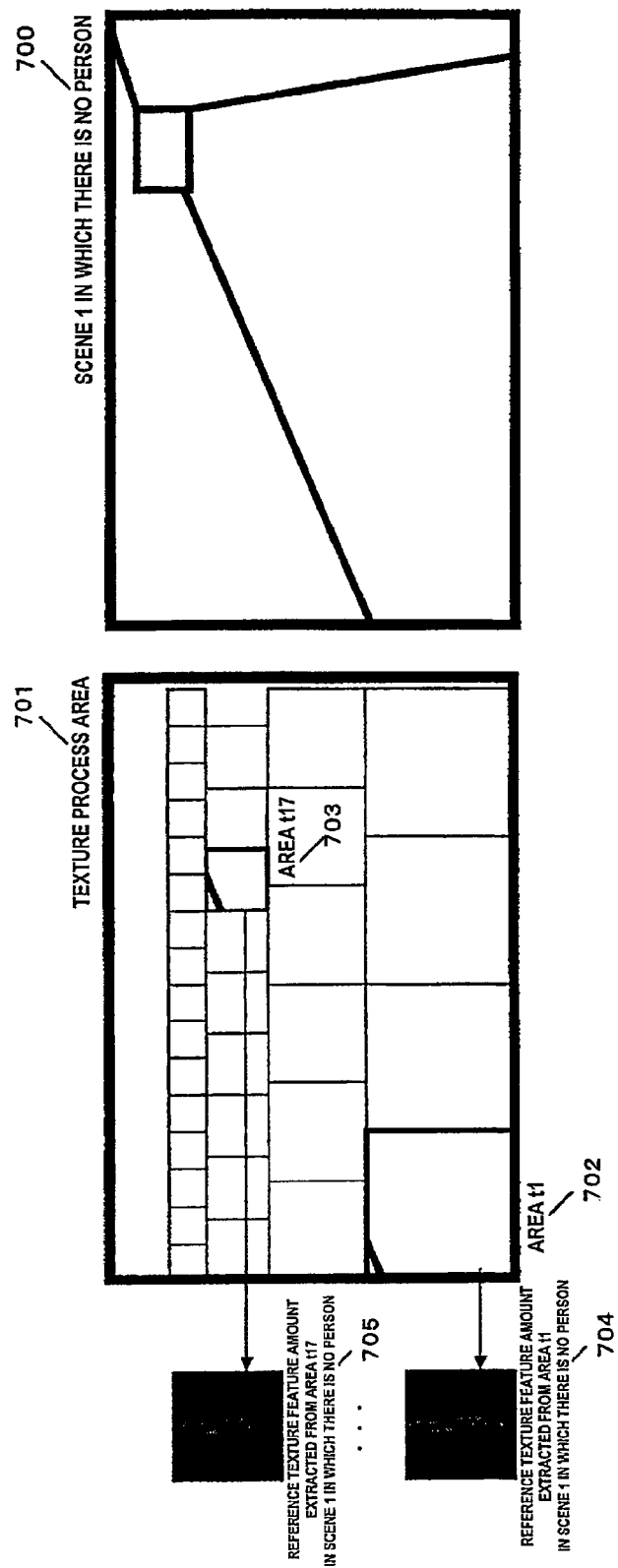
FIG. 51 is a diagram illustrating the flow of the process of calculating the reference texture feature amount in a scene in which there is no person, which is used for the texture information determining process of the congestion estimating apparatus shown in FIG. 41.

The reference texture information generating unit 616 extracts a texture feature amount from each texture process area of a group of scenes in which there is a person and a group of scenes in which there is no person. FIG. 50 shows a scene (1) 690 in which there is a person (in FIG. 50, parentheses "( )" having a numerical value therein are omitted, which is the same with the following description). A texture feature amount is extracted from each of the areas in the texture process area 691, such as an area (t1) 692, . . . , an area (t17) 693, . . . . In this way, a texture feature amount 694 is extracted from the area t1 of a scene 1 in which there is a person and a texture feature amount 695 is extracted from the area t17 of the scene 1 in which there is a person. Similarly, FIG. 51 shows a scene (1) 700 in which there is no person (in FIG. 51, parentheses "( )" having a numerical value therein are omitted, which is the same with the following description). A texture feature amount is extracted from each of the areas in the texture process area 701, such as an area (t1) 702, . . . , an area (t17) 703, . . . . In this way, a texture feature amount 704 is extracted from the area t1 of a scene 1 in which there is no person and a texture feature amount 705 is extracted from the area t17 of the scene 1 in which there is no person.

Figure 52:
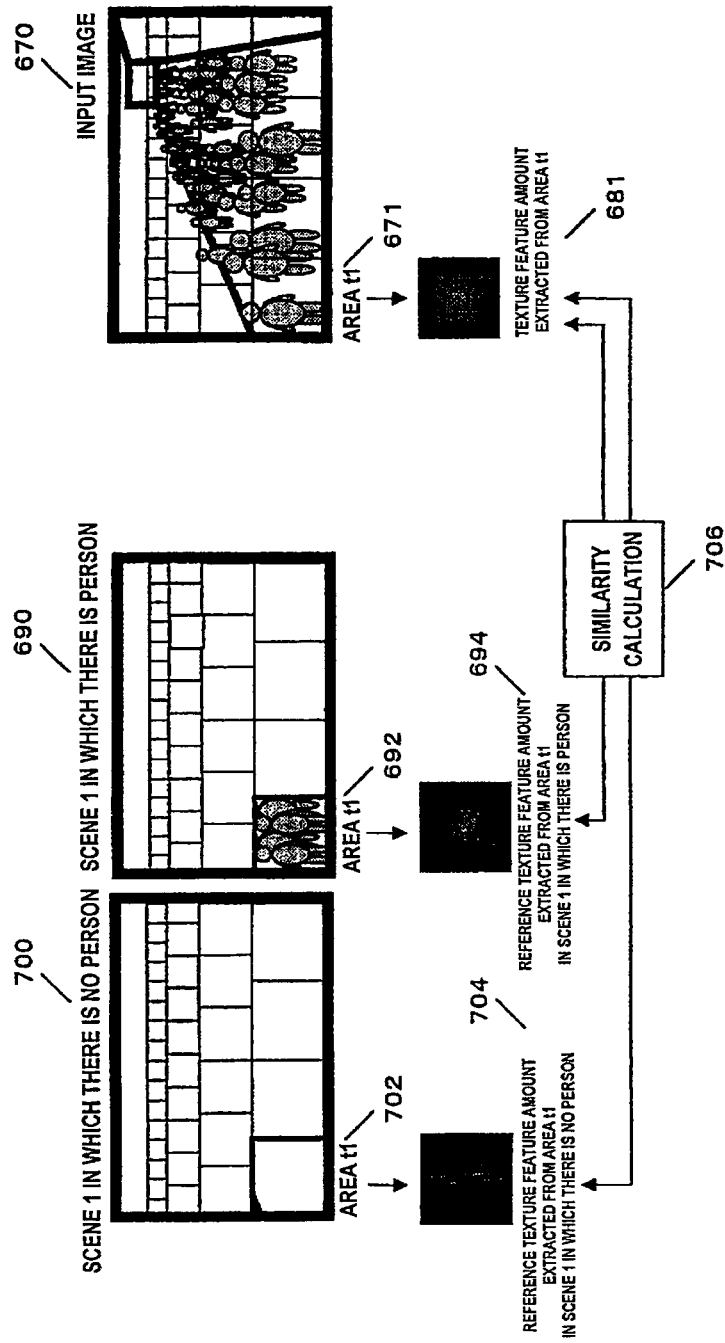
FIG. 52 is a diagram illustrating a similarity calculating process for the texture information determining process of the congestion estimating apparatus shown in FIG. 41.

The process of the texture information determining unit 619 will be described with reference to FIG. 52. The texture information determining unit 619 outputs an area (t1) texture feature amount 681, . . . for an area (t1) 671, . . . of each texture process area in the image 670 input from the texture information generating unit 615 (in FIG. 52, parentheses "( )" having a numerical value therein are omitted, which is the same with the following description). In addition, since the reference texture information generating unit 616 has a reference texture feature amount corresponding to each texture area, for example, the texture feature amount 704 is extracted from the area t1 of the scene 1 in which there is no person and the texture feature amount 694 is extracted from the area t1 of the scene 1 in which there is no person. The texture feature amounts 704 and 694 correspond to the area (t1) 692 and the area (t1) 702 of the input image. Then, similarity calculation 706 with the area t1 texture feature amount 681 is performed. When similarity with the area of a scene in which there is no person is high, the texture information determining unit 619 determines that there is no person in the area. When similarity with the area of a scene in which there is a person is high, the texture information determining unit 619 determines that there is a person in the area. In the calculation of similarity, SAD (Sum of Absolute Difference) may be used to calculate texture with minimum similarity, or a normalized correlation index may be used.

Figure 53:
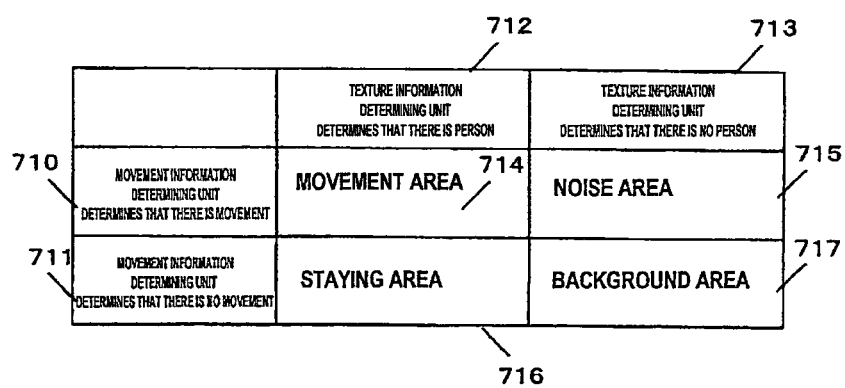
FIG. 53 is a diagram illustrating a method of determining the state of an area in the congestion estimating apparatus shown in FIG. 41.
Figure 54:
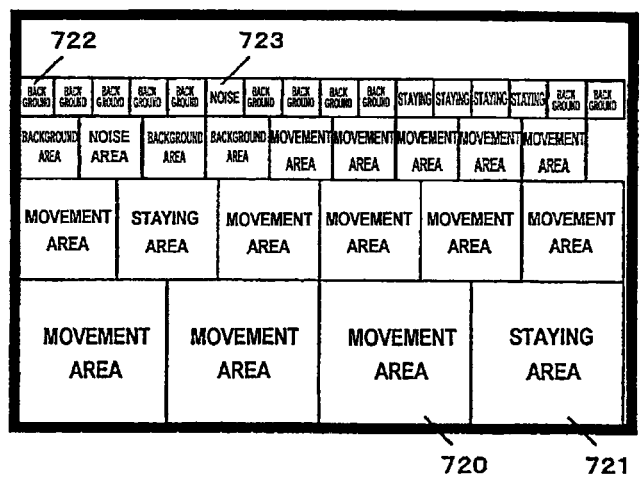
FIG. 54 is a diagram illustrating an example of the determination result of the state of an area by the congestion estimating apparatus shown in FIG. 41.

Next, the operation of the staying determining unit 620 will be described with FIG. 53. In an area which is determined to be moved on the basis of the determination result 710 of the movement information determining unit, an area that is determined to have a person therein on the basis of the determination result 712 of the texture information determining unit is determined to be a movement area 714. In the area which is determined to be moved on the basis of the determination result 710 of the movement information determining unit, an area that is determined to have no person therein on the basis of the determination result 713 of the texture information determining unit is determined to be a noise area 715. In an area which is determined not to be moved on the basis of the determination result 711 of the movement information determining unit, the area that is determined to have a person therein on the basis of the determination result 712 of the texture information determining unit is determined to be a staying area 716. In the area which is determined not to be moved on the basis of the determination result 711 of the movement information determining unit, the area that is determined to have no person therein on the basis of the determination result 713 of the texture information determining unit is determined to be a background area 717. In this way, it is possible to output the state of each area as shown in FIG. 54. FIG. 54 shows the states of a movement area 720, a staying area 721, a background area 723, and a noise area 724.

As described above, the movement information determining unit 618 determines whether an area is moved and the texture information determining unit 619 determines similarity using texture, thereby determining an area in which there is a person or an area in which there is no person. The staying determining unit 620 can discriminate various states of each area, a staying area, a movement area, a noise area, and a background area.

The texture information generating unit 615 and the reference texture information generating unit 616 of the congestion estimating apparatus 610A according to this embodiment extract the texture feature amount using a frequency conversion process by Fourier transform, but the invention is not limited thereto. For example, edge information or Gabor features may be used to extract the amount of features.

The reference texture information generating unit 616 of the congestion estimating apparatus 610A according to this embodiment generates a scene in which there is a person and a scene in which there is no person as one pattern of reference texture, but the invention is not limited thereto. For example, a plurality of scenes in which there is a person and a plurality of scenes in which there is no person may be used to generate a plurality of reference textures. Reference textures may be generated from a plurality of scenes, such as a scene in which there are a large number of persons, a scene in which there are a normal number of persons, a scene in which there are a small number of persons, and a scene in which there is no person, and the texture information determining unit 619 may use them to determine an area in which there is a person or an area in which there is no person. In addition, a plurality of scenes may be learned by a learning method, such as a support vector machine (SVM) or a boosting method, and the representative reference texture of a scene in which there is a person and the representative feature amount of a scene in which there is no person may be used to determine an area in which there is a person or an area in which there is no person.

Fifth Embodiment

Figure 55:
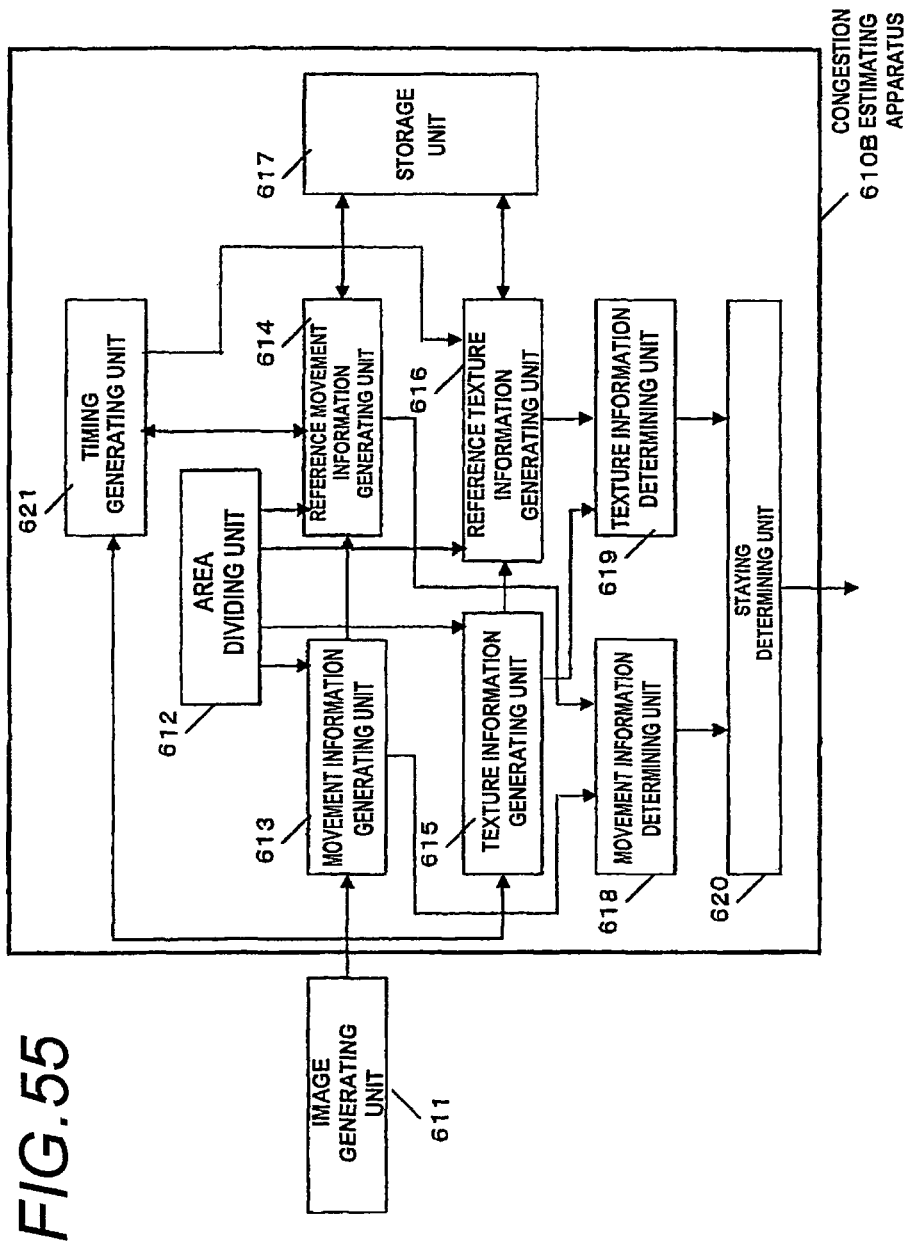
FIG. 55 is a diagram schematically illustrating the structure of a congestion estimating apparatus according to a fifth embodiment of the invention.

FIG. 55 is a block diagram schematically illustrating the structure of a congestion estimating apparatus according to a fifth embodiment of the invention. A congestion estimating apparatus 610B according to this embodiment differs from the congestion estimating apparatus 610A according to the fourth embodiment in that it further includes a timing generating unit 621 that inputs the update timing of input reference information to the reference movement information generating unit 614 and the reference texture information generating unit 616. The other structures are the same as those according to the fourth embodiment, and a detailed description thereof will be omitted.

Figure 56:
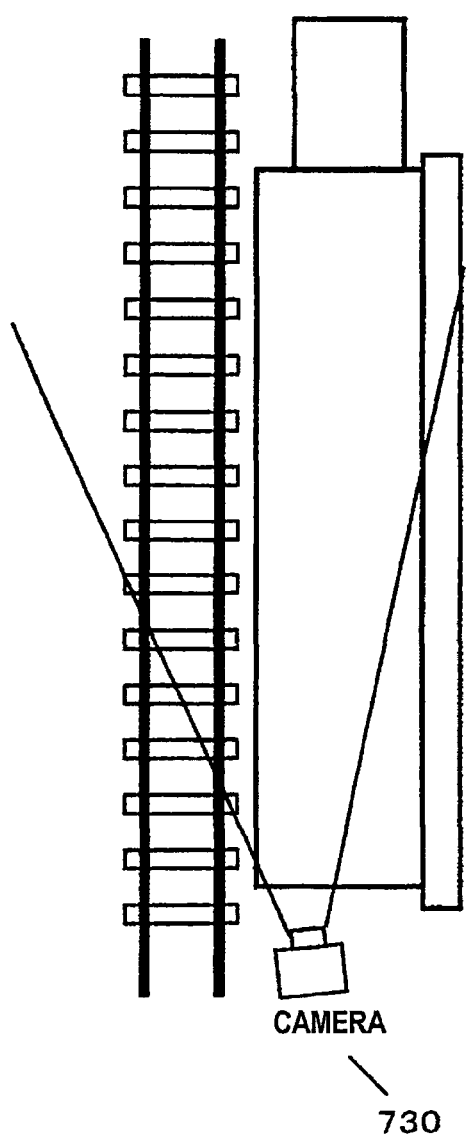
FIG. 56 is a diagram illustrating an example of the installation of a camera connected to the congestion estimating apparatus shown in FIG. 55.
Figure 57:
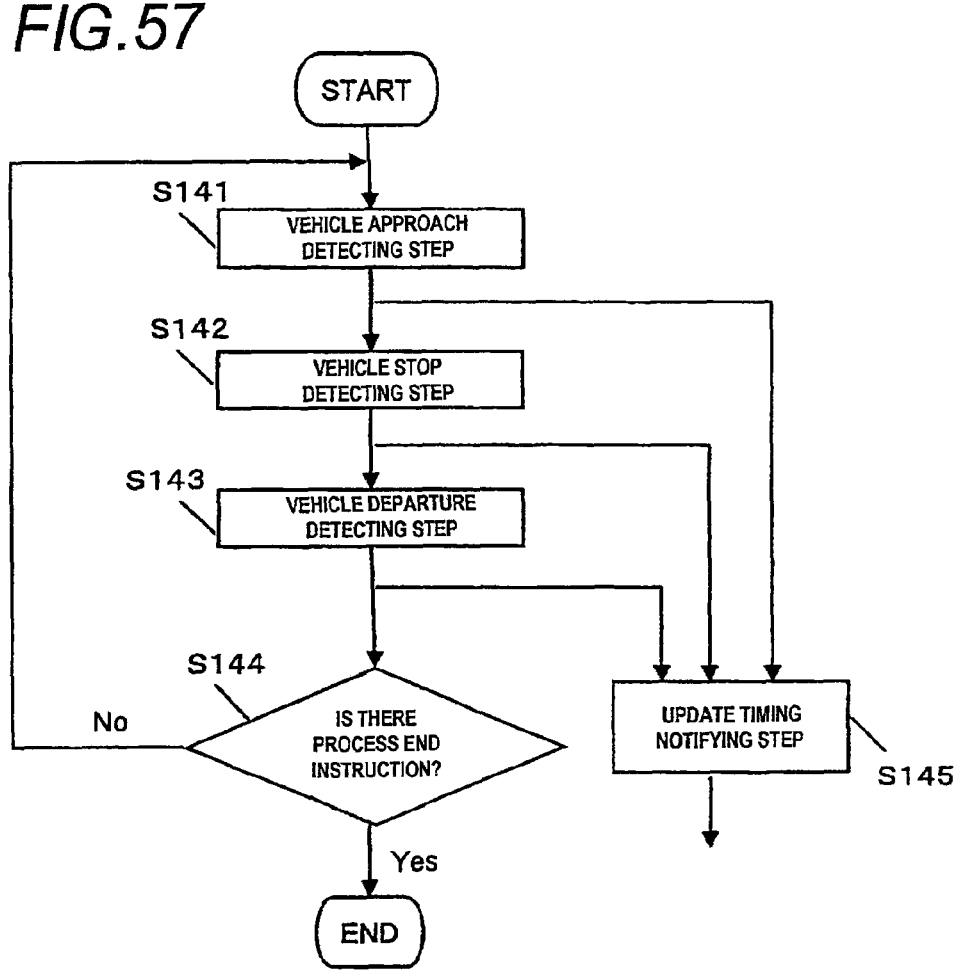
FIG. 57 is a flowchart illustrating a process of acquiring the approach, stop, and departure timings of a train in the congestion estimating apparatus shown in FIG. 55.

The process of the timing generating unit 621 gives the update timing to the reference movement information generating unit 614 and the reference texture information generating unit 616 at the approach, stop, and departure timings of the train will be described with reference to FIGS. 56 and 57. As shown in FIG. 56, a camera 730 is installed at the platform of the station such that it can monitor the railroad. When the train approaches the station on the railroad, a variation in the railroad during the approach of the train is detected using an image processing technique, such as an inter-frame difference and background difference process, and the approach timing is transmitted to the reference movement information generating unit 614 and the reference texture information generating unit 616. Immediately before the train approaches, there is a line of persons waiting for the train. Therefore, the reference texture information determining unit 619 uses a template for the existence of a person to update the reference texture. Then, when the train stops, the persons get on and off the train. Therefore, the reference movement information generating unit 614 uses the stop timing of the train to update the reference movement information. FIG. 57 shows the procedure of this process.

In a vehicle approach detecting step S141, the approach of a vehicle is detected by image processing, and the detected result is transmitted to an update timing notifying step S145. In a vehicle stop detecting step S142, after the approach of the vehicle is detected in the vehicle approach detecting step S141, when there is no movement on the railroad, it is determined that the vehicle stops, and the vehicle stop time is notified to the update timing notifying step S145. In a vehicle departure detecting step S143, after the stop of the vehicle is detected in the vehicle stop detecting step S142, when there is a movement on the railroad, it is determined that the vehicle departs, and the departure of the vehicle is notified to the update timing notifying step S145. In this process, the approach, stop, and departure of the vehicle are continuously detected until a process end instruction is issued (step S144).

Figure 58:
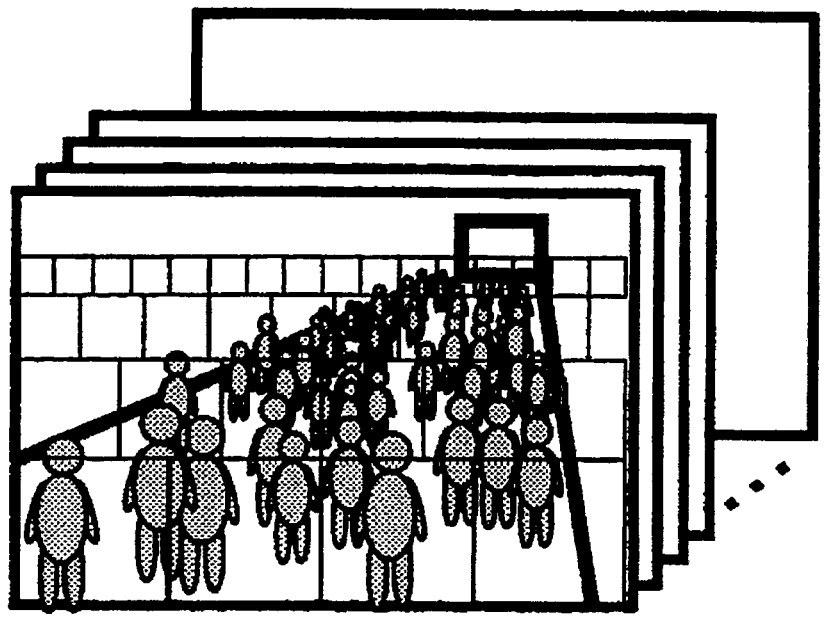
FIG. 58 is a diagram illustrating a group of station platform scenes when a vehicle approaches.

FIG. 58 shows an example of the image of the platform of the station at the vehicle approach timing. As shown in FIG. 58, a plurality of scenes obtain at the approach timing is transmitted to the reference texture information generating unit 616, and a reference texture is generated from the scene group. In this way, it is possible to adapt the reference texture when there is a person to a scene. In addition, a reference texture for each day and time is stored. In this way, it is possible to determine texture information in synchronization with, for example, day and time.

Figure 59:
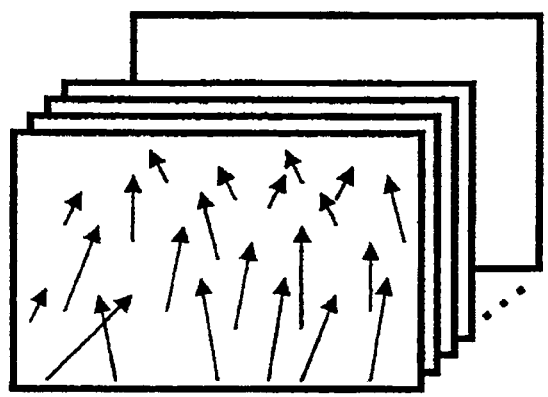
FIG. 59 is a diagram illustrating the process result of the motion vector of the station platform by the congestion estimating apparatus shown in FIG. 55 when the vehicle stops.

FIG. 59 shows an example of a sequence of the acquisition results of motion vectors after a process of extracting motion vectors from the platform of the station at the vehicle stop timing. As shown in FIG. 59, a plurality of scenes obtained at the vehicle stop timing is transmitted to the reference movement information generating unit 614, and the magnitude of the movement of each movement process area or a directional vector is extracted from the scene group at that time. Then, the movement at that time is used as a reference movement amount to acquire the direction vector of each movement process area. In addition, the reference movement information for each day and time is stored. In this way, it is possible to determine movement information in synchronization with, for example, day and time.

As described above, the timing generating unit 621 automatically sets the reference movement amount of the movement information or the texture information in which there is a person on the basis of the approach, stop, and departure timings of the vehicle. In this way, it is possible to discriminate a state in which there is a movement from a state in which there is no movement. In addition, it is possible to determine whether there is a person or not.

The timing generating unit 621 of the congestion estimating apparatus 610B according to this embodiment generates the approach timing of the vehicle using an image processing technique, but the invention is not limited thereto. For example, a detection sensor may be provided in the railroad, and information about the approach, stop, and departure of the vehicle may be obtained from the information of the sensor. In addition, the approach timing of the train may be notified in synchronization with the arrival time in the train timetable.

The timing generating unit 621 uses the approach, stop, and departure timings of the vehicle, but the invention is not limited thereto. The timing generating unit 621 may generate update timing at an arbitrary time interval.

Sixth Embodiment

Figure 60:
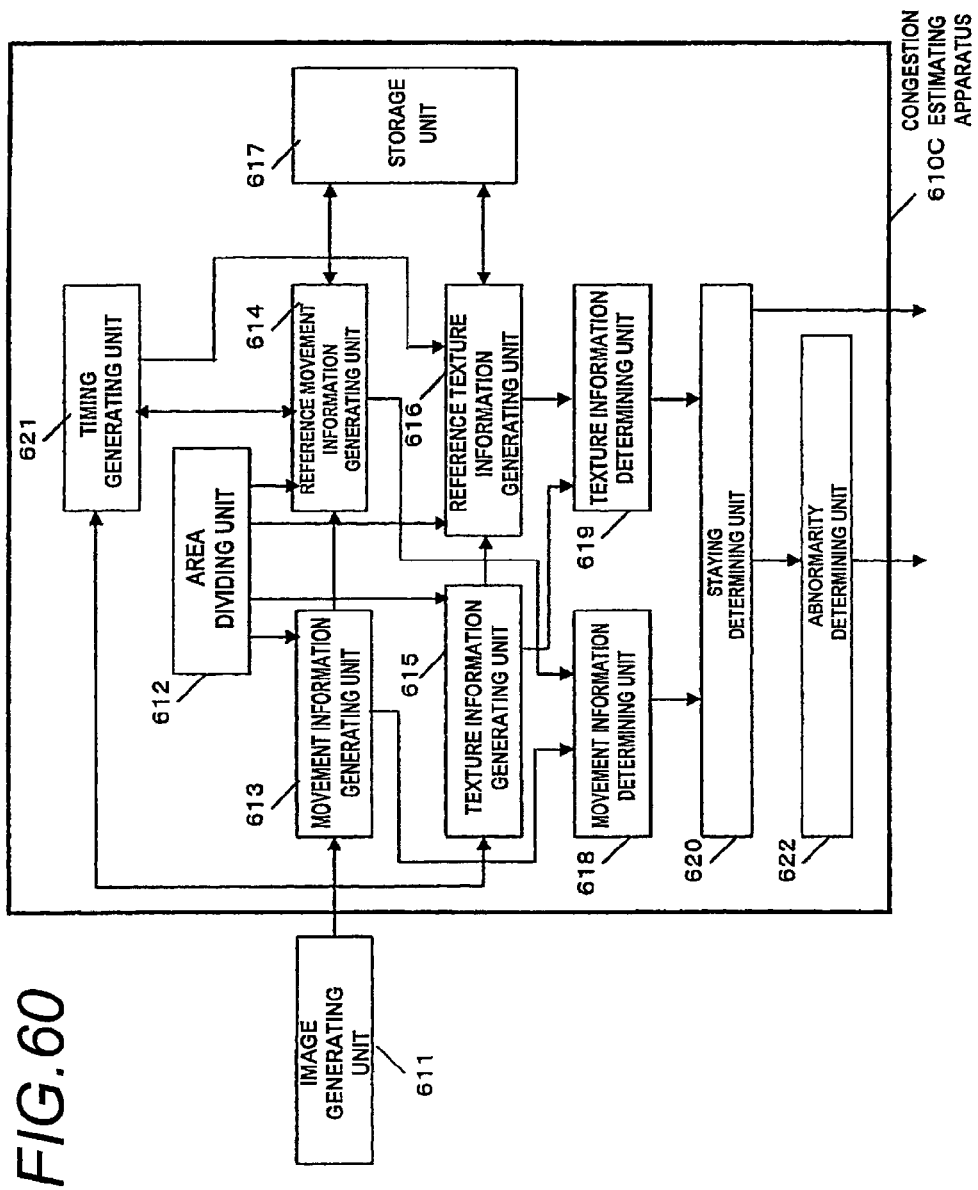
FIG. 60 is a diagram schematically illustrating the structure of a congestion estimating apparatus according to a sixth embodiment of the invention.

FIG. 60 is a block diagram schematically illustrating the structure of a congestion estimating apparatus according to a sixth embodiment of the invention. A congestion estimating apparatus 610C according to this embodiment differs from the congestion estimating apparatus 610A according to the fourth embodiment in that it further includes a timing generating unit 621 that inputs the update timing of input reference information to the reference movement information generating unit 614 and the reference texture information generating unit 616 and an abnormality determining unit 622 that analyzes the time-series ratio of a process area and determines whether there is abnormal congestion. The other structures are the same as those of the congestion estimating apparatus 610A according to the fourth embodiment, and a detailed description thereof will be omitted.

Figure 61:
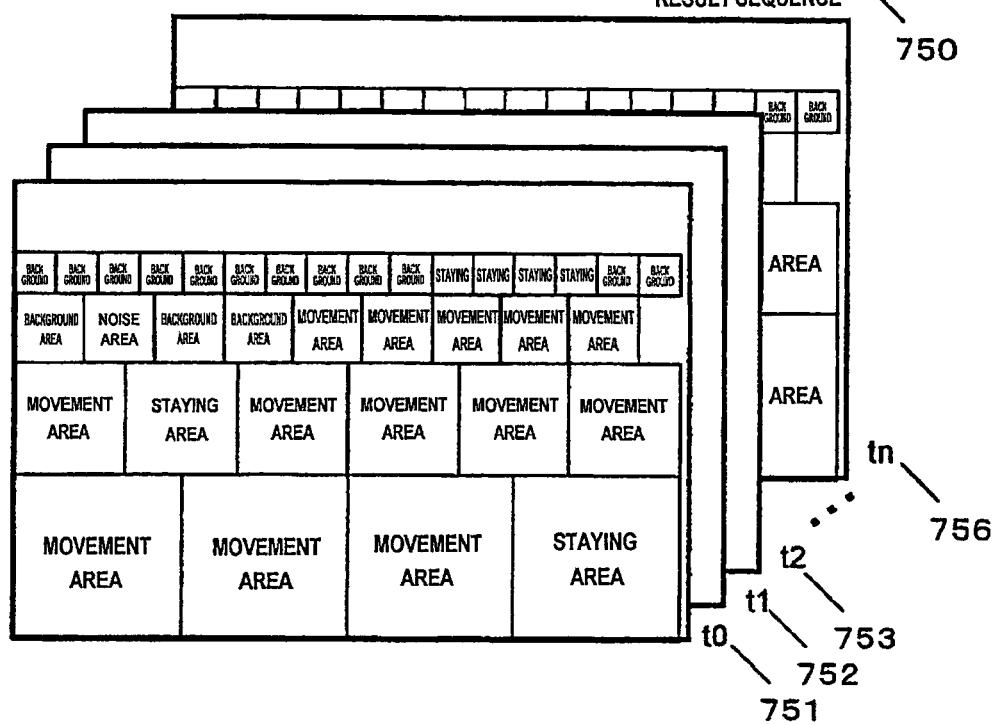
FIG. 61 is a diagram illustrating an example of the determination result of the state of an area by the congestion estimating apparatus shown in FIG. 60.
Figure 62:
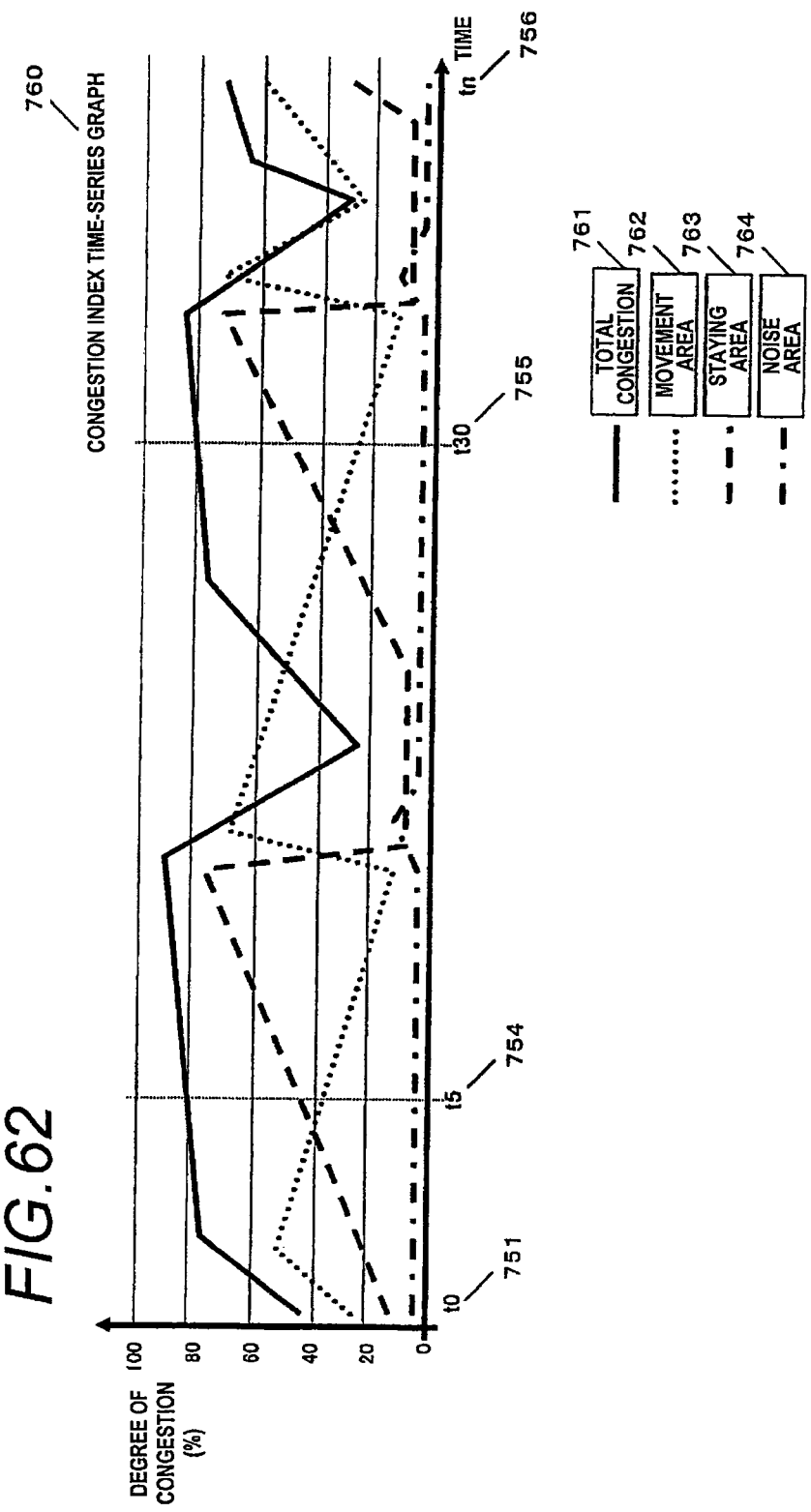
FIG. 62 is a time-series graph illustrating the congestion index of the congestion estimating apparatus shown in FIG. 60.

FIG. 61 shows a process area state determination result sequence 150 output from the staying determining unit 620. The area state determination result sequence 750 has area determination results as time-series data of t(0)751, t(1)752, t(2)753, . . . , t(n)756 (in FIG. 61, parentheses "( )" having a numerical value therein are omitted, which is the same with the following description). FIG. 62 shows a congestion index time-series graph 760 obtained by plotting the area state determination result sequence 750. The graph is obtained by plotting a staying area 763, a movement area 762, a noise area 764, a total congestion degree 761 in time series. The total congestion degree 761 indicates the sum of the number of movement areas 762 and the number of staying areas 763. The abnormal congestion determining unit 622 determines that abnormal congestion occurs when the total congestion degree 761 is more than a predetermined threshold value. For example, when the threshold value is set such that, if the total congestion degree 761 is more than 80%, it is determined that the degree of congestion is abnormal, it is determined at the timing of t(5)754 and t(30)755 that abnormal congestion occurs, and the fact is notified. In this embodiment, abnormal congestion is determined on the basis of the ratio of the total congestion degree 761. However, the abnormal congestion may be determined on the basis of the ratio of the staying area 763. In this embodiment, abnormal congestion is determined on the basis of the ratio of the total congestion degree 761. However, the abnormal congestion may be determined on the basis of the ratio of the movement area 762.

Figure 63:
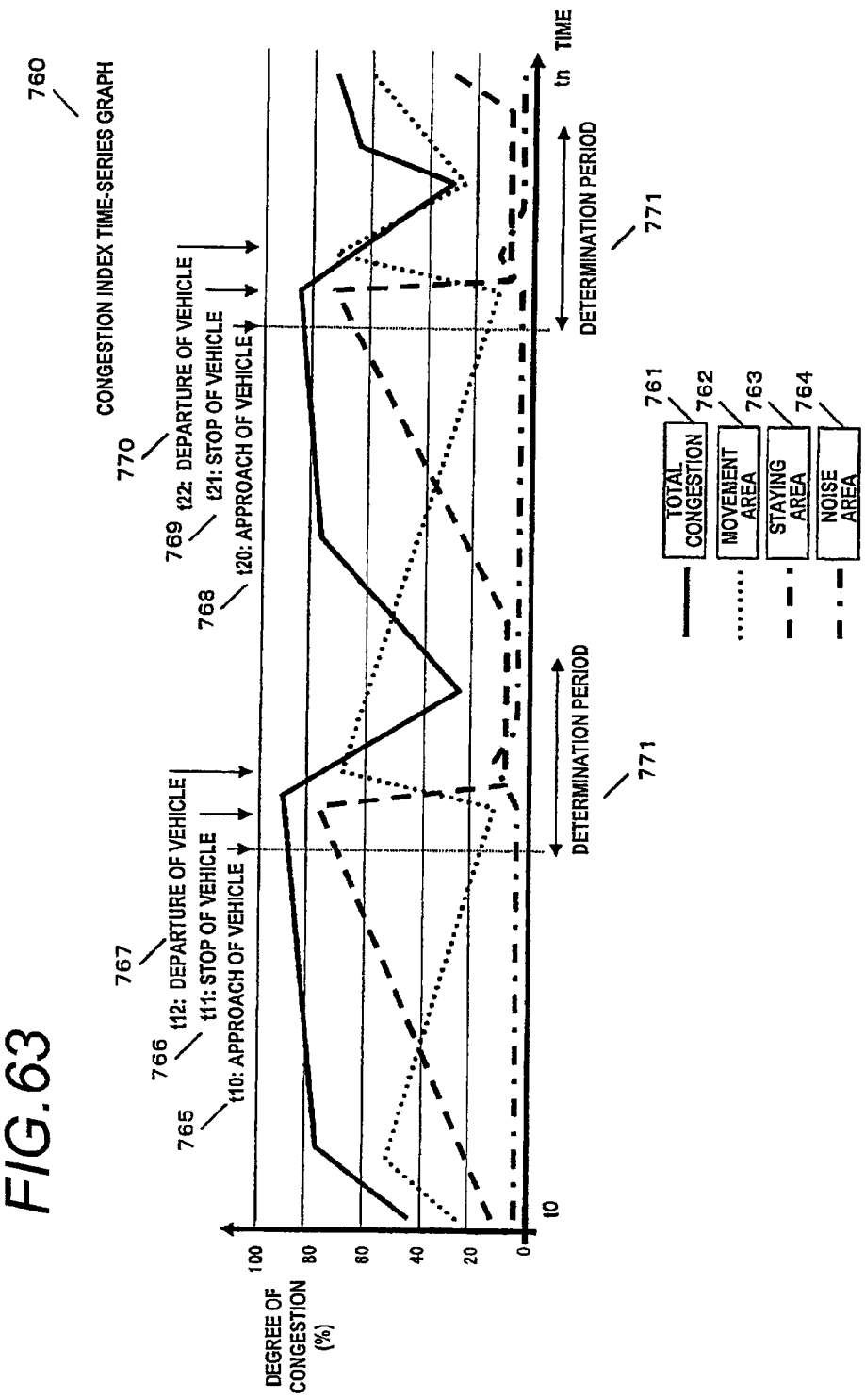
FIG. 63 is a congestion index time-series graph illustrating the overlap between the approach, stop, and departure timings of a train in the congestion estimating apparatus shown in FIG. 60.

FIG. 63 shows a congestion index time-series graph obtained by overlapping the timings of t10:vehicle approach 765, t20:vehicle approach 768, t11:vehicle stop 766, t21: vehicle stop 769, t12:vehicle departure 767, and t22:vehicle departure 770 obtained from the timing generating unit 621 on the congestion index time-series graph. The abnormality determining unit 622 determines that there is abnormality when the total congestion degree 761 is not reduced by a predetermined threshold value after a predetermined amount of time has elapsed from the timing of t10:vehicle approach 765 and the timing of t20:vehicle approach 768 and notifies the fact. For example, in the range of a predetermined determination period 771 from the timing of t10:vehicle approach 765, when the total congestion degree 761 is not reduced by 60% or more, the abnormality determining unit 622 determines that abnormal congestion occurs, and notifies the fact.

In the example shown in FIG. 63, after the determination period 771 from the timing of t10:vehicle approach 765 and the timing of t20:vehicle approach 768, the total congestion degree 761 is reduced by 60% or less, it is not determined that abnormal congestion occurs. In this embodiment, abnormal congestion is determined on the basis of the ratio of the total congestion degree 761 at the vehicle approach timing. However, the abnormal congestion may be determined on the basis of the ratio of the staying area 763. In this embodiment, abnormal congestion is determined on the basis of the ratio of the total congestion degree 761. However, the abnormal congestion may be determined on the basis of the ratio of the movement area 762.

Figure 64:
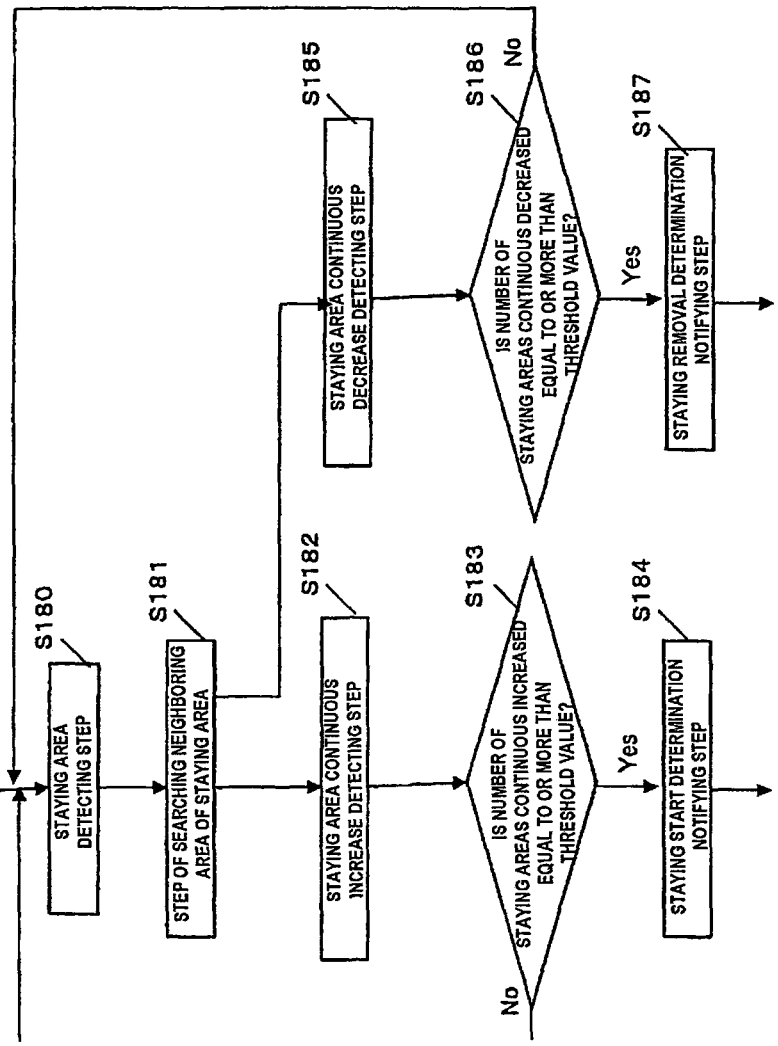
FIG. 64 is a flowchart illustrating a process of determining the tendency of the movement of persons in the congestion estimating apparatus shown in FIG. 60.

Next, a process of determining the tendency of the movement of persons, such as a staying start state, a staying removal state, and a normal state, from the state of each process area determined by the staying determining unit 620 will be described with reference to FIG. 64. In a staying area detecting step S180, a staying area is detected. In a search step S181 of searching a neighboring area of the staying area, it is determined whether a new staying area is generated in a neighboring area including a staying area or the staying area is removed, and information indicating the determination result is transmitted to a staying area continuous increase determining step S182 and a staying area continuous decrease determining step S185.

In the staying area continuous increase determining step S182, it is determined whether the staying area is continuously monotonously increased and it is determined whether the number of staying areas continuously increased is equal to or more than a threshold value (step S183). If the number of staying areas is equal to more than a predetermined threshold value, in a staying start determination notifying step S184, a warning is issued before abnormal congestion occurs due to an increase in the staying area. Similarly, in the staying area continuous decrease determining step S185, it is determined whether the staying area is continuously monotonously decreased and it is determined whether the number of staying areas continuously decreased is equal to or more than a threshold value (step S186). If the number of staying areas is equal to more than a predetermined threshold value, in a staying removal determination notifying step S187, it is notified that the congestion situation has been removed.

FIG. 65 shows an example of the above-mentioned process. At a time (t–4) 790 and a time (t–3) 791 (in FIG. 65, parentheses "( )" having a numerical value therein are omitted, which is the same with the following description), only the movement area is detected. At a time (t–2) 792, a staying area is generated, and the staying area is recognized as a reference staying area 795. At a time (t–1) 793, a new staying area is generated in the vicinity of the reference staying area 795, a group of the staying area groups is used as a reference staying area group. At a time (t) 794, three new staying areas are generated in the reference staying area group. When a threshold value for determining a staying start is three staying areas, it is determined at that time that a staying start 796 occurs, and the fact is notified. The same process as described above is performed on staying removal. Cases other than the staying start determination and the staying removal determination are determined to be a normal state. Therefore, the normal state can be notified.

As described above, it is possible to determine the indexes of congestion situations (a staying start state, a staying removal state, and a normal state) and an abnormal state on the basis of various states of each area, a staying area, a movement area, a noise area, and a background area.

Although the exemplary embodiments of the invention have been described above, the invention is not limited thereto, but changes and applications implemented by those skilled in the art on the basis of the specification and known techniques are also included in the scope of the invention.

The application is based on Japanese patent application No. 2007-278625 filed on Oct. 26, 2007 and Japanese patent application No. 2007-280205 filed on Oct. 29, 2007, the contents of which are incorporated hereinto by reference.

INDUSTRIAL APPLICABILITY

The situation determining apparatus, the situation determining method, and the situation determining program according to the invention can provide an apparatus, a method, and a program capable of determining the kind of situation related to the movement of persons or the degree of congestion and achieving laborsaving and high efficiency when image monitoring is performed in a public space in which a plurality of persons is moved, such as a station or an airport. In addition, the abnormality determining apparatus, the abnormality determining method, and the abnormality determining program according to the invention can provide an apparatus, a method, and a program capable of determining an abnormal congestion situation related to the movement of persons, achieving laborsaving and high efficiency when image monitoring is performed in a public space in which a plurality of persons is moved, such as a station or an airport, and detecting abnormality in advance in order to prevent accidents caused by abnormal congestion.

The congestion estimating apparatus according to the invention automatically sets the reference movement amount of movement information to discriminate a state in which there is a movement and a state in which there is no movement. In addition, the congestion estimating apparatus determines whether there is a movement and uses texture to determine similarity, thereby discriminating various states of each area, a staying area, a movement area, a noise area, and a background area. Further, the congestion estimating apparatus uses the state of each area to estimate the degree of congestion, and can provide the indexes of congestion situations (a staying area, a movement area, a normal area, a staying start state, a staying removal state, and a normal state) and information about an abnormal state. Therefore, the congestion estimating apparatus according to the invention can be applied to an apparatus that notifies an abnormal congestion state.

The invention claimed is:

1. A situation determining apparatus for analyzing captured moving images or a plurality of captured still images to determine a movement situation and/or a degree of congestion of persons, the situation determining apparatus comprising:
   a local image change ratio calculating unit that calculates a time change ratio of a brightness value in a local area of the captured images; and
   a situation determining unit that analyzes a histogram of the time change ratios of a plurality of local areas calculated by the local image change ratio calculating unit and determines the movement situation of the persons and/or the degree of congestion of the persons,
   wherein the movement situation includes at least a situation in which a moving route of the persons is limited to a first specific area in which there are moving persons, wherein other persons are standing in a second specific area that is offset from the first specific area in which there are moving persons and to which the moving route is limited.

2. The situation determining apparatus according to claim 1, wherein the situation determining unit includes a reference histogram storage unit and a histogram comparing unit.

3. The situation determining apparatus according to claim 1, wherein the situation determining unit includes a feature extracting unit, an identification reference storage unit, and an identifying unit.

4. The situation determining apparatus according to claim 1, wherein the movement situation includes at least a situation in which the moving route of the persons is deflected to one side.

5. An abnormality determining apparatus for analyzing moving images or a plurality of still images captured by an imaging unit that is provided at a platform of a station to determine an abnormal situation, the abnormality determining apparatus comprising:
   the situation determining apparatus according to claim 1;
   a train arrival detecting unit that detects an arrival of a train to the platform; and
   an abnormality determining unit which determines that abnormality occurs when it is determined that the moving route of the persons is deflected to the one side as the situation determination result after a predetermined amount of time has elapsed from the acquisition of train arrival information by the train arrival detecting unit, on the basis of a situation determination result of the situation determining apparatus and the train arrival information obtained by the train arrival detecting unit.

6. The abnormality determining apparatus according to claim 5, further comprising:
   a notifying unit that gives the determination result of the abnormality determining unit to a predetermined contact address when the abnormality determining unit determines that abnormality occurs.

7. A situation determining apparatus for analyzing captured moving images or a plurality of captured still images to determine a movement situation and/or a degree of congestion of persons, the situation determining apparatus comprising:
   an image input unit that inputs moving images or a plurality of still images of persons captured in an imaging target place;
   an image accumulating unit that accumulates the images input by the image input unit;
   a local image change detecting unit that selects two images captured at a first time interval from the images accumulated in the image accumulating unit and detects a change between the two images in each local area using area division information indicating a division method of dividing the image into a plurality of local areas;
   a local image change information accumulating unit that accumulates the change between the two images detected by the local image change detecting unit as image change information;
   a local image change ratio calculating unit that counts the number of changes between images given at a second time interval in each local area on the basis of the image change information accumulated in the local image change information accumulating unit, and calculates an image change ratio of each local area;
   a local image change ratio accumulating unit that accumulates the image change ratios of a plurality of local areas calculated by the local image change ratio calculating unit;

a local image change ratio histogram calculating unit that calculates a histogram of the image change ratios of the plurality of local areas accumulated by the local image change ratio accumulating unit; and a situation determining unit that analyzes the histogram calculated by the local image change ratio histogram calculating unit to determine the movement situation and or the degree of congestion of the persons in the imaging target place.

8. A situation determining method of analyzing captured moving images or a plurality of captured still images to determine a movement situation and/or a degree of congestion of persons, the situation determining method comprising:

a local image change ratio calculating step of calculating a time change ratio of a brightness value in a local area of the captured images; and a situation determining step of analyzing a histogram of the time change ratios of a plurality of local areas calculated by the local image change ratio calculating step and determining the movement situation of the persons and/or the degree of congestion of the persons, wherein the movement situation includes at least a situation in which a moving route of the persons is limited to a first specific area in which there are moving persons, wherein other persons are standing in a second specific area that is offset from the first specific area in which there are moving persons and to which the moving route is limited.

9. The situation determining method according to claim 8, wherein the movement situation includes at least a situation in which the moving route of the persons is deflected to one side.

10. An abnormality determining method of analyzing moving images or a plurality of still images captured by an imaging unit that is provided at a platform of a station to determine an abnormal situation, the abnormality determining method comprising:

a situation determining step of performing the situation determining method of claim 8;

a train arrival detecting step of detecting an arrival of a train to the platform; and an abnormality determining step of determining that abnormality occurs when it is determined that the moving route of the persons is deflected to the one side as the situation determination result after a predetermined amount of time has elapsed from the acquisition of train arrival information by the train arrival detecting unit, on the basis of a situation determination result of the situation determining step and the train arrival information obtained by the train arrival detecting step.

11. A storage medium for recording an abnormality determining program that analyzes moving images or a plurality of still images captured by an imaging unit that is provided at a platform of a station to determine an abnormal situation, the abnormality determining program allowing a computer to execute:

a situation determining step of performing the situation determining method of claim 8;

a train arrival detecting step of detecting an arrival of a train to the platform; and an abnormality determining step of determining that abnormality occurs when it is determined that the moving route of the persons is deflected to the one side as the situation determination result after a predetermined amount of time has elapsed from the acquisition of train arrival information by the train arrival detecting unit, on the basis of a situation determination result of the situation determining step and the train arrival information obtained by the train arrival detecting step.

12. A storage medium for recording a situation determining program that analyzes captured moving images or a plurality of captured still images to determine a movement situation and/or a degree of congestion of persons, the situation determining program allowing a computer to execute:

a local image change ratio calculating step of calculating a time change ratio of a brightness value in a local area of the captured images; and a situation determining step of analyzing a histogram of the time change ratios of a plurality of local areas calculated by the local image change ratio calculating step and determining the movement situation of the persons and/or the degree of congestion of the persons, wherein the movement situation includes at least a situation in which a moving route of the persons is limited to a first specific area in which there are moving persons, wherein other persons are standing in a second specific area that is offset from the first specific area in which there are moving persons and to which the moving route is limited.

13. The storage medium according to claim 12, wherein the movement situation includes at least a situation in which the moving route of the persons is deflected to one side.

14. A situation determining apparatus for analyzing captured moving images or a plurality of captured still images to determine a movement situation and/or a degree of congestion of persons, the situation determining apparatus comprising:

an image input unit that inputs moving images or a plurality of still images of persons captured in an imaging target place;

an image accumulating unit that accumulates the images input by the image input unit;

a local image change detecting unit that selects two images captured at a first time interval from the images accumulated in the image accumulating unit and detects a change between the two images in each local area using area division information indicating a division method of dividing the image into a plurality of local areas;

a local image change information accumulating unit that accumulates the change between the two images detected by the local image change detecting unit as image change information;

a local image change ratio calculating unit that counts the number of changes between images given at a second time interval in each local area on the basis of the image change information accumulated in the local image change information accumulating unit, and calculates an image change ratio of each local area; and a situation determining unit that analyzes a histogram of the image change ratios of the plurality of local areas calculated by the local image change ratio calculating unit to determine the movement situation and/or the degree of congestion of the persons in the imaging target place.

* * * * *